US012266125B2

(12) United States Patent
Senshiki

(10) Patent No.: US 12,266,125 B2
(45) Date of Patent: Apr. 1, 2025

(54) MEASUREMENT METHOD, MEASUREMENT SYSTEM, AND INFORMATION PROCESSING APPARATUS

(71) Applicant: SEIKO EPSON CORPORATION, Tokyo (JP)

(72) Inventor: Hiroki Senshiki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/384,617

(22) Filed: Oct. 27, 2023

(65) Prior Publication Data

US 2024/0144505 A1 May 2, 2024

(30) Foreign Application Priority Data

Oct. 28, 2022 (JP) .................................. 2022-173484

(51) Int. Cl.
  *G06T 7/521* (2017.01)
  *G06T 7/73* (2017.01)
  *H04N 9/31* (2006.01)

(52) U.S. Cl.
  CPC ............... *G06T 7/521* (2017.01); *G06T 7/73* (2017.01); *H04N 9/3138* (2013.01); *H04N 9/3179* (2013.01); *G06T 2207/10028* (2013.01)

(58) Field of Classification Search
  CPC . G06T 7/521; G06T 7/73; G06T 2207/10028; H04N 9/3138; H04N 9/3179; H04N 9/3147; H04N 9/3185; H04N 9/3194
  See application file for complete search history.

(56) References Cited

U.S. PATENT DOCUMENTS

2019/0385272 A1  12/2019 Aoki et al.
2021/0327024 A1*  10/2021 Wang .................... G06T 3/4038
(Continued)

FOREIGN PATENT DOCUMENTS

CN   114529448 A  *  5/2022
JP   2014-134611 A    7/2014
JP   2019-215811 A   12/2019

OTHER PUBLICATIONS

"Geometry Manager Pro Manual", May 2021.
(Continued)

*Primary Examiner* — Michael Lee
(74) *Attorney, Agent, or Firm* — Oliff PLC

(57) ABSTRACT

A measurement method including generating first restoration information representing a Euclidean restoration result for a first region of a screen that is a non-planar surface based on a first image that is one of an image input to a first apparatus including a first lens and having known internal parameters relating to the first lens and an image output from the first apparatus, and a second image that is one of an image input to a second apparatus including a second lens and having known internal parameters relating to the second lens and an image output from the second apparatus, generating second restoration information representing a projection restoration result for a second region of the screen based on a third image that is one of an image input to a third apparatus including a third lens and having unknown internal parameters relating to the third lens and an image output from the third apparatus, and the first image, generating a three-dimensional projective transformation matrix for transforming the coordinates of a plurality of points indicated by the second restoration information into the coordinates of a plurality of points indicated by the first restoration information based on the first restoration information and the second restoration information, and generating third (Continued)

restoration information representing a Euclidean restoration result for the second region based on the second restoration information and the three-dimensional projective transformation matrix, at least one of the first, second, and third apparatuses being an imaging apparatus that captures an image of the screen, and at least part of the first region and at least part of the second region overlapping with each other in a third region.

9 Claims, 25 Drawing Sheets

(56) References Cited

U.S. PATENT DOCUMENTS

| | | | |
|---|---|---|---|
| 2023/0055649 A1* | 2/2023 | Huang | G06T 7/60 |
| 2024/0146885 A1* | 5/2024 | Takeuchi | H04N 9/3185 |
| 2024/0146889 A1* | 5/2024 | Takeuchi | H04N 9/3147 |

OTHER PUBLICATIONS

"Uncalibrated Stereo Image Rectification". Matlab & Simulink, Internet Archive, May 7, 2021, <URL: https://web.archive.org/web/20220521164420/https://www.mathworks.com/help/vision/ug/uncalibrated-stereo-image-rectification.html>.
"Estimate Essential Matrix". Matlab, The MathWorks, Inc., Sep. 20, 2022.
"Relative Camera Pose". Matlab, The MathWorks, Inc., Sep. 20, 2022.
"Business Projector". Epson EB-L30000U/L30002U, Seiko Epson Corp. Epson Sales Japan Corp., Jun. 21, 2022.

* cited by examiner

MEASUREMENT METHOD, MEASUREMENT SYSTEM, AND INFORMATION PROCESSING APPARATUS

The present application is based on, and claims priority from JP Application Serial Number 2022-173484, filed Oct. 28, 2022, the disclosure of which is hereby incorporated by reference herein in its entirety.

BACKGROUND

1. Technical Field

The present disclosure relates to a measurement method, a measurement system, and an information processing apparatus.

2. Related Art

There is a technology for measuring the three-dimensional shape of a stereoscopic object by using two-dimensional images such as captured images produced by capturing an image of the object, in other words, a technology for "restoring" the three-dimensional shape of the object from the two-dimensional images. For example, JP-A-2014-134611 discloses a projector apparatus that includes a stereo camera having two lenses and uses a plurality of captured images acquired by the stereo camera to acquire three-dimensional coordinates of points on a screen on which a predetermined pattern is projected. As described above, acquiring the three-dimensional coordinates of a plurality of points located on the surface of an object allows measurement of the three-dimensional shape of the object.

JP-A-2014-134611 is an example of the related art.

To acquire the three-dimensional coordinates of a point located on the surface of an object by using two-dimensional images, it is necessary to provide parameters derived from an apparatus used to acquire the three-dimensional coordinates of the point (hereinafter referred to as "internal parameters") and parameters derived from the position and posture of the apparatus (hereinafter referred to as "external parameters"). For example, when a stereo camera is used to acquire the three-dimensional coordinates of a point located on the surface of an object, the internal parameters include the focal length of the stereo camera, and other parameters.

When the internal parameters of an apparatus used to measure the shape of an object are unknown, the three-dimensional coordinates of an acquired point include uncertainty of the projective transformation, so that the shape of the object obtained by measurement may differ from the actual shape of the object. On the other hand, when the internal parameters of the apparatus used to measure the shape of the object are known, the shape of the object obtained by the measurement is similar to the actual shape of the object. That is, to accurately measure the three-dimensional shape of the object, it is necessary to grasp the internal parameters of the apparatus used for the measurement. Therefore, to measure the shape of an object by using an apparatus having unknown internal parameters, it is necessary to perform time-consuming calibration to grasp the internal parameters before measuring the shape of the object.

SUMMARY

A measurement method according to an aspect of the present disclosure includes generating first restoration information representing a Euclidean restoration result for a first region of a screen that is a non-planar surface based on a first image that is one of an image input to a first apparatus including a first lens and having known internal parameters relating to the first lens and an image output from the first apparatus, and a second image that is one of an image input to a second apparatus including a second lens and having known internal parameters relating to the second lens and an image output from the second apparatus, generating second restoration information representing a projection restoration result for a second region of the screen based on a third image that is one of an image input to a third apparatus including a third lens and having unknown internal parameters relating to the third lens and an image output from the third apparatus, and the first image, generating a three-dimensional projective transformation matrix for transforming coordinates of a plurality of points indicated by the second restoration information into coordinates of a plurality of points indicated by the first restoration information based on the first restoration information and the second restoration information, and generating third restoration information representing a Euclidean restoration result for the second region based on the second restoration information and the three-dimensional projective transformation matrix, at least one of the first, second, and third apparatuses being an imaging apparatus that captures an image of the screen, and at least part of the first region and at least part of the second region overlapping with each other in a third region.

A measurement system according to another aspect of the present disclosure includes a first apparatus including a first lens and having known internal parameters relating to the first lens, a second apparatus including a second lens and having known internal parameters relating to the second lens, a third apparatus including a third lens and having unknown internal parameters relating to the third lens, and a processing apparatus that generates first restoration information representing a Euclidean restoration result for a first region of a screen that is a non-planar surface based on a first image that is one of an image input to the first apparatus and an image output from the first apparatus, and a second image that is one of an image input to the second apparatus and an image output from the second apparatus, generates second restoration information representing a projection restoration result for a second region of the screen based on a third image that is one of an image input to the third apparatus and an image output from the third apparatus, and the first image, generates a three-dimensional projective transformation matrix for transforming coordinates of a plurality of points indicated by the second restoration information into coordinates of a plurality of points indicated by the first restoration information based on the first restoration information and the second restoration information, and generates third restoration information representing a Euclidean restoration result for the second region based on the second restoration information and the three-dimensional projective transformation matrix, at least one of the first, second, and third apparatuses being an imaging apparatus that captures an image of the screen, and at least part of the first region and at least part of the second region overlapping with each other in a third region.

An information processing apparatus according to another aspect of the present disclosure includes a processing apparatus that generates first restoration information representing a Euclidean restoration result for a first region of a screen that is a non-planar surface based on a first image that is one of an image input to a first apparatus including a first lens and having known internal parameters relating to the first lens and an image output from the first apparatus, and a second image that is one of an image input to a second apparatus including a second lens and having known internal parameters relating to the second lens and an image output from the second apparatus, generates second restoration information representing a projection restoration result for a second region of the screen based on a third image that is one of an image input to a third apparatus including a third lens and having unknown internal parameters relating to the third lens and an image output from the third apparatus, and the first image, generates a three-dimensional projective transformation matrix for transforming coordinates of a plurality of points indicated by the second restoration information into coordinates of a plurality of points indicated by the first restoration information based on the first restoration information and the second restoration information, and generates third restoration information representing a Euclidean restoration result for the second region based on the second restoration information and the three-dimensional projective transformation matrix, at least one of the first, second, and third apparatuses being an imaging apparatus that captures an image of the screen, and at least part of the first region and at least part of the second region overlapping with each other in a third region.

DESCRIPTION OF EMBODIMENTS

Figure 1:
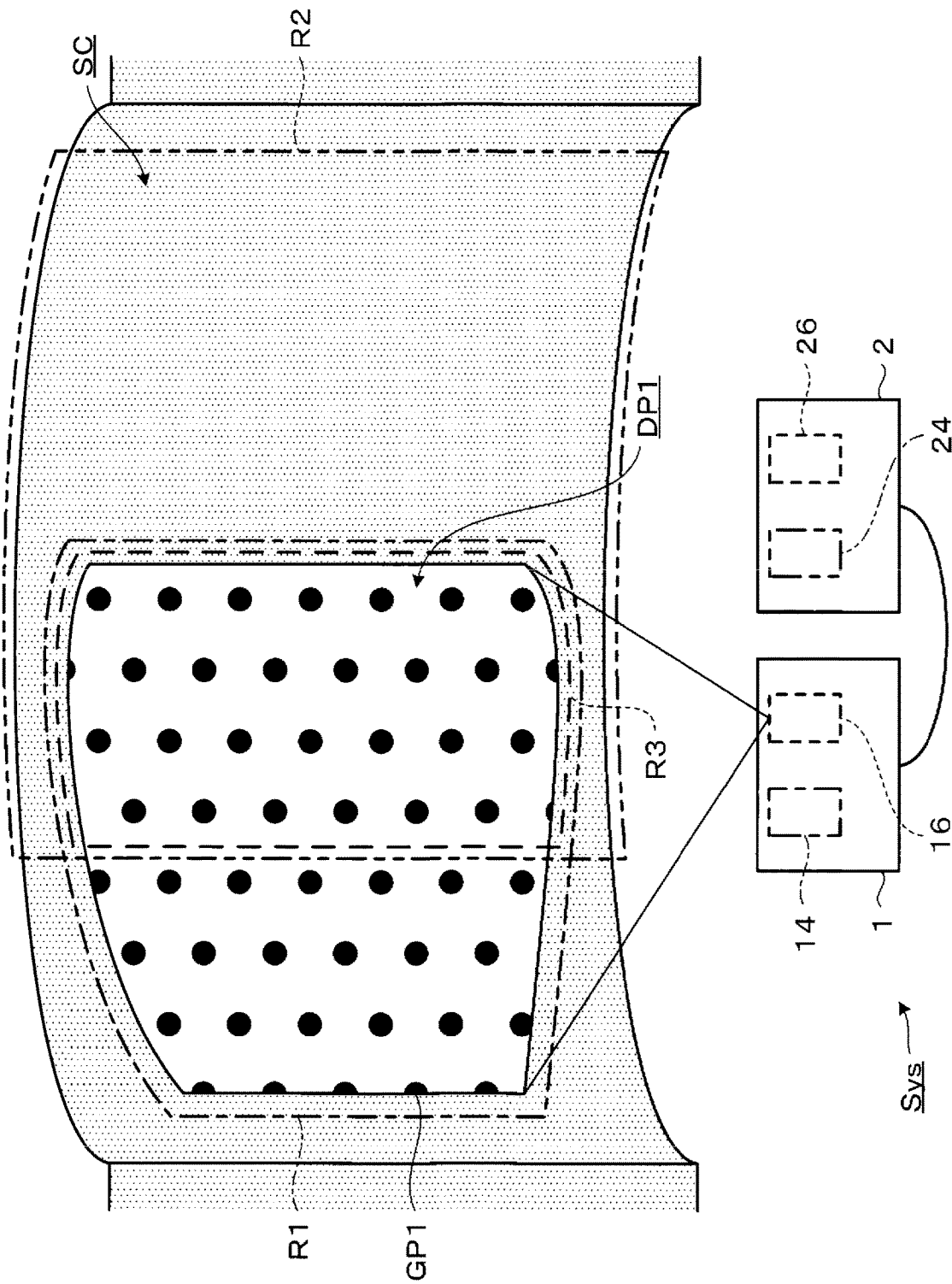
FIG. 1 is a diagrammatic view for describing an overview of a measurement system according to a first embodiment.

Preferable embodiments according to the present disclosure will be described below with reference to the accompanying drawings. In the drawings, the dimensions and scale of each portion differ from actual values in some cases, and some of the portions are diagrammatically drawn for ease of understanding. The scope of the present disclosure is not limited to the embodiments unless particular restrictions on the present disclosure are made in the following description.

In the present specification, when an apparatus used to measure the three-dimensional shape of an object by using two-dimensional images includes an apparatus having unknown internal parameters, the method for performing the measurement is referred to as "projection restoration". On the other hand, when the apparatus used to measure the three-dimensional shape of an object by using two-dimensional images includes no apparatus having unknown internal parameters, in other words, when the internal parameters of all apparatuses used for the measurement are known, the method for performing the measurement is referred to as "Euclidean restoration".

The result of the measurement of the three-dimensional shape of the object obtained by using the projective restoration, in other words, the three-dimensional coordinates of points located on the surface of the object acquired by the projective restoration are referred to as a "projective restoration result". The three-dimensional coordinates of the points indicated by the "projective restoration result" include uncertainty of the projective transformation.

The result of the measurement of the three-dimensional shape of the object obtained by using the Euclidean restoration, in other words, the three-dimensional coordinates of points located on the surface of the object acquired by the Euclidean restoration are referred to as a "Euclidean restoration result". The three-dimensional coordinates of the points indicated by the "Euclidean restoration result" have no or negligible uncertainty of the projective transformation.

When the three-dimensional coordinates of the points acquired by the measurement of the three-dimensional shape of the object have no or negligible uncertainty of the projective transformation, the three-dimensional coordinates of the points are regarded as a "Euclidean restoration result".

1. First Embodiment

A first embodiment shows by way of example a measurement system including two imaging apparatuses each having known internal parameters and a projection apparatus having unknown internal parameters, and describes a measurement method, a measurement system, and an information processing apparatus according to an aspect of the present disclosure. Specifically, the description will be given about a method for acquiring a Euclidean restoration result for a screen that is a non-planar surface by using the projection apparatus having unknown internal parameters without performing calibration of the projection apparatus.

1.1. Overview of Measurement System

FIG. 1 is a diagrammatic view for describing an overview of a measurement system Sys according to the first embodiment. The measurement system Sys includes projectors 1 and 2. The projector 1 is communicably connected to the projector 2, and transmits and receives a variety of pieces of information to and from the projector 2. The projector 1 includes an imaging apparatus 14 and a projection apparatus 16. The projector 2 includes an imaging apparatus 24 and a projection apparatus 26.

The projection apparatuses 16 and 26 each project an image onto a screen SC, which is a non-planar surface, to display a projection image on the screen SC. The projection apparatuses 16 and 26 each have unknown internal parameters.

The imaging apparatus 14 captures an image of at least part of the projection image displayed on the screen SC by the projection apparatus 16. The imaging apparatus 14 further captures an image of at least part of the projection image displayed on the screen SC by the projection apparatus 26. The imaging apparatus 14 has known internal parameters.

The imaging apparatus 24 captures an image of a range containing a region R2 of the screen SC. The imaging apparatus 24 further captures an image of at least part of the projection image displayed on the screen SC by the projection apparatus 16. The imaging apparatus 24 further captures an image of at least part of the projection image displayed on the screen SC by the projection apparatus 26. The imaging apparatus 24 has known internal parameters.

Note that the imaging range of the imaging apparatus 14 and the imaging range of the imaging apparatus 24 at least partially overlap with each other.

The projection apparatus 16 projects an image GF1, which will be described later, onto the screen SC to display a projection image GP1 on the screen SC. The imaging apparatus 14 captures an image of a range containing a region R1, which is part of the screen SC and in which the projection image GP1 is displayed. Part of the region R1 and part of the region R2 overlap with each other in a region R3. In other words, the regions R1 and R2 each include the region R3. That is, part of the projection image GP1 is displayed in the region R3. The imaging apparatus 24 captures an image of a range containing the region R2, which is part of the screen SC and in which part of the projection image GP1 is displayed. The projection image GP1 contains a plurality of points. The plurality of points include a plurality of points DP1. The plurality of points DP1 fall within the region R3.

The projector 1 acquires the Euclidean restoration result for the region R3 based on the captured image acquired by the imaging apparatus 14 having known internal parameters and the captured image acquired by the imaging apparatus 24 having known internal parameters. The projector 1 acquires the projection restoration result for the region R1 based on the captured image acquired by the imaging apparatus 14 and the image GF1 projected from the projection apparatus 16 having unknown internal parameters. The projection restoration result for the region R1 includes the projection restoration result for the region R3. The projector 1 generates a three-dimensional projective transformation matrix that transforms the projection restoration result for the region R3 into the Euclidean restoration result for the region R3 based on the Euclidean restoration result for the region R3 and the projection restoration result for the region R1. The projector 1 further generates the Euclidean restoration result for the region R1 by using the three-dimensional projective transformation matrix to transform the projection restoration result for the region R1.

That is, the measurement system Sys uses the imaging apparatus 14 having known internal parameters, the imaging apparatus 24 having known internal parameters, and the projection apparatus 16 having unknown internal parameters to acquire the Euclidean restoration result for the region R1 of the screen SC without performing calibration of the projection apparatus 16. In other words, the measurement system Sys can acquire the Euclidean restoration result for the region R1 excluding the region R3 and being outside the imaging range of the imaging apparatus 24, in addition to the Euclidean restoration result for the region R3, which falls within both the imaging range of the imaging apparatus 14 and the imaging range of the imaging apparatus 24, by using the imaging apparatus 14 having known internal parameters, the imaging apparatus 24 having known internal parameters, and the projection apparatus 16 having unknown internal parameters.

1.2. Configuration and Functions of Measurement System

The configuration and functions of the measurement system Sys according to the first embodiment will be described below with reference to FIGS. 2 to 6.

Figure 2:
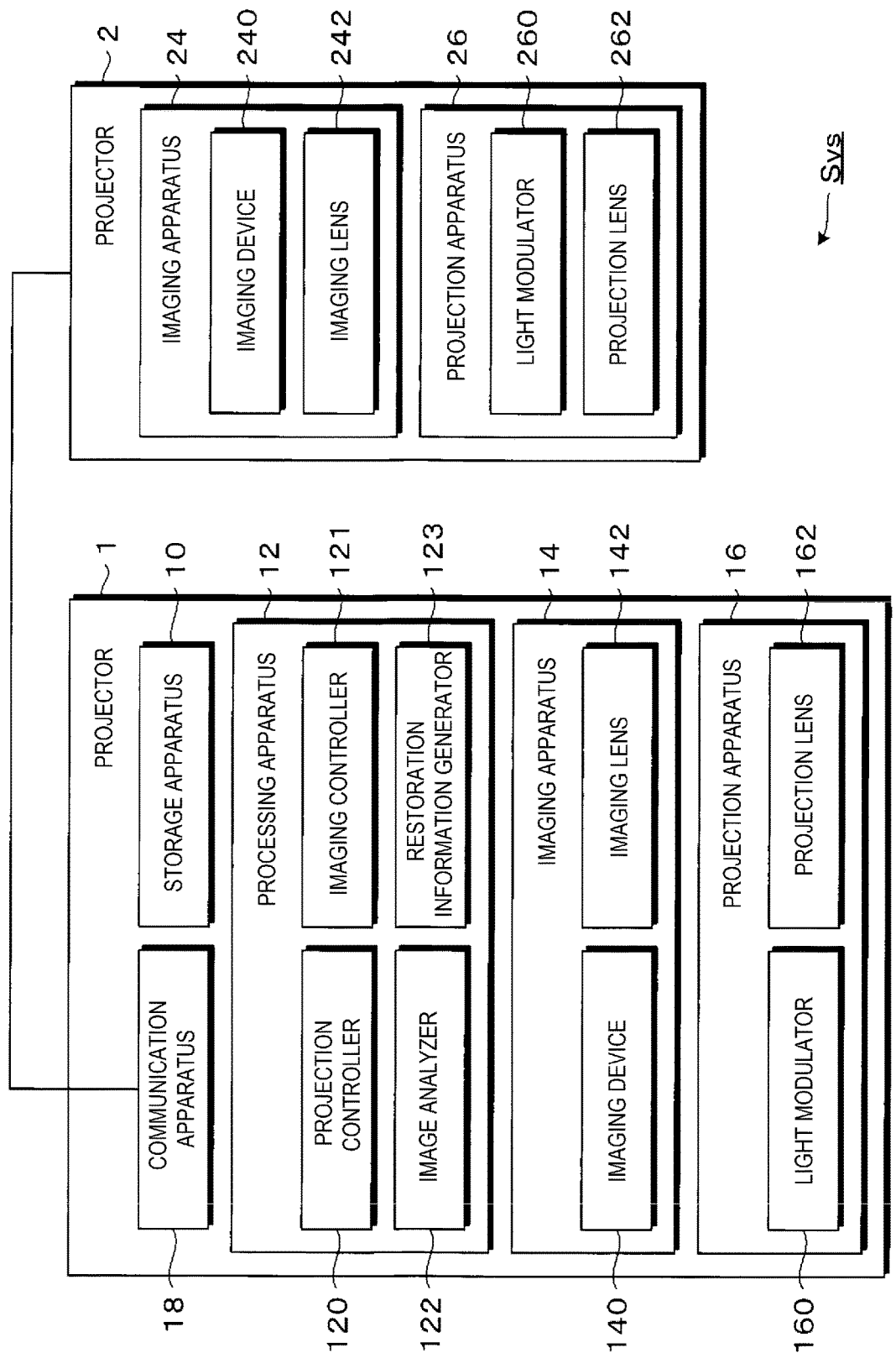
FIG. 2 is a block diagram showing the configuration of the measurement system according to the first embodiment.

FIG. 2 is a block diagram showing the configuration of the measurement system Sys according to the first embodiment. The measurement system Sys includes the projectors 1 and 2, as described above.

The projector 1 includes a storage apparatus 10, which stores a variety of pieces of information, a processing apparatus 12, which controls the action of the measurement system Sys, the imaging apparatus 14, which acquires a captured image used to measure the three-dimensional shape of an object, the projection apparatus 16, which projects an image onto a projection surface, and a communication apparatus 18, which transmits and receives a variety of pieces of information to and from the projector 2. The processing apparatus 12 has the functions as a projection controller 120, an imaging controller 121, an image analyzer 122, and a restoration information generator 123. The imaging apparatus 14 includes an imaging lens 142 for focusing, and an imaging device 140, which converts light focused by the imaging lens 142 into an electric signal to generate a captured image. The projection apparatus 16 includes a light source that is not shown, a light modulator 160, which modulates the light emitted from the light source into projection light for displaying a projection image onto the projection surface, a projection lens 162, which projects the projection light modulated by the light modulator 160 onto the projection surface.

The projector 2 includes the imaging apparatus 24, which acquires a captured image used to measure the three-dimensional shape of an object, and the projection apparatus 26, which projects an image onto the projection surface. The imaging apparatus 24 includes an imaging lens 242 for focusing, and an imaging device 240, which converts light focused by the imaging lens 242 into an electric signal to generate a captured image. The projection apparatus 26 includes a light source that is not shown, a light modulator 260, which modulates the light emitted from the light source into projection light for displaying a projection image onto the projection surface, and a projection lens 262, which projects the projection light modulated by the light modulator 260 onto the projection surface.

The storage apparatus 10 includes, for example, a volatile memory such as a RAM, and a nonvolatile memory such as a ROM. RAM is an abbreviation for a random access memory. ROM is an abbreviation for a read only memory.

Figure 3:
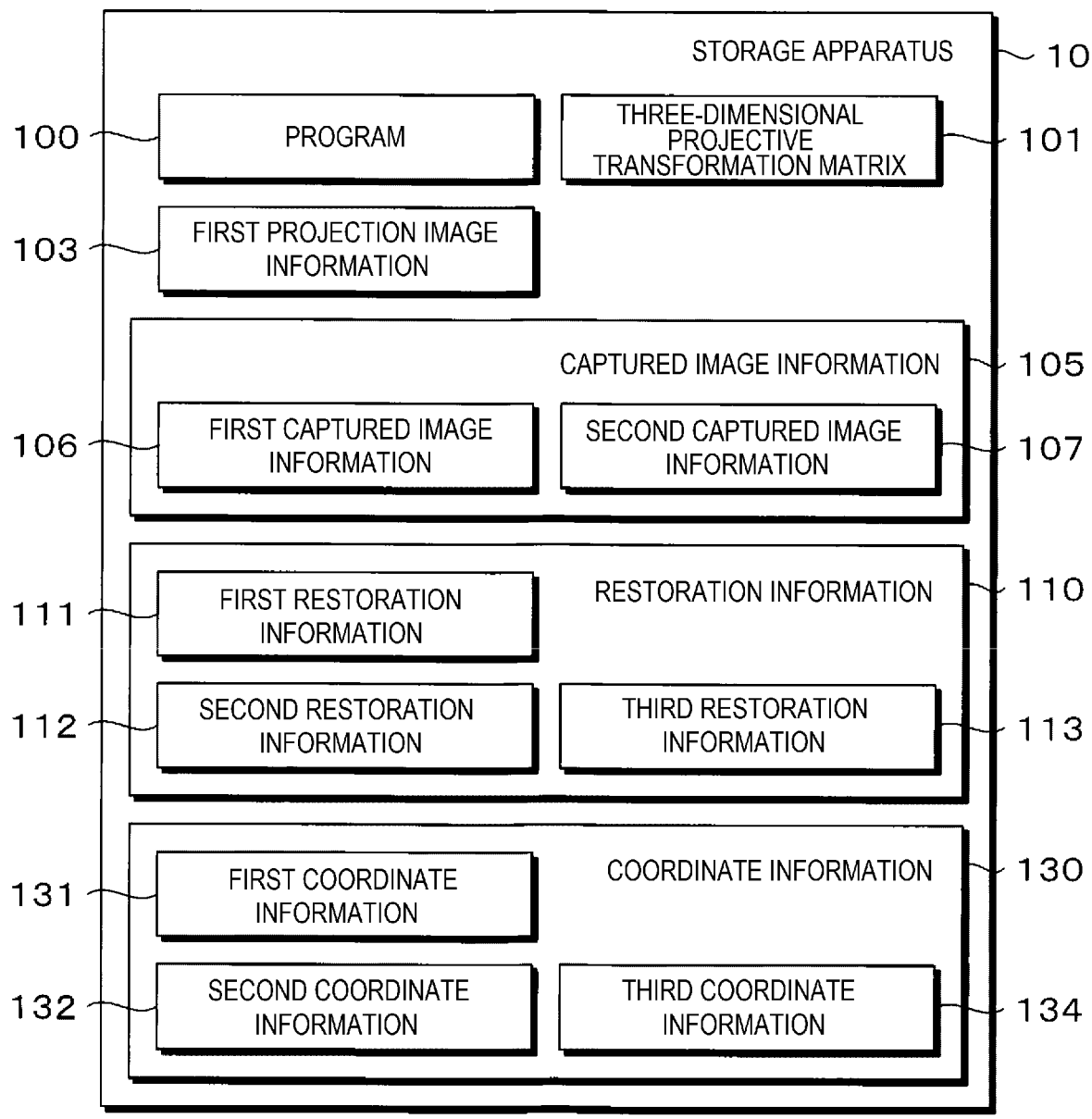
FIG. 3 is a block diagram showing the configuration of a storage apparatus according to the first embodiment.

FIG. 3 is a block diagram showing the configuration of the storage apparatus 10 according to the first embodiment. The nonvolatile memory provided in the storage apparatus 10 stores a program 100, which specifies the action of the projector 1, a three-dimensional projective transformation matrix 101, which transforms the projection restoration result for the region R3 into the Euclidean restoration result for the region R3, first projection information 103, which represents an image to be projected onto the projection surface, captured image information 105, which represents the result of capture of an image of an object under the three-dimensional shape measurement, restoration information 110, which represents the result of the measurement of the three-dimensional shape of the object by using the captured image indicated by the captured image information 105, and coordinate information 130, which represents the coordinates of points contained in a variety of images.

The captured image information 105 includes first captured image information 106, which represents the captured image acquired by the imaging apparatus 14, and second captured image information 107, which represents the captured image acquired by the imaging apparatus 24.

The restoration information 110 includes first restoration information 111, which represents the Euclidean restoration result for the region R3, second restoration information 112, which represents the projection restoration result for the region R1, and third restoration information 113, which represents the Euclidean restoration result for the region R1.

The coordinate information 130 includes first coordinate information 131, which represents the coordinates of a plurality of points contained in the image indicated by the first captured image information 106, second coordinate information 132, which represents the coordinates of a plurality of points contained in the image indicated by the second captured image information 107, and third coordinate information 134, which represents the coordinates of a plurality of points contained in the image indicated by the first projection image information 103.

The volatile memory provided in the storage apparatus 10 is used by the processing apparatus 12 as a work area when the processing apparatus 12 executes the program 100.

Part or the entirety of the storage apparatus 10 may be provided in an external storage apparatus, an external server, or any other component. Part or the entirety of the variety of pieces of information stored in the storage apparatus 10 may be stored in the storage apparatus 10 in advance, or may be acquired from the external storage apparatus, the external server, or any other component.

Figure 4:
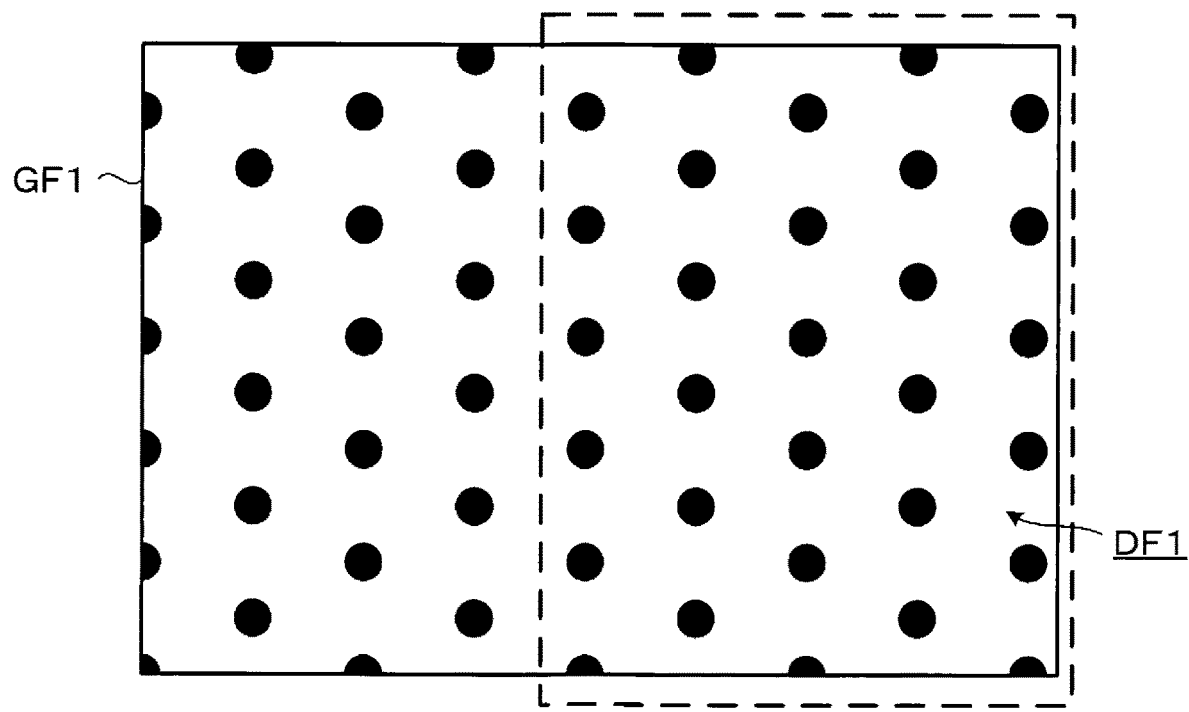
FIG. 4 is a diagrammatic view showing an example of an image indicated by first projection image information.

FIG. 4 is a diagrammatic view showing an example of the image indicated by the first projection image information 103. In the present embodiment, the first projection image information 103 represents the image GF1. The projector 1 causes the projection apparatus 16 to project the projection light based on the first projection image information 103 to display the projection image GP1 on the screen SC. In other words, the projector 1 causes the projection apparatus 16 to project the image GF1 to display the projection image GP1 on the screen SC.

The image GF1 contains a plurality of points. The plurality of points include a plurality of points DF1. The plurality of points DF1 are in one-to-one correspondence with the plurality of points DP1 contained in the projection image GP1. In FIG. 4, the plurality of points DF1 are points that fall within the range surrounded by the broken line.

Figure 5:
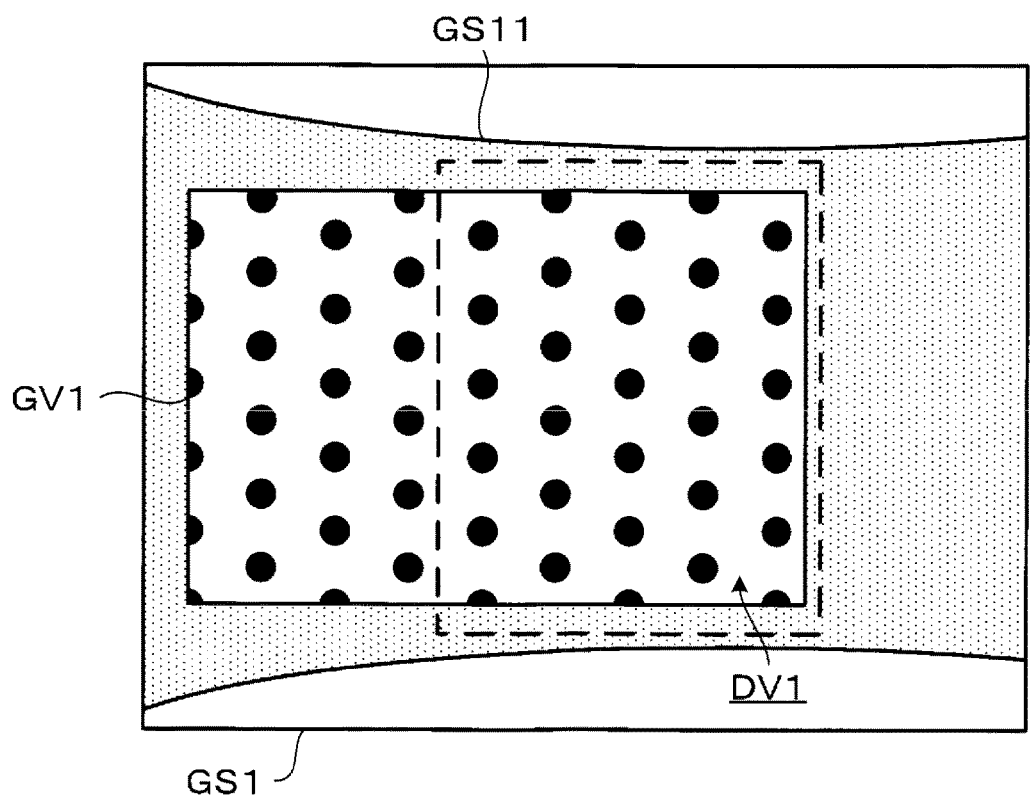
FIG. 5 is a diagrammatic view showing an example of an image indicated by first captured image information.

FIG. 5 is a diagrammatic view showing an example of the image indicated by the first captured image information 106. In the present embodiment, the first captured image information 106 represents a captured image GS1. The imaging apparatus 14 captures an image of the range containing the region R1, which is part of the screen SC and in which the projection image GP1 is displayed, to acquire the captured image GS1. In other words, the imaging apparatus 14 captures an image of the range containing the region R1, which is part of the screen SC and in which the projection image GP1 is displayed, to generate the first captured image information 106 representing the captured image GS1.

The captured image GS1 contains an image GS11. The image GS11 is an image showing part of the screen SC. The image GS11 contains an image GV1. The image GV1 is an image showing the projection image GP1. The image GV1 contains a plurality of points. The plurality of points include a plurality of points DV1. The plurality of points DV1 are in one-to-one correspondence with the plurality of points DP1 contained in the projection image GP1. The plurality of points DV1 are further in one-to-one correspondence with the plurality of points DF1 contained in the image GF1. In FIG. 5, the plurality of points DV1 are points that fall within the range surrounded by the broken line.

Figure 6:
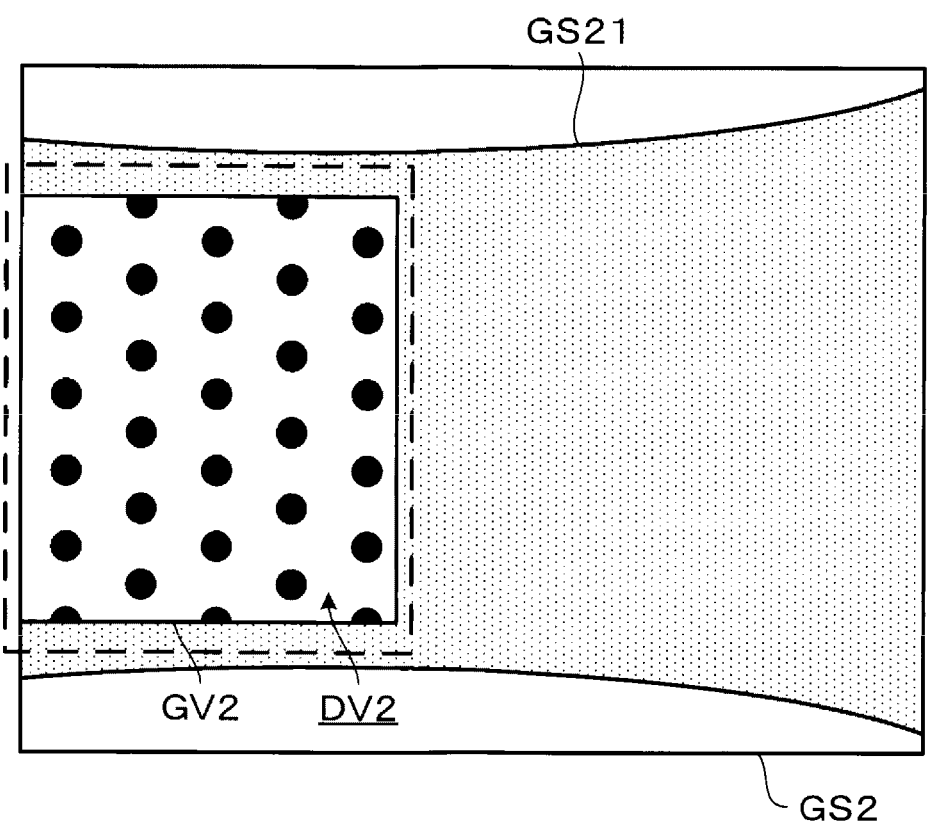
FIG. 6 is a diagrammatic view showing an example of an image indicated by second captured image information.

FIG. 6 is a diagrammatic view showing an example of the image indicated by the second captured image information 107. In the present embodiment, the second captured image information 107 represents a captured image GS2. The imaging apparatus 24 captures an image of the range containing the region R2, which is part of the screen SC and in which part of the projection image GP1 is displayed, to acquire the captured image GS2. In other words, the imaging apparatus 24 captures an image of the range containing the region R2, which is part of the screen SC and in which part of the projection image GP1 is displayed, to generate the second captured image information 107 representing the captured image GS2.

The captured image GS2 contains an image GS21. The image GS21 is an image showing part of the screen SC. The image GS21 contains an image GV2. The image GV2 is an image showing part of the projection image GP1 displayed in the region R3. The image GV2 contains a plurality of points DV2. The plurality of points DV2 are in one-to-one correspondence with the plurality of points DP1 contained in the projection image GP1. The plurality of points DV2 are further in one-to-one correspondence with the plurality of points DF1 contained in the image GF1. The plurality of points DV2 are still further in one-to-one correspondence with the plurality of points DV1 contained in the captured image GS1. In FIG. 6, the plurality of points DV2 are points that fall within the range surrounded by the broken line.

Referring back to FIG. 2, the processing apparatus 12 includes one or more CPUs. Note, however, that the processing apparatus 12 may include a programmable logic device, such as an FPGA, in place of or in addition to the CPU. The CPU is an abbreviation for a central processing unit, and FPGA is an abbreviation for a field-programmable gate array.

The processing apparatus 12 functions as the projection controller 120, the imaging controller 121, the image analyzer 122, and the restoration information generator 123 shown in FIG. 2 when the CPU or any other component provided in the processing apparatus 12 executes the program 100.

The projection controller 120 controls the projection apparatus to cause it to project projection light for displaying a projection image onto a projection surface of an object under the three-dimensional shape measurement. Specifically, the projection controller 120 causes the projection apparatus to project projection light based on projection image information to display a projection image on the projection surface.

In the present embodiment, the projection controller 120 controls the projection apparatus 16 to project projection light for displaying a projection image on the screen SC. Specifically, the projection controller 120 causes the projection apparatus 16 to project the projection light based on the first projection image information 103 to display the projection image GP1 on the screen SC. In other words, the projection controller 120 causes the projection apparatus 16 to project the image GF1 indicated by the first projection image information 103 to display the projection image GP1 on the screen SC.

The imaging controller 121 controls the imaging apparatus to cause it to capture an image of an object under three-dimensional shape measurement. The imaging controller 121 acquires a captured image used to measure the three-dimensional shape of the object from the imaging apparatus. The imaging controller 121 causes the storage apparatus 10 to store the captured image information 105 representing the acquired captured image.

In the present embodiment, the imaging controller 121 controls the imaging apparatus 14 to cause it to capture an image of the range containing the region R1, which is part of the screen SC and in which the projection image GP1 is displayed. That is, the imaging controller 121 controls the imaging apparatus 14 to cause it to capture an image of a range containing the region R3, which is part of the screen SC and in which part of the projection image GP1 is displayed. In other words, the imaging controller 121 controls the imaging apparatus 14 to cause it to capture an image of the plurality of points DP1 contained in the projection image GP1. The imaging controller 121 acquires the captured image GS1 representing the result of the image capture. The imaging controller 121 causes the storage apparatus 10 to store the first captured image information 106 representing the captured image GS1.

The imaging controller 121 controls the imaging apparatus 24 to cause it to capture an image of the range containing the region R2, which is part of the screen SC and in which part of the projection image GP1 is displayed. That is, the imaging controller 121 controls the imaging apparatus 24 to cause it to capture an image of the range containing the region R3, which is part of the screen SC and in which part of the projection image GP1 is displayed. In other words, the imaging controller 121 controls the imaging apparatus 24 to cause it to capture an image of the plurality of points DP1 contained in the projection image GP1. The imaging controller 121 acquires the captured image GS2 representing the result of the image capture. The imaging controller 121 causes the storage apparatus 10 to store the second captured image information 107 representing the captured image GS2.

The image analyzer 122 executes image processing on the images indicated by the variety of pieces of image information to detect the points contained in the images. That is, the image analyzer 122 acquires the coordinate information 130 representing the coordinates of the detected points. The image analyzer 122 causes the storage apparatus 10 to store the acquired coordinate information 130.

In the present embodiment, the image analyzer 122 performs image processing on the captured image GS1 indicated by the first captured image information 106 to detect the plurality of points contained in the captured image GS1. That is, the image analyzer 122 acquires the first coordinate information 131 representing the coordinates of the plurality of points contained in the captured image GS1. The image analyzer 122 causes the storage apparatus 10 to store the acquired first coordinate information 131. The first coordinate information 131 represents the coordinates of the plurality of points DV1.

The image analyzer 122 performs image processing on the captured image GS2 indicated by the second captured image information 107 to detect the plurality of points contained in the captured image GS2. That is, the image analyzer 122 acquires the second coordinate information 132 representing the coordinates of the plurality of points contained in the captured image GS2. The image analyzer 122 causes the storage apparatus 10 to store the acquired second coordinate information 132. The second coordinate information 132 represents the coordinates of the plurality of points DV2.

The image analyzer 122 performs image processing on the image GF1 indicated by the first projection image information 103 to detect the plurality of points contained in the image GF1. That is, the image analyzer 122 acquires the third coordinate information 134 representing the coordinates of the plurality of points contained in the image GF1. The image analyzer 122 causes the storage apparatus 10 to store the acquired third coordinate information 134. The third coordinate information 134 represents the coordinates of the plurality of points DF1.

Any known image processing technology may be used to provide the function of point detection. Examples of the known image processing technology for point detection may include template matching, centroid detection, and an algorithm called "AKAZE". No detailed technical description relating to the point detection will be made in the present specification.

The restoration information generator 123 generates the restoration information 110 representing the result of the measurement of the three-dimensional shape of the object based on the images indicated by the variety of pieces of image information. The restoration information generator 123 causes the storage apparatus 10 to store the generated restoration information 110.

In the present embodiment, the restoration information generator 123 generates the first restoration information 111 representing the Euclidean restoration result for the region R3 based on the captured image GS1 acquired by the imaging apparatus 14 having known internal parameters and the captured image GS2 acquired by the imaging apparatus 24 having known internal parameters. Specifically, the restoration information generator 123 generates the first restoration information 111 based on the first coordinate information 131 representing the coordinates of the plurality of points contained in the captured image GS1 and the second coordinate information 132 representing the coordinates of the plurality of points contained in the captured image GS2. The restoration information generator 123 causes the storage apparatus 10 to store the generated first restoration information 111.

The restoration information generator 123 further generates the second restoration information 112 representing the projection restoration result for the region R1 based on the captured image GS1 acquired by the imaging apparatus 14 having known internal parameters and the image GF1 projected from the projection apparatus 16 having unknown internal parameters. Specifically, the restoration information generator 123 generates the second restoration information 112 based on the first coordinate information 131 representing the coordinates of the plurality of points contained in the captured image GS1, and the third coordinate information 134 representing the coordinates of the plurality of points contained in the image GF1. The restoration information generator 123 causes the storage apparatus 10 to store the generated second restoration information 112.

The Euclidean restoration result and the projection restoration result may instead be generated, for example, by a known triangulation method utilizing epipolar geometry. Furthermore, triangulation may be performed by known external parameter estimation using essential matrix decomposition. The Euclidean restoration result and the projection restoration result may still instead be generated by known stereo matching. To perform stereo matching, a known stereo parallelization process may be carried out in advance.

The restoration information generator 123 generates a three-dimensional projective transformation matrix that transforms, based on the Euclidean restoration result for a certain region and the projection restoration result for the certain region, the projection restoration result into the Euclidean restoration result. The certain region is hereinafter referred to as a "contained region". The restoration information generator 123 generates the Euclidean restoration result for a region containing the contained region by using the three-dimensional projective transformation matrix to transform the projection restoration result for the region containing the contained region. The region containing the contained region is hereinafter referred to as a "containing region". The containing region may coincide with the contained region.

In the present embodiment, the restoration information generator 123 generates the three-dimensional projective transformation matrix 101, which transforms the projection restoration result for the region R3 into the Euclidean restoration result for the region R3 based on the first restoration information 111 representing the Euclidean restoration result for the region R3 and the second restoration information 112 representing the projection restoration result for the region R1. That is, the three-dimensional projective transformation matrix 101 transforms the coordinates of the plurality of points indicated by the second restoration information 112 into the coordinates of the plurality of points indicated by the first restoration information 111. The restoration information generator 123 causes the storage apparatus 10 to store the generated three-dimensional projective transformation matrix 101. The restoration information generator 123 generates the Euclidean restoration result for the region R1 by using the three-dimensional projective transformation matrix 101 to transform the projection restoration result for the region R1. In other words, the restoration information generator 123 generates the third restoration information 113 representing the Euclidean restoration result for the region R1 based on the second restoration information 112 and the three-dimensional projective transformation matrix 101. The restoration information generator 123 causes the storage apparatus 10 to store the generated third restoration information 113.

A three-dimensional projective transformation matrix for transforming a projection restoration result into a Euclidean restoration result is a matrix formed of four rows and four columns. For example, let $(x_S, y_S, z_S)$ be the coordinates of a point S indicated by the projection restoration result, $(x_E, y_E, z_E)$ be the coordinates of a point E indicated by the Euclidean restoration result and corresponding to the point 5, and a matrix H be a three-dimensional projective transformation matrix formed of four rows and four columns, the three-dimensional projective transformation that transforms the coordinates of the point S into the coordinates of the point E is expressed by Expression (1) below using homogeneous coordinates.

$$\begin{bmatrix} x_E \\ y_E \\ z_E \\ 1 \end{bmatrix} = H \begin{bmatrix} x_S \\ y_S \\ z_S \\ 1 \end{bmatrix} \qquad (1)$$

The elements of the matrix H are derived by applying Expression (1) to a certain set of a plurality of points corresponding to each other. To determine the elements of the matrix H, it is preferable that the number of point sets to which Expression (1) is applied is five or greater.

The imaging devices 140 and 240 are each, for example, an image sensor, such as a CCD or a CMOS device. CCD is an abbreviation for a charge coupled device, and CMOS is an abbreviation for complementary metal oxide semiconductor. The imaging devices 140 and 240 each have a plurality of pixels. The imaging apparatus 14 captures under the control of the imaging controller 121 an image of the range containing the region R1, which is part of the screen SC and in which the projection image GP1 is displayed. The imaging device 140 outputs the first captured image information 106, which represents the result of the capture of an image of the range containing the region R1, which is part of the screen SC and in which the projection image GP1 is displayed, to the processing apparatus 12. In other words, the imaging device 140 outputs the captured image GS1 indicated by the first captured image information 106 to the processing apparatus 12. The imaging apparatus 24 captures under the control of the imaging controller 121 an image of the range containing the region R2, which is part of the screen SC and in which part of the projection image GP1 is displayed. The imaging device 240 outputs the second captured image information 107, which represents the result of the capture of an image of the range containing the region R2, which is part of the screen SC and in which part of the projection image GP1 is displayed, to the processing apparatus 12. In other words, the imaging device 240 outputs the captured image GS2 indicated by the second captured image information 107 to the processing apparatus 12.

The light modulators 160 and 260 each include, for example, one or more DMDs or liquid crystal panels. The light modulators 160 and 260 each have a plurality of pixels. The light modulators 160 and 260 each modulate the light emitted from the light source into the projection light for displaying a projection image on the projection surface based on a signal input from the processing apparatus 12. The light source includes, for example, a halogen lamp, a xenon lamp, an ultrahigh-pressure mercury lamp, an LED, or a laser light source. LED is an abbreviation for light emitting diode, and DMD is an abbreviation for digital mirror device.

The projection apparatus 16 projects the projection light for displaying a projection image on the projection surface under the control of the projection controller 120. In other words, the projection apparatus 16 projects an image input from the processing apparatus 12 onto the projection surface. In the present embodiment, the projection apparatus 16 projects the projection light for displaying the projection image on the screen SC under the control of the projection controller 120. Specifically, the projection apparatus 16 projects the image GF1 input from the processing apparatus 12 onto the screen SC to display the projection image GP1 on the screen SC.

The internal parameters are specifically parameters relating to an optical system of an apparatus used to measure the shape of an object. More specifically, the internal parameters include parameters relating to a lens provided in an apparatus used to measure the shape of an object. For example, the internal parameters of the imaging apparatus 14 include parameters relating to the imaging lens 142 and parameters relating to the imaging device 140. The internal parameters of the imaging apparatus 24 include parameters relating to the imaging lens 242 and parameters relating to the imaging device 240. The internal parameters of the projection apparatus 16 include parameters relating to the projection lens 162 and parameters relating to the light modulator 160. The internal parameters of the projection apparatus 26 include parameters relating to the projection lens 262 and parameters relating to the light modulator 260.

The communication apparatus 18 includes, for example, an interface substrate including a connector and an interface circuit, and has the function of receiving a variety of kinds of information from an external terminal, an external storage apparatus, an external server, or any other component, and the function of transmitting a variety of kinds of information to the external terminal, the external storage apparatus, the external server, or any other component. The communication apparatus 18 may transmit and receive the variety of kinds of information by using wired communication, or may transmit and receive the variety of kinds of information by using wireless communication. When wireless communication is used, the communication apparatus 18 includes an antenna compatible with the wireless communication compliant with a predetermined communication standard. In the present embodiment, the communication apparatus 18 is communicably connected to the projector 2, and transmits and receives a variety of kinds of information to and from the projector 2.

1.3. Action of Measurement System

Figure 7:
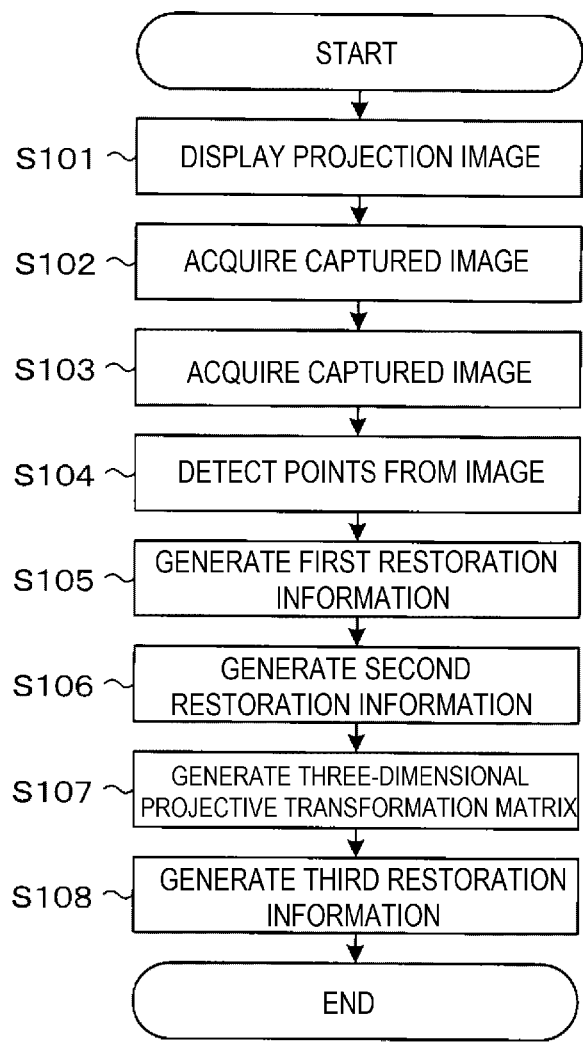
FIG. 7 is a flowchart for describing the action of the measurement system according to the first embodiment.

FIG. 7 is a flowchart for describing the action of the measurement system Sys according to the first embodiment. The series of actions shown in the flowchart starts, for example, when the projectors 1 and 2 are powered on and the projector 1 accepts input operation relating to the start of the actions from a user.

In step S101, the projection controller 120 causes the projection apparatus 16 to project the projection light based on the first projection image information 103 to display the projection image GP1 on the screen SC. In other words, the projection controller 120 causes the projection apparatus 16 to project the image GF1 indicated by the first projection image information 103 to display the projection image GP1 on the screen SC.

In step S102, the imaging controller 121 controls the imaging apparatus 14 to cause it to capture an image of the range containing the region R1, which is part of the screen SC and in which the projection image GP1 is displayed. That is, the imaging controller 121 controls the imaging apparatus 14 to cause it to capture an image of the plurality of points DP1 contained in the projection image GP1. The imaging controller 121 acquires the captured image GS1 representing the result of the image capture. The imaging controller 121 causes the storage apparatus 10 to store the first captured image information 106 representing the captured image GS1.

In step S103, the imaging controller 121 controls the imaging apparatus 24 to cause it to capture an image of the range containing the region R2, which is part of the screen SC and in which part of the projection image GP1 is displayed. That is, the imaging controller 121 controls the imaging apparatus 24 to cause it to capture an image of the plurality of points DP1 contained in the projection image GP1. The imaging controller 121 acquires the captured image GS2 representing the result of the image capture. The imaging controller 121 causes the storage apparatus 10 to store the second captured image information 107 representing the captured image GS2.

In step S104, the image analyzer 122 performs image processing on the captured image GS1 indicated by the first captured image information 106 to detect the plurality of points contained in the captured image GS1. That is, the image analyzer 122 acquires the first coordinate information 131 representing the coordinates of the plurality of points contained in the captured image GS1. The image analyzer 122 causes the storage apparatus 10 to store the acquired first coordinate information 131.

The image analyzer 122 performs image processing on the captured image GS2 indicated by the second captured image information 107 to detect the plurality of points contained in the captured image GS2. That is, the image analyzer 122 acquires the second coordinate information 132 representing the coordinates of the plurality of points contained in the captured image GS2. The image analyzer 122 causes the storage apparatus 10 to store the acquired second coordinate information 132.

The image analyzer 122 performs image processing on the image GF1 indicated by the first projection image information 103 to detect the plurality of points contained in the image GF1. That is, the image analyzer 122 acquires the third coordinate information 134 representing the coordinates of the plurality of points contained in the image GF1. The image analyzer 122 causes the storage apparatus 10 to store the acquired third coordinate information 134.

In step S105, the restoration information generator 123 generates the first restoration information 111 representing the Euclidean restoration result for the region R3 based on the captured image GS1 acquired by the imaging apparatus 14 having known internal parameters and the captured image GS2 acquired by the imaging apparatus 24 having known internal parameters. Specifically, the restoration information generator 123 generates the first restoration information 111 based on the first coordinate information 131 and the second coordinate information 132. The restoration information generator 123 causes the storage apparatus 10 to store the generated first restoration information 111.

In step S106, the restoration information generator 123 generates the second restoration information 112 representing the projection restoration result for the region R1 based on the captured image GS1 acquired by the imaging apparatus 14 having known internal parameters and the image GF1 projected from the projection apparatus 16 having unknown internal parameters. Specifically, the restoration information generator 123 generates the second restoration information 112 based on the first coordinate information 131 and the third coordinate information 134. The restoration information generator 123 causes the storage apparatus 10 to store the generated second restoration information 112.

In step S107, the restoration information generator 123 generates the three-dimensional projective transformation matrix 101, which transforms the projection restoration result for the region R3 into the Euclidean restoration result for the region R3 based on the first restoration information 111 representing the Euclidean restoration result for the region R3 and the second restoration information 112 representing the projection restoration result for the region R1. The restoration information generator 123 causes the storage apparatus 10 to store the generated three-dimensional projective transformation matrix 101.

In step S108, the restoration information generator 123 generates the Euclidean restoration result for the region R1 by using the three-dimensional projective transformation matrix 101 to transform the projection restoration result for the region R1. In other words, the restoration information generator 123 generates the third restoration information 113 representing the Euclidean restoration result for the region R1 based on the second restoration information 112 and the three-dimensional projective transformation matrix 101. The restoration information generator 123 causes the storage apparatus 10 to store the generated third restoration information 113.

Having carried out the process in step S108, the processing apparatus 12 terminates the series of actions shown in the flowchart of FIG. 7.

As described above, according to the first embodiment, the measurement system Sys can acquire the Euclidean restoration result for the region R1 of the screen SC by using the imaging apparatus 14 having known internal parameters, the imaging apparatus 24 having known internal parameters, and the projection apparatus 16 having unknown internal parameters. That is, the measurement system Sys can acquire the Euclidean restoration result for the region R1 excluding the region R3, which is outside the imaging range of the imaging apparatus 24, without performing calibration of the projection apparatus 16. In other words, the measurement system Sys can omit calibration of the projection apparatus 16 even when acquiring the Euclidean restoration result for the entire region R1.

As described above, the measurement method according to the first embodiment includes generating the first restoration information 111 representing the Euclidean restoration result for the region R3 of the screen SC, which is a non-planar surface, based on the captured image GS1, which is either an image input to the imaging apparatus 14 including the imaging lens 142 and having known internal parameters relating to the imaging lens 142 or an image output from the imaging apparatus 14, and the captured image GS2, which is either an image input to the imaging apparatus 24 including the imaging lens 242 and having known internal parameters relating to the imaging lens 242 or an image output from the imaging apparatus 24, generating the second restoration information 112 representing the projection restoration result for the region R1 of the screen SC based on the captured image GF1, which is either an image input to the projection apparatus 16 including the projection lens 162 and having unknown internal parameters relating to the projection lens 162 or an image output from the projection apparatus 16, and the captured image GS1, generating the three-dimensional projective transformation matrix 101 for transforming the coordinates of the plurality of points indicated by the second restoration information 112 into the coordinates of the plurality of points indicated by the first restoration information 111 based on the first restoration information 111 and the second restoration information 112, and generating the third restoration information 113 representing the Euclidean restoration result for the region R1 based on the second restoration information 112 and the three-dimensional projective transformation matrix 101, at least one of the imaging apparatus 14, the imaging apparatus 24, and the projection apparatus 16 being an imaging apparatus that captures an image of the screen SC, at least part of the region R3 and at least part of the region R1 overlapping with each other in the region R3.

The measurement system Sys according to the first embodiment includes the imaging apparatus 14 including the imaging lens 142 and having known internal parameters relating to the imaging lens 142, the imaging apparatus 24 including the imaging lens 242 and having known internal parameters relating to the imaging lens 242, the projection apparatus 16 including the projection lens 162 and having unknown internal parameters relating to the projection lens 162, and the processing apparatus 12, which generates the first restoration information 111 representing the Euclidean restoration result for the region R3 of the screen SC, which is a non-planar surface, based on the captured image GS1, which is either an image input to the imaging apparatus 14 or an image output from the imaging apparatus 14, and the captured image GS2, which is either an image input to the imaging apparatus 24 or an image output from the imaging apparatus 24, generates the second restoration information 112 representing the projection restoration result for the region R1 of the screen SC based on the image GF1, which is either an image input to the projection apparatus 16 or an image output from the projection apparatus 16, and the captured image GS1, generates the three-dimensional projective transformation matrix 101 for transforming the coordinates of the plurality of points indicated by the second restoration information 112 into the coordinates of the plurality of points indicated by the first restoration information 111 based on the first restoration information 111 and the second restoration information 112, and generates the third restoration information 113 representing the Euclidean restoration result for the region R1 based on the second restoration information 112 and the three-dimensional projective transformation matrix 101, at least one of the imaging apparatus 14, the imaging apparatus 24, and the projection apparatus 16 being an imaging apparatus that captures an image of the screen SC, at least part of the region R3 and at least part of the region R1 overlapping with each other in the region R3.

That is, the measurement system Sys can use the Euclidean restoration result for the region R3 acquired by using the apparatuses each having known internal parameters to transform the projection restoration result for the region R1 acquired by using the apparatus having unknown internal parameters into the Euclidean restoration result for the region R1. The measurement system Sys can thus omit calibration of the apparatus having unknown internal parameters even when acquiring the Euclidean restoration result for the region R1.

In the first embodiment, the measurement system Sys is an example of a "measurement system", the imaging lens 142 is an example of a "first lens", the imaging apparatus 14 is an example of a "first apparatus", the captured image GS1 is an example of a "first image", the imaging lens 242 is an example of a "second lens", the imaging apparatus 24 is an example of a "second apparatus", the captured image GS2 is an example of a "second image", the screen SC is an example of a "screen", the region R3 is an example of a "first region" and a "third region", the first restoration information 111 is an example of "first restoration information", the projection lens 162 is an example of a "third lens", the projection apparatus 16 is an example of a "third apparatus", the image GF1 is an example of a "third image", the region R1 is an example of a "second region", the second restoration information 112 is an example of "second restoration information", the three-dimensional projective transformation matrix 101 is an example of a "three-dimensional projective transformation matrix", the third restoration information 113 is an example of "third restoration information", and the processing apparatus 12 is an example of a "processing apparatus". The imaging apparatuses 14 and 24 exemplify an "imaging apparatus".

In the measurement method according to the first embodiment, one of the imaging apparatus 14 and the projection apparatus 16 is an imaging apparatus, the other one of the imaging apparatus 14 and the projection apparatus 16 is a projection apparatus that projects an image onto the screen SC, generating the second restoration information 112 includes projecting a first pattern image containing the plurality of points DF1 from the projection apparatus to display the projection image GP1 on the screen SC, controlling the imaging apparatus to cause it to acquire a first captured image showing the result of capture of an image of the plurality of points DP1 contained in the projection image GP1 and being in one-to-one correspondence with the plurality of points DF1, and generating the second restoration information 112 based on the first pattern image and the first captured image, the plurality of points DP1 are displayed in the region R3, when the imaging apparatus 14 is the imaging apparatus, the captured image GS1 is the first captured image, and the image GF1 is the first pattern image, and when the imaging apparatus 14 is the projection apparatus, the captured image GS1 is the first pattern image, and the image GF1 is the first captured image.

That is, the measurement system Sys can acquire the projection restoration result by using the combination of an imaging apparatus having known internal parameters and a projection apparatus having unknown internal parameters, or the combination of a projection apparatus having known internal parameters and an imaging apparatus having unknown internal parameters. The measurement system Sys can thus accurately measure the three-dimensional shape of an object even when one of the imaging apparatus and the projection apparatus has unknown internal parameters.

In the first embodiment, the plurality of points DF1 are an example of a "plurality of first points", the projection image GP1 is an example of a "first projection image", and the plurality of points DP1 are an example of a "plurality of second points". The projection apparatus 16 exemplifies a "projection apparatus". The image GF1 exemplifies the "first pattern image". The captured image GS1 exemplifies the "first captured image".

2. Second Embodiment

A second embodiment of the present disclosure will be described below. In the embodiments presented below by way of example, an element having the same effect and function as that in the first embodiment has the same reference character used in the description of the first embodiment, and no detailed description of the same element will be made as appropriate.

The second embodiment shows by way of example a measurement system including two imaging apparatuses each having known internal parameters and an imaging apparatus having unknown internal parameters, and describes the measurement method, the measurement system, and the information processing apparatus according to another aspect of the present disclosure. Specifically, the description will be given about a method of acquiring a Euclidean restoration result for a screen that is a non-planar surface by using the imaging apparatus having the unknown internal parameters without performing calibration of the imaging apparatus having unknown internal parameters.

Figure 8:
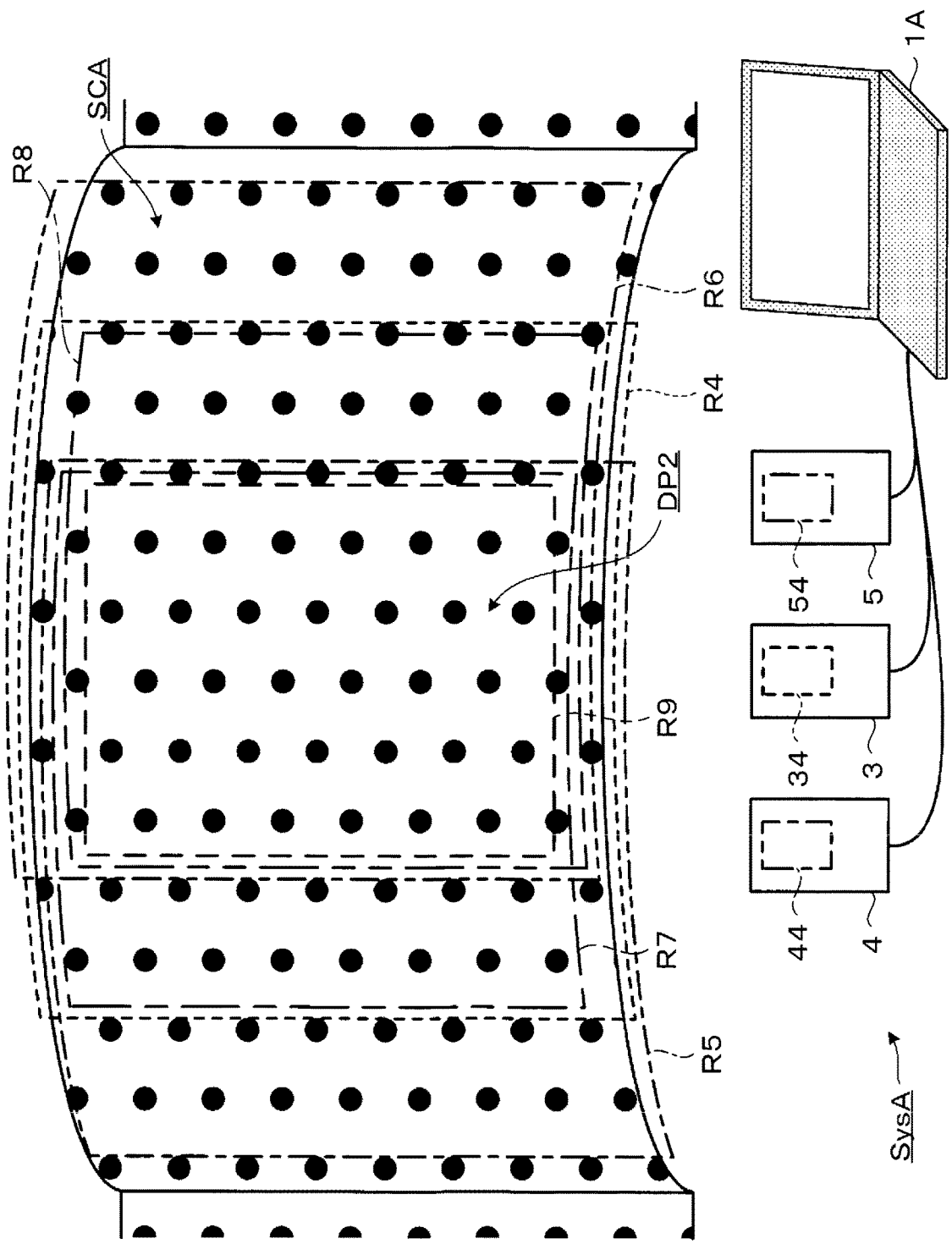
FIG. 8 is a diagrammatic view for describing an overview of the measurement system according to a second embodiment.

FIG. 8 is a diagrammatic view for describing an overview of a measurement system SysA according to the second embodiment. The measurement system SysA includes a computer 1A, and cameras 3, 4, and 5. The computer 1A is communicatively connected to the cameras 3, 4, and 5, and transmits and receives a variety of pieces of information to and from the cameras 3, 4, and 5. The camera 3 includes an imaging apparatus 34. The camera 4 includes an imaging apparatus 44. The camera 5 includes an imaging apparatus 54.

The imaging apparatus 34 captures an image of a range containing a region R4 of a screen SCA containing a plurality of points. The imaging apparatus 34 has known internal parameters.

The imaging apparatus 44 captures an image of a range containing a region R5 of the screen SCA containing the plurality of points. Part of the region R4 and part of the region R5 overlap with each other in a region R7. In other words, the regions R4 and R5 each include the region R7. That is, the region R7 falls within both the imaging range of the imaging apparatus 34 and the imaging range of the imaging apparatus 44. The imaging apparatus 44 has known internal parameters.

The imaging apparatus 54 captures an image of a range containing a region R6 of the screen SCA containing the plurality of points. Part of the region R4 and part of the region R6 overlap with each other in a region R8. In other words, the regions R4 and R6 each include the region R8. That is, the region R8 falls within both the imaging range of the imaging apparatus 34 and the imaging range of the imaging apparatus 54. Part of the region R7 and part of the region R8 overlap with each other in a region R9. In other words, the regions R7 and R8 each include the region R9. The imaging apparatus 54 has unknown internal parameters.

The plurality of points contained in the screen SCA include a plurality of points DP2. The plurality of points DP2 fall within the region R9. Note that the plurality of points are, for example, part of a pattern drawn on the screen SCA, a scratch, a seam, or the like of the screen SCA.

The computer 1A acquires the Euclidean restoration result for the region R7 based on the captured image acquired by the imaging apparatus 34 having known internal parameters and the captured image acquired by the imaging apparatus 44 having known internal parameters. The Euclidean restoration result for the region R7 includes the Euclidean restoration result for the region R9. The computer 1A acquires the projection restoration result for the region R8 based on the captured image acquired by the imaging apparatus 34 and the captured image acquired by the imaging apparatus 54 having unknown internal parameters. The projection restoration result for the region R8 includes the projection restoration result for the region R9. The computer 1A generates a three-dimensional projective transformation matrix that transforms the projection restoration result for the region R9 into the Euclidean restoration result for the region R9 based on the Euclidean restoration result for the region R7 and the projection restoration result for the region R8. The computer 1A generates the Euclidean restoration result for the region R8 by using the three-dimensional projective transformation matrix to transform the projection restoration result for the region R8.

That is, the measurement system SysA uses the imaging apparatus 34 having known internal parameters, the imaging apparatus 44 having known internal parameters, and the imaging apparatus 54 having unknown internal parameters to acquire the Euclidean restoration result for the region R8 of the screen SCA without performing calibration of the imaging apparatus 54. In other words, the measurement system SysA can acquire the Euclidean restoration result for the region R8, which is outside the imaging range of the imaging apparatus 44, in addition to the Euclidean restoration result for the region R7, which falls within both the imaging range of the imaging apparatus 34 and the imaging range of the imaging apparatus 44, by using the imaging apparatus 34 having known internal parameters, the imaging apparatus 44 having known internal parameters, and the imaging apparatus 54 having unknown internal parameters.

Figure 9:
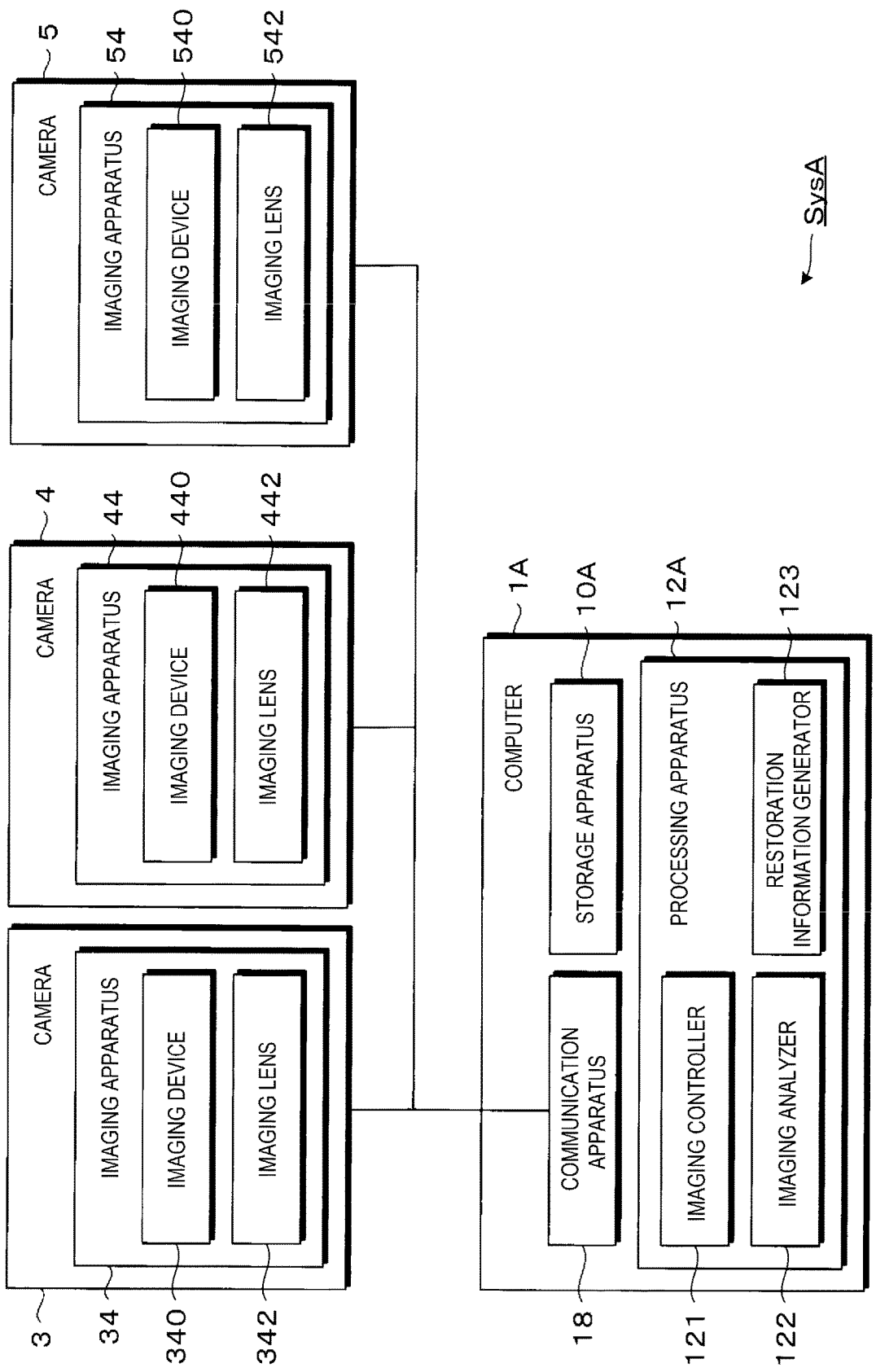
FIG. 9 is a block diagram showing the configuration of the measurement system according to the second embodiment.

FIG. 9 is a block diagram showing the configuration of the measurement system SysA according to the second embodiment. The measurement system SysA includes the computer 1A, and the cameras 3, 4, and 5, as described above. The camera 3 includes the imaging apparatus 34. The camera 4 includes the imaging apparatus 44. The camera 5 includes the imaging apparatus 54.

The computer 1A differs from the projector 1 according to the first embodiment in that the storage apparatus 10 is replaced with a storage apparatus 10A, that the processing apparatus 12 is replaced with a processing device 12A, and that the imaging apparatus 14 and the projection apparatus 16 are not provided. The processing apparatus 12A differs from the processing apparatus 12 in that it does not have the function as the projection controller 120.

The imaging apparatus 34 includes an imaging lens 342 for focusing, and an imaging device 340, which converts light focused by the imaging lens 342 into an electric signal to generate a captured image. The internal parameters of the imaging apparatus 34 include parameters relating to the imaging lens 342 and parameters relating to the imaging device 340.

The imaging apparatus 44 includes an imaging lens 442 for focusing, and an imaging device 440, which converts light focused by the imaging lens 442 into an electric signal to generate a captured image. The internal parameters of the imaging apparatus 44 include parameters relating to the imaging lens 442 and parameters relating to the imaging device 440.

The imaging apparatus 54 includes an imaging lens 542 for focusing, and an imaging device 540, which converts light focused by the imaging lens 542 into an electric signal to generate a captured image. The internal parameters of the imaging apparatus 54 include parameters relating to the imaging lens 542 and parameters relating to the imaging device 540.

Figure 10:
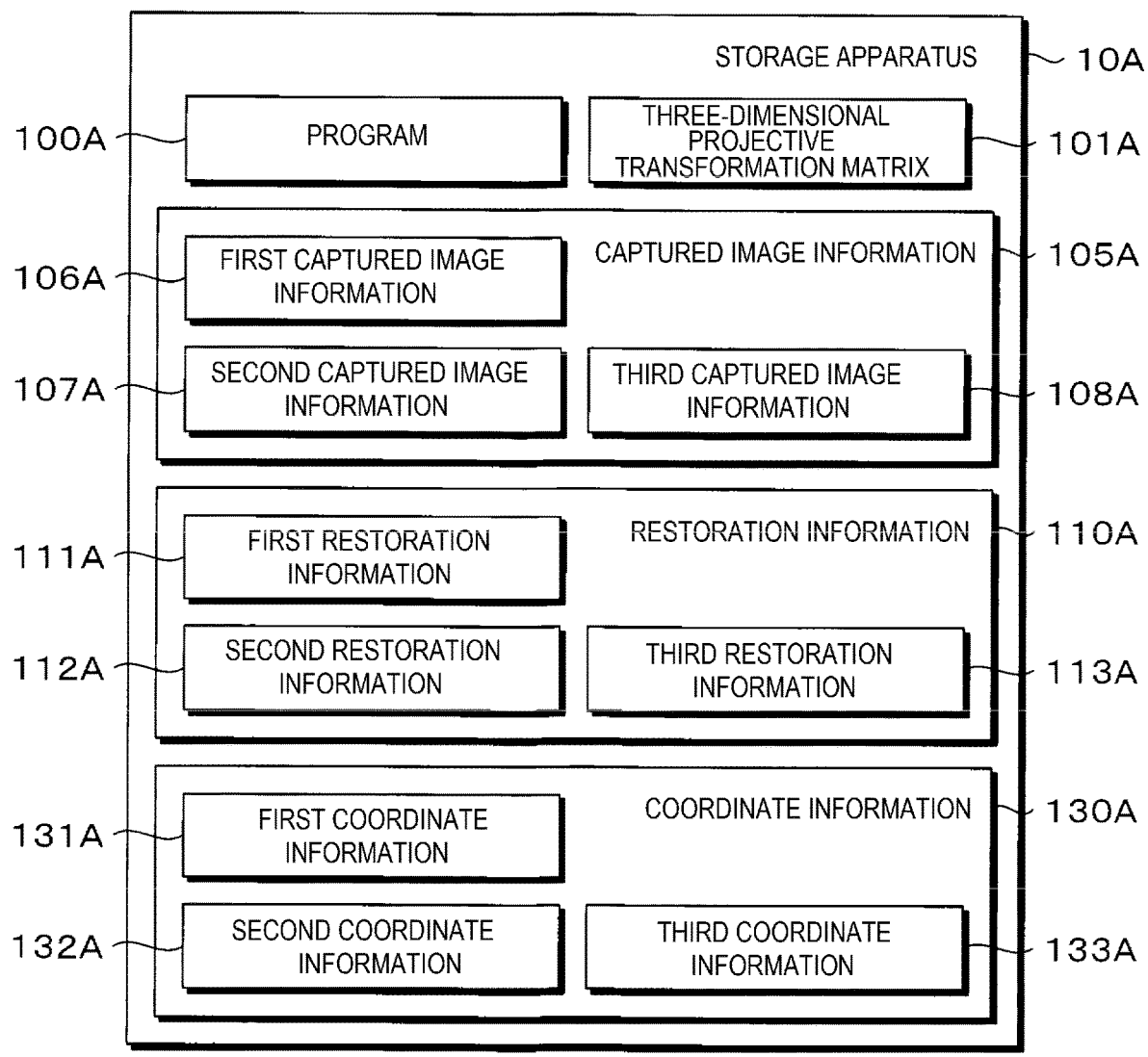
FIG. 10 is a block diagram showing the configuration of the storage apparatus according to the second embodiment.

FIG. 10 is a block diagram showing the configuration of the storage apparatus 10A according to the second embodiment. The storage apparatus 10A differs from the storage apparatus 10 in that it stores a program 100A in place of the program 100, that it stores a three-dimensional projective transformation matrix 101A in place of the three-dimensional projective transformation matrix 101, that it does not store the first projection image information 103, that it stores captured image information 105A in place of the captured image information 105, that it stores restoration information 110A in place of the restoration information 110, and that it stores coordinates information 130A in place of the coordinates information 130. The three-dimensional projective transformation matrix 101A is a matrix that is formed of four rows and four columns and transforms the projection restoration result for the region R9 into the Euclidean restoration result for the region R9.

The captured image information 105A includes first captured image information 106A representing the captured image acquired by the imaging apparatus 34, second captured image information 107A representing the captured image acquired by the imaging apparatus 44, and third captured image information 108A representing the captured image acquired by the imaging apparatus 54.

The restoration information 110A includes first restoration information 111A representing the Euclidean restoration result for the region R7, second restoration information 112A representing the projection restoration result for the region R8, and third restoration information 113A representing the Euclidean restoration result for the region R8.

The coordinate information 130A includes first coordinate information 131A representing the coordinates of the plurality of points contained in the image indicated by the first captured image information 106A, second coordinate information 132A representing the coordinates of the plurality of points contained in the image indicated by the second captured image information 107A, and third coordinate information 133A representing the coordinates of the plurality of points contained in the image indicated by the third captured image information 108A.

Figure 11:
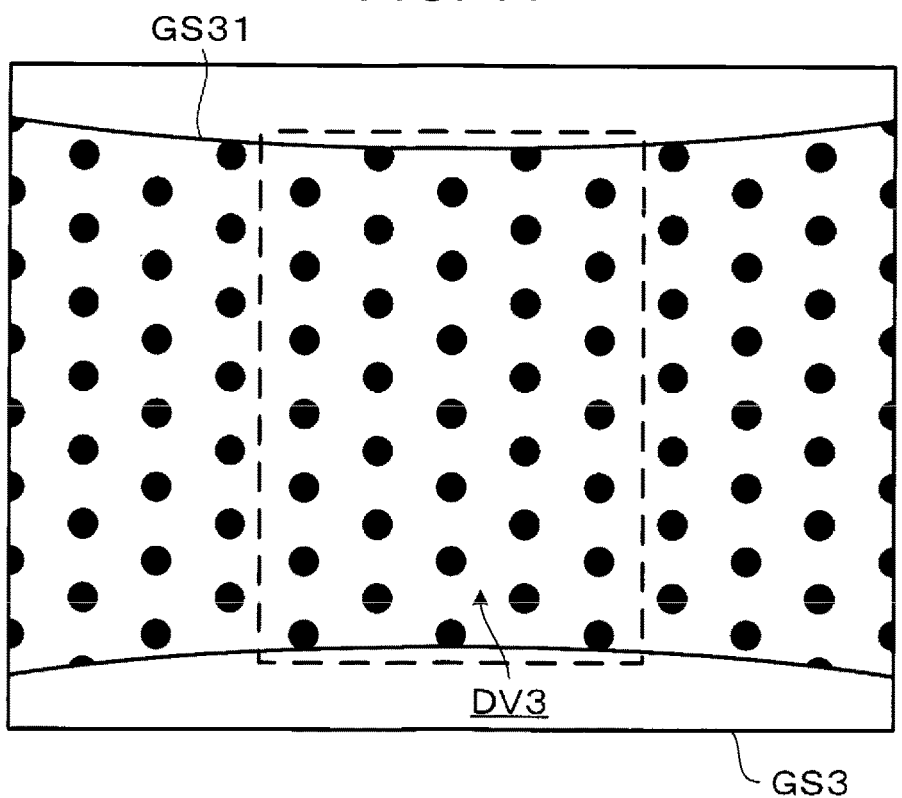
FIG. 11 is a diagrammatic view showing another example of the image indicated by the first captured image information.

FIG. 11 is a diagrammatic view showing an example of the image indicated by the first captured image information 106A. In the present embodiment, the first captured image information 106A represents a captured image GS3. The imaging apparatus 34 captures an image of the range containing the region R4 of the screen SCA to acquire the captured image GS3. In other words, the imaging apparatus 34 captures an image of the range containing the region R4 of the screen SCA to generate the first captured image information 106A representing the captured image GS3.

The captured image GS3 contains an image GS31. The image GS31 is an image showing part of the screen SCA. The image GS31 contains a plurality of points. The image GS31 contains a plurality of points. The plurality of points include a plurality of points DV3. The plurality of points DV3 are in one-to-one correspondence with the plurality of points DP2 contained in the region R9 of the screen SCA. In FIG. 11, the plurality of points DV3 are points that fall within the range surrounded by the broken line.

Figure 12:
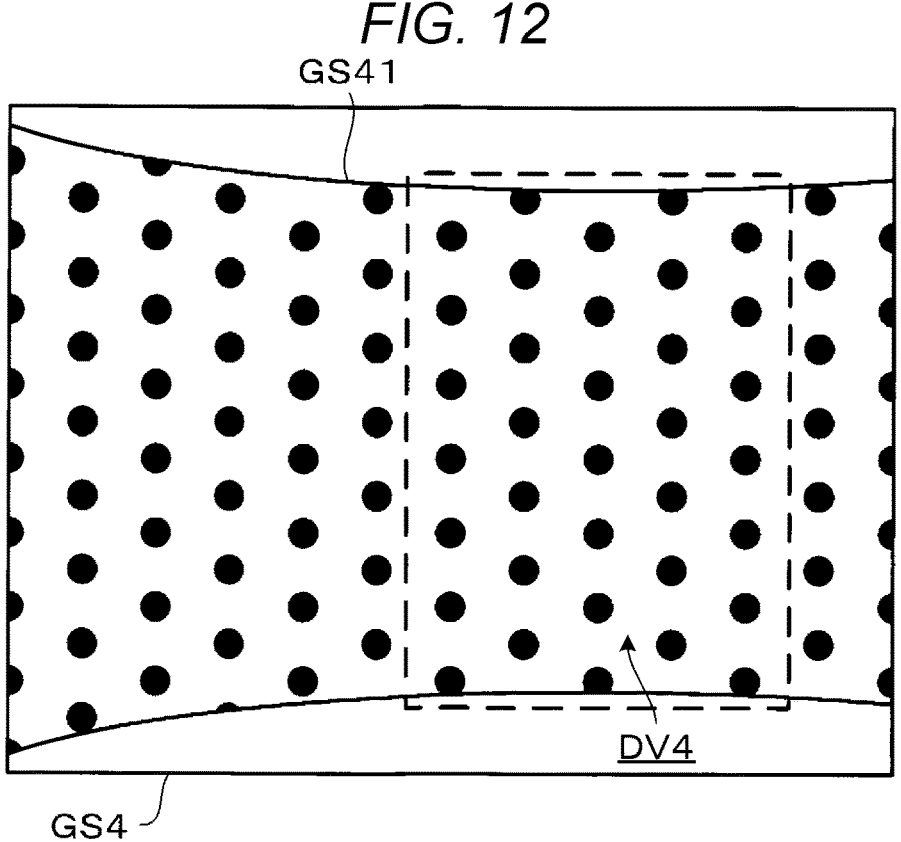
FIG. 12 is a diagrammatic view showing another example of the image indicated by the second captured image information.

FIG. 12 is a diagrammatic view showing an example of the image indicated by the second captured image information 107A. In the present embodiment, the second captured image information 107A represents a captured image GS4. The imaging apparatus 44 captures an image of the range containing the region R5 of the screen SCA to acquire the captured image GS4. In other words, the imaging apparatus 44 captures an image of the range containing the region R5 of the screen SCA to generate the second captured image information 107A representing the captured image GS4.

The captured image GS4 contains an image GS41. The image GS41 is an image showing part of the screen SCA. The image GS41 contains a plurality of points. The plurality of points include a plurality of points DV4. The plurality of points DV4 are in one-to-one correspondence with the plurality of points DP2 contained in the region R9 of the screen SCA. The plurality of points DV4 are further in one-to-one correspondence with the plurality of points DV3 contained in the captured image GS3. In FIG. 12, the plurality of points DV4 are points that fall within the range surrounded by the broken line.

Figure 13:
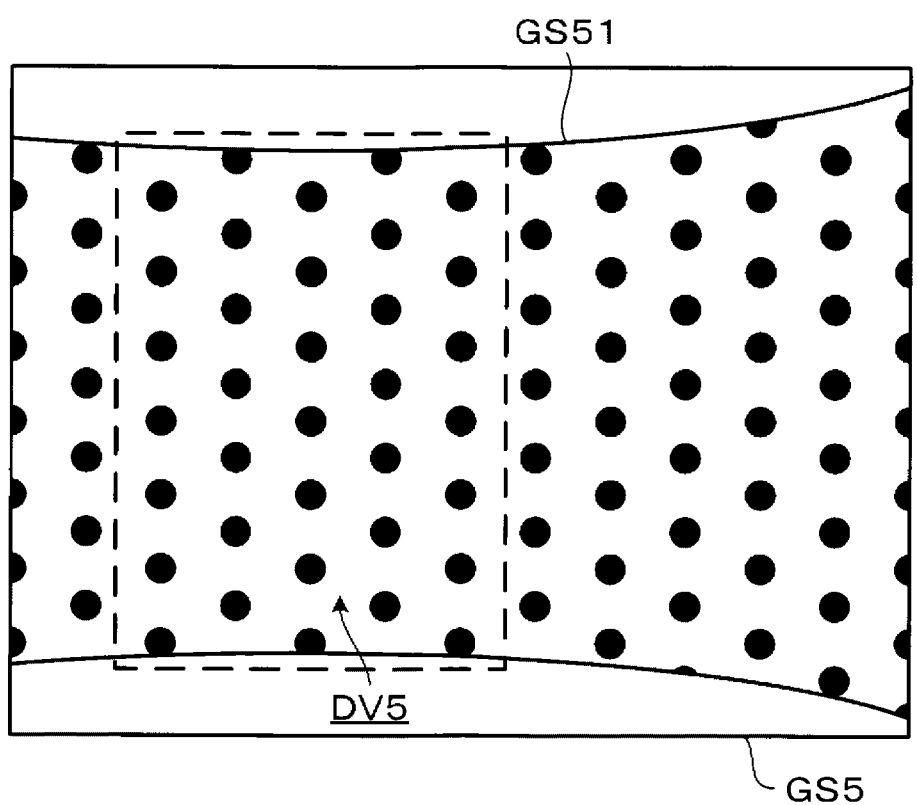
FIG. 13 is a diagrammatic view showing an example of the image indicated by third captured image information.

FIG. 13 is a diagrammatic view showing an example of the image indicated by the third captured image information 108A. In the present embodiment, the third captured image information 108A represents a captured image GS5. The imaging apparatus 54 captures an image of the range containing the region R6 of the screen SCA to acquire the captured image GS5. In other words, the imaging apparatus 54 captures an image of the range containing the region R6 of the screen SCA to generate the third captured image information 108A representing the captured image GS5.

The captured image GS5 contains an image GS51. The image GS51 is an image showing part of the screen SCA. The image GS51 contains a plurality of points. The plurality of points include a plurality of points DV5. The plurality of points DV5 are in one-to-one correspondence with the plurality of points DP2 contained in the region R9 of the screen SCA. The plurality of points DV5 are further in one-to-one correspondence with the plurality of points DV3 contained in the captured image GS3. The plurality of points DV5 are still further in one-to-one correspondence with the plurality of points DV4 contained in the captured image GS4. In FIG. 13, the plurality of points DV5 are points that fall within the range surrounded by the broken line.

Referring back to FIG. 9, the processing apparatus 12A functions as the imaging controller 121, the image analyzer 122, and the restoration information generator 123 shown in FIG. 9 when a CPU or any other component provided in the processing apparatus 12A executes the program 100A.

In the present embodiment, the imaging controller 121 controls the imaging apparatus 34 to cause it to capture an image of the range containing the region R4 of the screen SCA. That is, the imaging controller 121 controls the imaging apparatus 34 to cause it to capture an image of a range containing the region R9 of the screen SCA. In other words, the imaging controller 121 controls the imaging apparatus 34 to cause it to capture an image of the plurality of points DP2 contained in the region R9 of the screen SCA. The imaging controller 121 acquires the captured image GS3 representing the result of the image capture. The imaging controller 121 causes the storage apparatus 10A to store the first captured image information 106A representing the captured image GS3.

The imaging controller 121 controls the imaging apparatus 44 to cause it to capture an image of the range containing the region R5 of the screen SCA. That is, the imaging controller 121 controls the imaging apparatus 44 to cause it to capture an image of the range containing the region R9 of the screen SCA. In other words, the imaging controller 121 controls the imaging apparatus 44 to cause it to capture an image of the plurality of points DP2 contained in the region R9 of the screen SCA. The imaging controller 121 acquires the captured image GS4 representing the result of the image capture. The imaging controller 121 causes the storage apparatus 10A to store the second captured image information 107A representing the captured image GS4.

The imaging controller 121 controls the imaging apparatus 54 to cause it to capture an image of the range containing the region R6 of the screen SCA. That is, the imaging controller 121 controls the imaging apparatus 54 to cause it to capture an image of the range containing the region R9 of the screen SCA. In other words, the imaging controller 121 controls the imaging apparatus 54 to cause it to capture an image of the plurality of points DP2 contained in the region R9 of the screen SCA. The imaging controller 121 acquires the captured image GS5 representing the result of the image capture. The imaging controller 121 causes the storage apparatus 10A to store the third captured image information 108A representing the captured image GS5.

In the present embodiment, the image analyzer 122 performs image processing on the captured image GS3 indicated by the first captured image information 106A to detect the plurality of points contained in the captured image GS3. That is, the image analyzer 122 acquires the first coordinate information 131A representing the coordinates of the plurality of points contained in the captured image GS3. The image analyzer 122 causes the storage apparatus 10A to store the acquired first coordinate information 131A. The first coordinate information 131A represents the coordinates of the plurality of points DV3.

The image analyzer 122 performs image processing on the captured image GS4 indicated by the second captured image information 107A to detect the plurality of points contained in the captured image GS4. That is, the image analyzer 122 acquires the second coordinate information 132A representing the coordinates of the plurality of points contained in the captured image GS4. The image analyzer 122 causes the storage apparatus 10A to store the acquired second coordinate information 132A. The second coordinate information 132A represents the coordinates of the plurality of points DV4.

The image analyzer 122 performs image processing on the captured image GS5 indicated by the third captured image information 108A to detect the plurality of points contained in the captured image GS5. That is, the image analyzer 122 acquires the third coordinate information 133A representing the coordinates of the plurality of points contained in the captured image GS5. The image analyzer 122 causes the storage apparatus 10A to store the acquired third coordinate information 133A. The third coordinate information 133A represents the coordinates of the plurality of points DV5.

In the present embodiment, the restoration information generator 123 generates the first restoration information 111A representing the Euclidean restoration result for the region R7 based on the captured image GS3 acquired by the imaging apparatus 34 having known internal parameters and the captured image GS4 acquired by the imaging apparatus 44 having known internal parameters. Specifically, the restoration information generator 123 generates the first restoration information 111A based on the first coordinate information 131A representing the coordinates of the plurality of points contained in the captured image GS3 and the second coordinate information 132A representing the coordinates of the plurality of points contained in the captured image GS4. The restoration information generator 123 causes the storage apparatus 10A to store the generated first restoration information 111A.

The restoration information generator 123 further generates the second restoration information 112A representing the projection restoration result for the region R8 based on the captured image GS3 acquired by the imaging apparatus 34 having known internal parameters and the captured image GS5 acquired by the imaging apparatus 54 having unknown internal parameters. Specifically, the restoration information generator 123 generates the second restoration information 112A based on the first coordinate information 131A representing the coordinates of the plurality of points contained in the captured image GS3 and the third coordinate information 133A representing the coordinates of the plurality of points contained in the captured image GS5. The restoration information generator 123 causes the storage apparatus 10A to store the generated second restoration information 112A.

The restoration information generator 123 further generates the three-dimensional projective transformation matrix 101A, which transforms the projection restoration result for the region R9 into the Euclidean restoration result for the region R9 based on the first restoration information 111A representing the Euclidean restoration result for the region R7 and the second restoration information 112A representing the projection restoration result for the region R8. That is, the three-dimensional projective transformation matrix 101A transforms the coordinates of the plurality of points indicated by the second restoration information 112A into the coordinates of the plurality of points indicated by the first restoration information 111A. The restoration information generator 123 causes the storage apparatus 10A to store the generated three-dimensional projective transformation matrix 101A. The restoration information generator 123 further generates the Euclidean restoration result for the region R8 by using the three-dimensional projective transformation matrix 101A to transform the projection restoration result for the region R8. In other words, the restoration information generator 123 generates the third restoration information 113A representing the Euclidean restoration result for the region R8 based on the second restoration information 112A and the three-dimensional projective transformation matrix 101A. The restoration information generator 123 causes the storage apparatus 10A to store the generated third restoration information 113A.

The imaging devices 340, 440, 540 are each, for example, an image sensor such as a CCD or a CMOS device. The imaging apparatus 34 captures an image of the range containing the region R4 of the screen SC under the control of the imaging controller 121. The imaging device 340 outputs the first captured image information 106A, which represents the result of the capture of an image of the range containing the region R4 of the screen SC, to the processing apparatus 12A. In other words, the imaging device 340 outputs the captured image GS3 indicated by the first captured image information 106A to the processing apparatus 12A. The imaging apparatus 44 captures an image of the range containing the region R5 of the screen SC under the control of the imaging controller 121. The imaging device 440 outputs the second captured image information 107A, which represents the result of the capture of an image of the range containing the region R5 of the screen SC, to the processing apparatus 12A. In other words, the imaging device 440 outputs the captured image GS4 indicated by the second captured image information 107A to the processing apparatus 12A. The imaging apparatus 54 captures an image of the range containing the region R6 of the screen SC under the control of the imaging controller 121. The imaging device 540 outputs the third captured image information 108A, which represents the result of the capture of an image of the range containing the region R6 of the screen SC, to the processing apparatus 12A. In other words, the imaging device 540 outputs the captured image GS5 indicated by the third captured image information 108A to the processing apparatus 12A.

Figure 14:
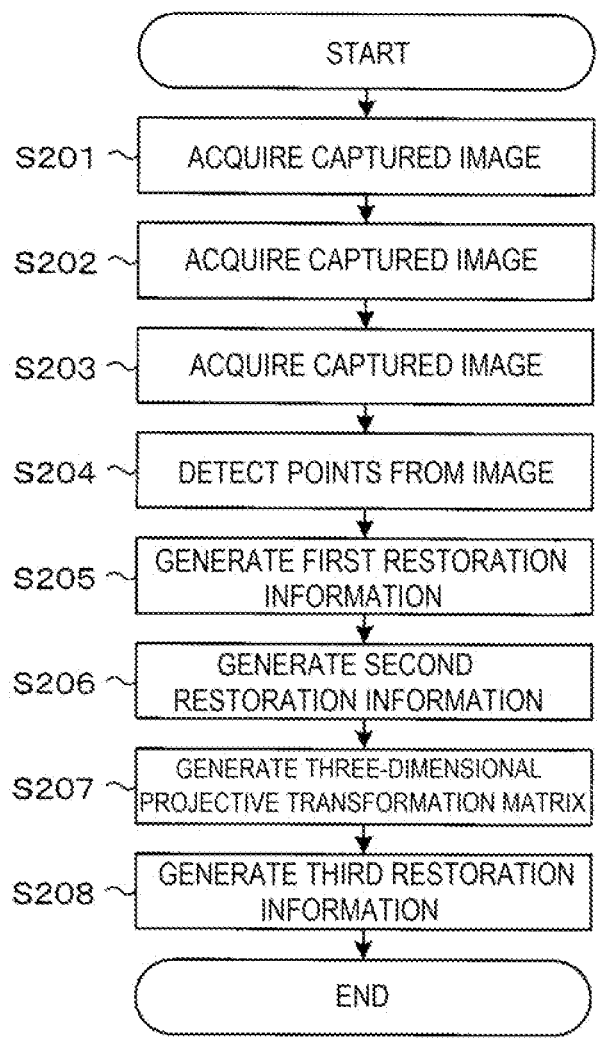
FIG. 14 is a flowchart for describing the action of the measurement system according to the second embodiment.

FIG. 14 is a flowchart for describing the action of the measurement system SysA according to the second embodiment. The series of actions shown in the flowchart starts, for example, when the computer 1A and the cameras 3, 4, and 5 are powered on and the computer 1A accepts input operation relating to the start of the actions from the user.

In step S201, the imaging controller 121 controls the imaging apparatus 34 to cause it to capture an image of the range containing the region R4 of the screen SCA. That is, the imaging controller 121 controls the imaging apparatus 34 to cause it to capture an image of the plurality of points DP2 contained in the region R9 of the screen SCA. The imaging controller 121 acquires the captured image GS3 representing the result of the image capture. The imaging controller 121 causes the storage apparatus 10A to store the first captured image information 106A representing the captured image GS3.

In step S202, the imaging controller 121 controls the imaging apparatus 44 to cause it to capture an image of the range containing the region R5 of the screen SCA. That is, the imaging controller 121 controls the imaging apparatus 44 to cause it to capture an image of the plurality of points DP2 contained in the region R9 of the screen SCA. The imaging controller 121 acquires the captured image GS4 representing the result of the image capture. The imaging controller 121 causes the storage apparatus 10A to store the second captured image information 107A representing the captured image GS4.

In step S203, the imaging controller 121 controls the imaging apparatus 54 to cause it to capture an image of the range containing the region R6 of the screen SCA. That is, the imaging controller 121 controls the imaging apparatus 54 to cause it to capture an image of the plurality of points DP2 contained in the region R9 of the screen SCA. The imaging controller 121 acquires the captured image GS5 representing the result of the image capture. The imaging controller 121 causes the storage apparatus 10A to store the third captured image information 108A representing the captured image GS5.

In step S204, the image analyzer 122 performs image processing on the captured image GS3 indicated by the first captured image information 106A to detect the plurality of points DS contained in the captured image GS3. That is, the image analyzer 122 acquires the first coordinate information 131A representing the coordinates of the plurality of points contained in the captured image GS3. The image analyzer 122 causes the storage apparatus 10A to store the acquired first coordinate information 131A.

The image analyzer 122 performs image processing on the captured image GS4 indicated by the second captured image information 107A to detect the plurality of points contained in the captured image GS4. That is, the image analyzer 122 acquires the second coordinate information 132A representing the coordinates of the plurality of points contained in the captured image GS4. The image analyzer 122 causes the storage apparatus 10A to store the acquired second coordinate information 132A.

The image analyzer 122 performs image processing on the captured image GS5 indicated by the third captured image information 108A to detect the plurality of points contained in the captured image GS5. That is, the image analyzer 122 acquires the third coordinate information 133A representing the coordinates of the plurality of points contained in the captured image GS5. The image analyzer 122 causes the storage apparatus 10A to store the acquired third coordinate information 133A.

In step S205, the restoration information generator 123 generates the first restoration information 111A representing the Euclidean restoration result for the region R7 based on the captured image GS3 acquired by the imaging apparatus 34 having known internal parameters and the captured image GS4 acquired by the imaging apparatus 44 having known internal parameters. Specifically, the restoration information generator 123 generates the first restoration information 111A based on first coordinate information 131A and the second coordinate information 132A. The restoration information generator 123 causes the storage apparatus 10A to store the generated first restoration information 111A.

In step S206, the restoration information generator 123 generates the second restoration information 112A representing the projection restoration result for the region R8 based on the captured image GS3 acquired by the imaging apparatus 34 having known internal parameters and the captured image GS5 acquired by the imaging apparatus 54 having unknown internal parameters. Specifically, the restoration information generator 123 generates the second restoration information 112A based on the first coordinate information 131A and the third coordinate information 133A. The restoration information generator 123 causes the storage apparatus 10A to store the generated second restoration information 112A.

In step S207, the restoration information generator 123 generates the three-dimensional projective transformation matrix 101A, which transforms the projection restoration result for the region R9 into the Euclidean restoration result for the region R9, based on the first restoration information 111A representing the Euclidean restoration result for the region R7 and the second restoration information 112A representing the projection restoration result for the region R8. The restoration information generator 123 causes the storage apparatus 10A to store the generated three-dimensional projective transformation matrix 101A.

In step S208, the restoration information generator 123 generates the Euclidean restoration result for the region R8 by using the three-dimensional projective transformation matrix 101A to transform the projection restoration result for the region R8. In other words, the restoration information generator 123 generates the third restoration information 113A representing the Euclidean restoration result for the region R8 based on the second restoration information 112A and the three-dimensional projective transformation matrix 101A. The restoration information generator 123 causes the storage apparatus 10A to store the generated third restoration information 113A.

Having carried out the process in step S208, the processing apparatus 12A terminates the series of actions shown in the flowchart of FIG. 14.

As described above, according to the second embodiment, the measurement system SysA can acquire the Euclidean restoration result for the region R8 of the screen SCA by using the imaging apparatus 34 having known internal parameters, the imaging apparatus 44 having known internal parameters, and the imaging apparatus 54 having unknown internal parameters. That is, the measurement system SysA can acquire the Euclidean restoration result for the region R8 excluding the region R9, which is outside the imaging range of the imaging apparatus 44, without performing calibration of the imaging apparatus 54. In other words, the measurement system SysA can omit calibration of the imaging apparatus 54 even when acquiring the Euclidean restoration result for the entire region R8.

As described above, the computer 1A according to the second embodiment includes the processing apparatus 12A, which generates the first restoration information 111A representing the Euclidean restoration result for the region R7 of the screen SCA, which is a non-planar surface, based on the captured image GS3, which is either an image input to the imaging apparatus 34 including the imaging lens 342 and having known internal parameters relating to the imaging lens 342 or an image output from the imaging apparatus 34, and the captured image GS4, which is either an image input to the imaging apparatus 44 including the imaging lens 442 and having known internal parameters relating to the imaging lens 442 or an image output from the imaging apparatus 44, generates the second restoration information 112A representing the projection restoration result for the region R8 of the screen SC based on the captured image GS5, which is either an image input to the imaging apparatus 54 including the imaging lens 542 and having unknown internal parameters relating to the imaging lens 542 or an image output from the imaging apparatus 54, and the captured image GS3, generates the three-dimensional projective transformation matrix 101A for transforming the coordinates of the plurality of points indicated by the second restoration information 112A into the coordinates of the plurality of points indicated by the first restoration information 111A based on the first restoration information 111A and the second restoration information 112A, and generates the third restoration information 113A representing the Euclidean restoration result for the region R8 based on the second restoration information 112A and the three-dimensional projective transformation matrix 101A, at least one of imaging apparatuses 34, 44, and 54 being an imaging apparatus that captures an image of the screen SCA, at least part of the region R7 and at least part of the region R8 overlapping with each other in the region R9.

That is, the measurement system SysA can transform the projection restoration result for the region R8 acquired by using an apparatus having unknown internal parameters into the Euclidean restoration result for the region R8 by using the Euclidean restoration result for the region R7 acquired by using the apparatuses each having known internal parameters. The measurement system SysA can thus omit calibration of the apparatus having unknown internal parameters even when acquiring the Euclidean restoration result for the region R8.

In the second embodiment, the computer 1A is an example of an "information processing apparatus", the processing apparatus 12A is an example of the "processing apparatus", the measurement system SysA is an example of the "measurement system", the imaging lens 342 is an example of the "first lens", the imaging apparatus 34 is an example of the "first apparatus", the captured image GS3 is an example of the "first image", the imaging lens 442 is an example of the "second lens", the imaging apparatus 44 is an example of the "second apparatus", the captured image GS4 is an example of the "second image", the screen SCA is an example of the "screen", the region R7 is an example of the "first region", the first restoration information 111A is an example of the "first restoration information", the imaging lens 542 is an example of the "third lens", the imaging apparatus 54 is an example of the "third apparatus", the captured image GS5 is an example of the "third image", the region R8 is an example of the "second region", the second restoration information 112A is an example of the "second restoration information", the three-dimensional projective transformation matrix 101A is an example of the "three-dimensional projective transformation matrix", the third restoration information 113A is an example of the "third restoration information", and the region R9 is an example of the "third region". The imaging apparatuses 34, 44, and 54 exemplify the "imaging apparatus".

In the measurement method according to the second embodiment, the imaging apparatuses 34 and 54 are each an imaging apparatus, the region R9 contains the plurality of point DP2, generating the second restoration information 112A includes controlling the imaging apparatus 34 to acquire a second captured image representing the result of the capture of an image of the plurality of points DP2, controlling the imaging apparatus 54 to acquire a third captured image representing the result of the capture of an image of the plurality of points DP2, and generating the second restoration information 112A based on the second and third captured images, the captured image GS3 is the second captured image, and the captured image GS5 is the third captured image.

That is, the measurement system SysA can acquire a projection restoration result by using the combination of an imaging apparatus having known internal parameters and an imaging apparatus having unknown internal parameters. The measurement system SysA can thus accurately measure the three-dimensional shape of an object even when any one of the plurality of imaging apparatuses has unknown internal parameters.

In the second embodiment, the plurality of points DP2 are an example of a "plurality of third points". The captured image GS3 exemplifies a "second captured image". The captured image GS5 exemplifies a "third captured image".

In the measurement method according to the second embodiment, the imaging apparatuses 34 and 44 are each an imaging apparatus, the region R9 contains the plurality of points DP2, generating the first restoration information 111A includes controlling the imaging apparatus 34 to acquire a second captured image representing the result of the capture of an image of the plurality of points DP2, controlling the imaging apparatus 44 to acquire a sixth captured image representing the result of the capture of an image of the plurality of points DP2, and generating the first restoration information 111A based on the second and sixth captured images, the captured image GS3 is the second captured image, and the captured image GS4 is the sixth captured image.

That is, the measurement system SysA can acquire a Euclidean restoration result by using the combination of two imaging apparatuses each having known internal parameters. The measurement system SysA can thus accurately measure the three-dimensional shape of an object.

In the second embodiment, the captured image GS4 exemplifies the "sixth captured image".

3. Third Embodiment

A third embodiment of the present disclosure will be described below. In the aspects presented below by way of example, an element having the same effect and function as those in the second embodiment has the same reference character used in the description of the second embodiment, and no detailed description of the same element will be made as appropriate.

The third embodiment shows by way of example a measurement system including a projection apparatus having known internal parameters, an imaging apparatus having known internal parameters, and a projection apparatus having unknown internal parameters, and describes the measurement method, the measurement system, and the information processing apparatus according to another aspect of the present disclosure. Specifically, a method of acquiring a Euclidean restoration result for a screen that is a non-planar surface by using a projection apparatus having unknown internal parameters without performing calibration of the projection apparatus having unknown internal parameters will be described.

Figure 15:
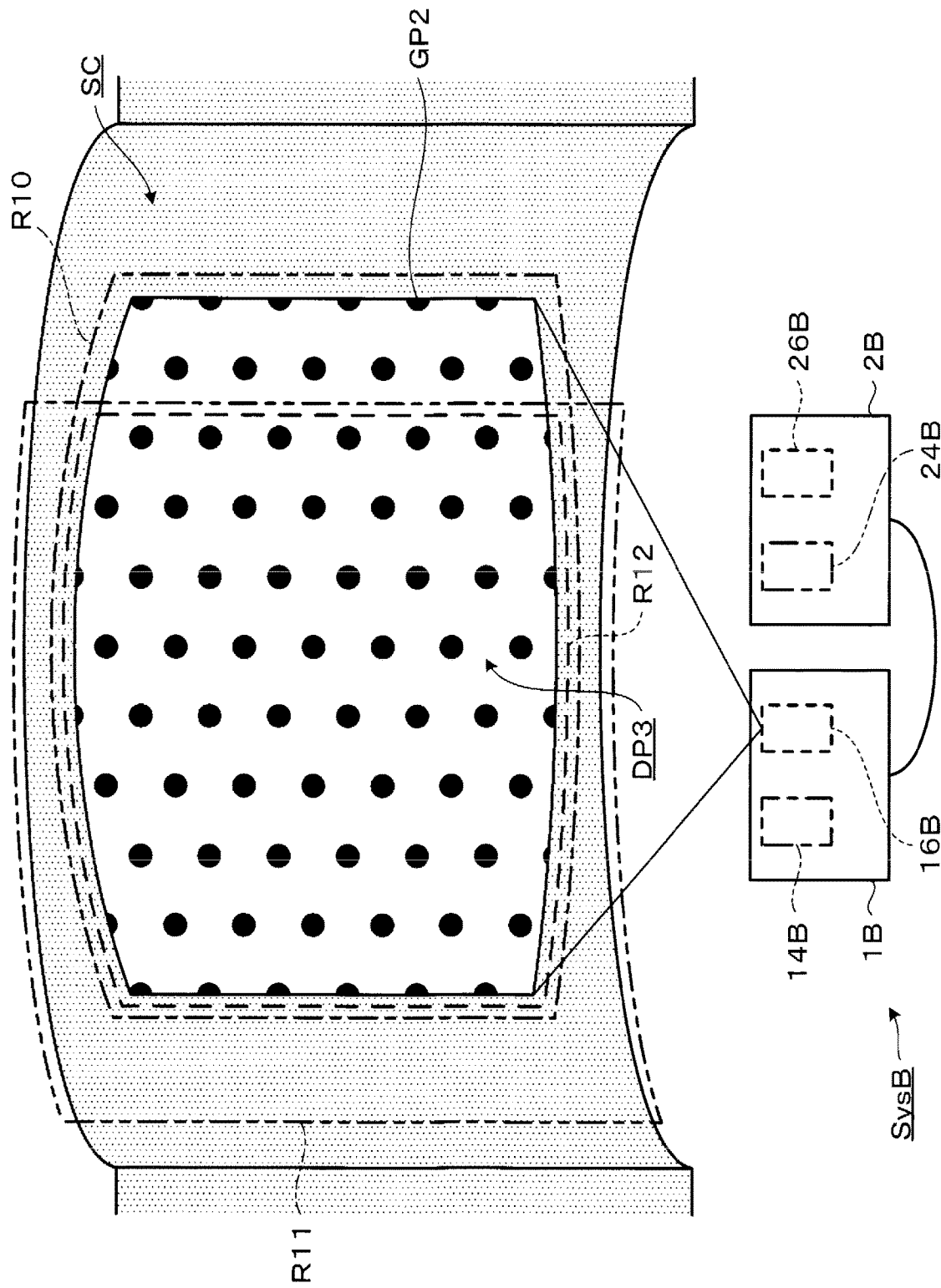
FIG. 15 is a diagrammatic view showing how a projection image is displayed in a third embodiment.
Figure 16:
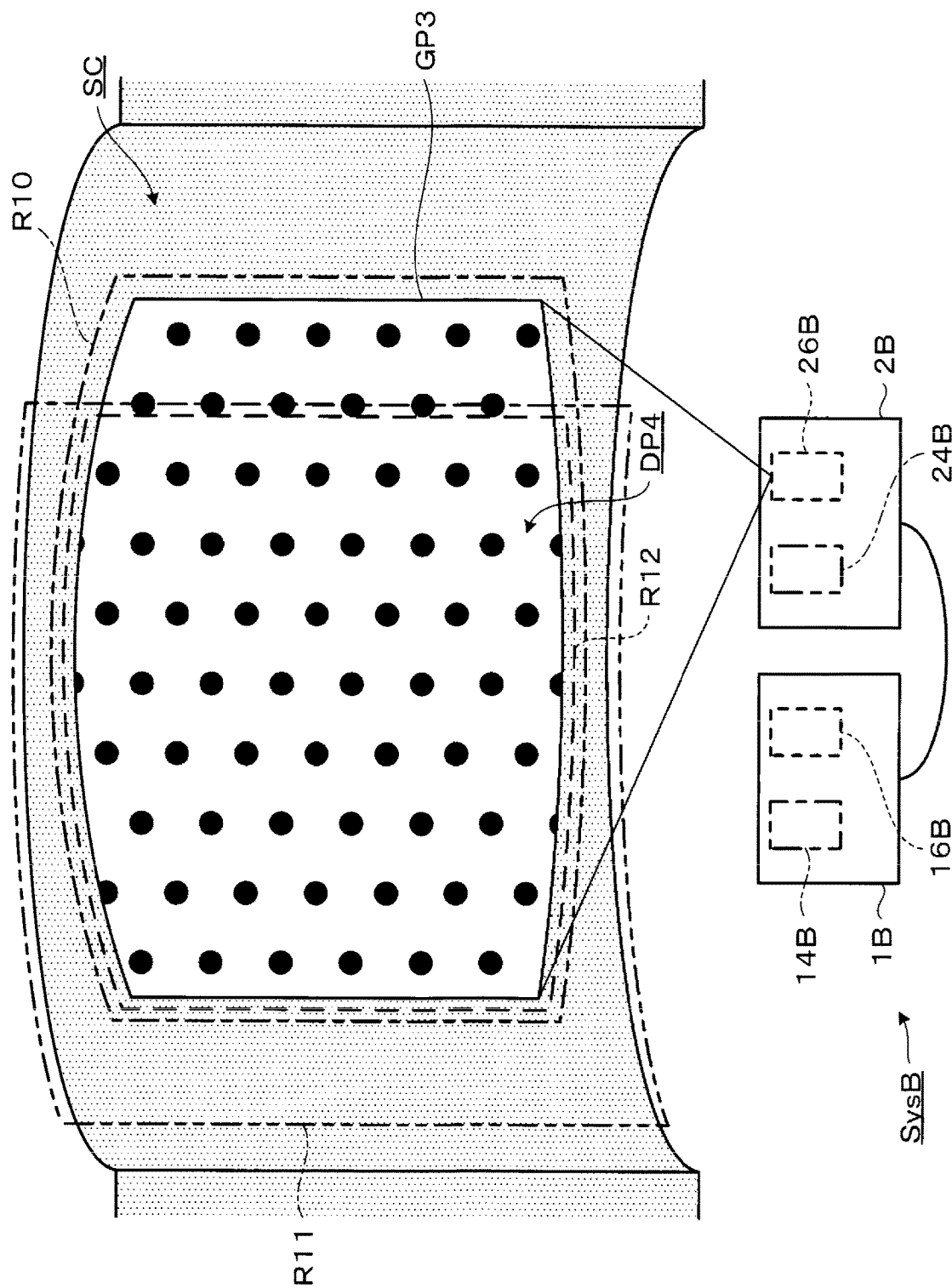
FIG. 16 is a diagrammatic view showing how another projection image is displayed in the third embodiment.

An overview of a measurement system SysB according to the third embodiment will be described below with reference to FIGS. 15 and 16. FIG. 15 is a diagrammatic view showing how a projection image GP2 is displayed in the third embodiment. FIG. 16 is a diagrammatic view showing how a projection image GP3 is displayed in the third embodiment. The measurement system SysB includes a projector 1B and a projector 2B. The projector 1B is communicably connected to the projector 2B, and transmits and receives a variety of pieces of information to and from the projector 2B. The projector 1B includes an imaging apparatus 14B and a projection apparatus 16B. The projector 2B includes an imaging apparatus 24B and a projection apparatus 26B.

The projection apparatus 16B projects an image onto the screen SC, which is a non-planar surface, to display the projection image GP2 on the screen SC. The projection image GP2 contains a plurality of points. The plurality of points include a plurality of points DP3. The projection apparatus 16B has known internal parameters.

The projection apparatus 26B projects an image onto the screen SC, which is a non-planar surface, to display the projection image GP3 on the screen SC. The projection image GP3 contains a plurality of points. The plurality of points include a plurality of points DP4. The projection apparatus 26B has unknown internal parameters. The projection images GP2 and GP3 are displayed in a region R10 of the screen SC.

The imaging apparatus 14B captures an image of a range containing a region R11 of the screen SC. The imaging apparatus 14B further captures an image of at least part of the projection image GP2 displayed on the screen SC by the projection apparatus 16B. The imaging apparatus 14B still further captures an image of at least part of the projection image GP3 displayed on the screen SC by the projection apparatus 26B. The imaging apparatus 14B has known internal parameters.

Part of the region R10 and part of the region R11 overlap with each other in a region R12. In other words, the regions R10 and R11 each include the region R12. That is, when the projection apparatus 16B projects an image onto the screen SC, part of the projection image GP2 is displayed in the region R12. The plurality of points DP3 fall within the region R12. When the projection apparatus 26B projects an image onto screen SC, part of the projection image GP3 is displayed in the region R12. The plurality of points DP4 fall within the region R12.

The projection apparatus 16B projects an image GF2, which will be described later, onto the screen SC to display the projection image GP2 on the screen SC. The imaging apparatus 14B captures an image of the range containing the region R11 which is part of the screen SC and in which part of the projection image GP2 is displayed. The projection apparatus 26B specifically projects an image GF3, which will be described later, onto the screen SC to display the projection image GP3 on the screen SC. The imaging apparatus 14B captures an image of the range including the region R11 which is part of the screen SC and in which part of the projection image GP3 is displayed.

The projector 1B acquires the projection restoration result for the region R12 based on the image GF2 projected from the projection apparatus 16B having known internal parameters, a captured image representing the result of capture of part of the projection image GP2 displayed on the screen SC as a result of the projection of the image GF2, the image GF3 projected from the projection apparatus 26B having unknown internal parameters, and a captured image representing the result of capture of part of the projection image GP3 displayed on the screen SC as a result of the projection of the image GF3. The projector 1B further acquires the Euclidean restoration result for the region R12 based on the image GF2 projected from the projection apparatus 16B having known internal parameters, and a captured image that is acquired by the imaging apparatus 14B having known internal parameters and represents the result of the capture of an image of part of the image GP2 displayed on the screen SC as a result of the projection of the image GF2. The projector 1B generates a three-dimensional projective transformation matrix that transforms the projection restoration result for the region R12 into the Euclidean restoration result for the region R12 based on the Euclidean restoration result for the region R12 and the projection restoration result for the region R12. The projector 1B further generates the Euclidean restoration result for the region R12 by using the three-dimensional projective transformation matrix to transform the projection restoration result for the region R12.

That is, the measurement system SysB, using the projection apparatus 16B having known internal parameters, the imaging apparatus 14B having known internal parameters, and the projection apparatus 26B having unknown internal parameters, can acquire the Euclidean restoration result for the region R12 of the screen SC without performing calibration of the projection apparatus 26B. In other words, the measurement system SysB uses the projection apparatus 16B having known internal parameters, the imaging apparatus 14B having known internal parameters, and the projection apparatus 26B having unknown internal parameters to acquire the Euclidean restoration result for the region R12, which falls within the imaging range of the imaging apparatus 14B.

Figure 17:
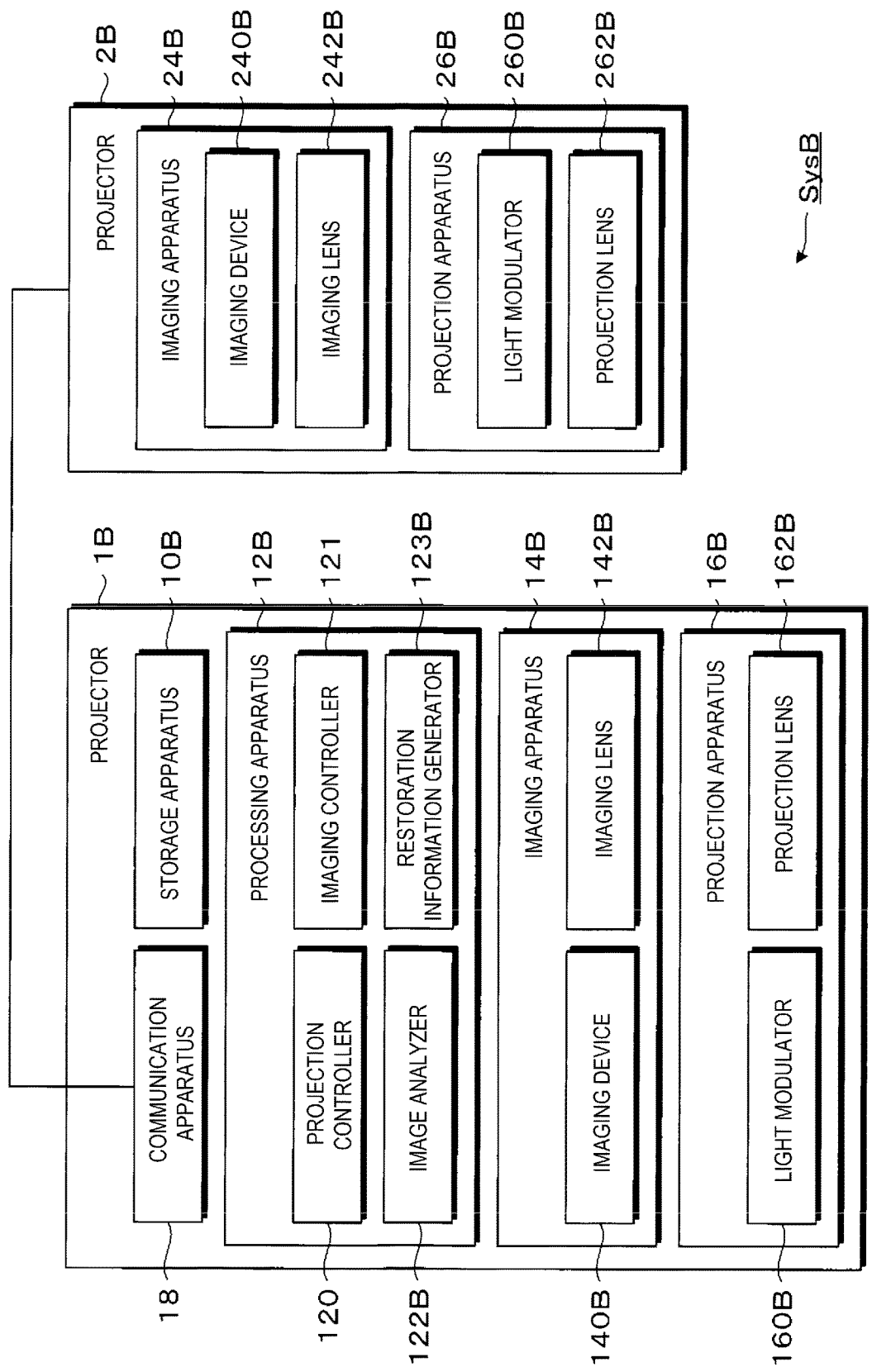
FIG. 17 is a block diagram showing the configuration of the measurement system according to the third embodiment.

FIG. 17 is a block diagram showing the configuration of the measurement system SysB according to the third embodiment. The measurement system SysB includes the projector 1B and the projector 2B, as described above.

The projector 1B is configured in the same manner as the projector 1 except that the storage apparatus 10 is replaced with a storage apparatus 10B, that the processing apparatus 12 is replaced with a processing apparatus 12B, that the imaging apparatus 14 is replaced with the imaging apparatus 14B, and that the projection apparatus 16 is replaced with the projection apparatus 16B.

The processing apparatus 12B is configured in the same manner as the processing apparatus 12 except that it has the function as an image analyzer 122B in place of the image analyzer 122, and the function as a restoration information generator 123B in place of the restoration information generator 123.

The imaging apparatus 14B is configured in the same manner as the imaging apparatus 14 except that the imaging device 140 is replaced with an imaging device 140B, and that the imaging lens 142 is replaced with an imaging lens 142B. The imaging device 140B generates a captured image by converting the light focused by the imaging lens 142B into an electric signal. The imaging apparatus 14B captures under the control of the imaging controller 121 an image of the range containing the region R11 which is part of the screen SC and in which part of the projection image GP2 is displayed. The imaging device 140B outputs first captured image information 106B, which represents the result of the capture of an image of the range containing the region R11 which is part of the screen SC and in which part of the projection image GP2 is displayed, to the processing apparatus 12B. In other words, the imaging device 140B outputs a captured image GS6 indicated by the first captured image information 106B to the processing apparatus 12B. The imaging apparatus 14B further captures under the control of the imaging controller 121 an image of the range containing the region R11 which is part of the screen SC and in which part of the projection image GP3 is displayed. The imaging device 140B outputs second captured image information 107B, which represents the result of the capture of an image of the range containing the region R11 which is part of the screen SC and in which part of the projection image GP3 is displayed, to the processing apparatus 12B. In other words, the imaging device 140B outputs a captured image GS7 indicated by the second captured image information 107B to the processing apparatus 12B. In the imaging apparatus 14B, the internal parameters include parameters relating to the imaging lens 142B and parameters relating to the imaging device 140B. Note that the first captured image information 106B, the captured image GS6, the second captured image information 107B, and the captured image GS7 will be described later.

The projection apparatus 16B is configured in the same manner as the projection apparatus 16 except that the light modulator 160 is replaced with a light modulator 160B, and that the projection lens 162 is replaced with a projection lens 162B. The light modulator 160B modulates the light emitted from the light source into the projection light for displaying a projection image on the projection surface. The projection apparatus 16B projects the projection light for displaying a projection image on the screen SC under the control of the projection controller 120. Specifically, the projection apparatus 16B projects the image GF2 input from the processing apparatus 12B onto the screen SC to display the projection image GP2 on the screen SC. The internal parameters of the projection apparatus 16B include parameters relating to the projection lens 162B and parameters relating to the light modulator 160B. For convenience of the description, it is assumed that the light modulator 160B includes one or more liquid crystal panels.

The projector 2B is configured in the same manner as the projector 2 except that the imaging apparatus 24 is replaced with the imaging apparatus 24B, and that the projection apparatus 26 is replaced with the projection apparatus 26B.

The projection apparatus 26B is configured in the same manner as the projection apparatus 26 except that the light modulator 260 is replaced with a light modulator 260B, and that the projection lens 262 is replaced with a projection lens 262B. The light modulator 260B modulates the light emitted from the light source into the projection light for displaying a projection image on the projection surface. The projection apparatus 26B projects the projection light for displaying a projection image onto the screen SC under the control of the projection controller 120. Specifically, the projection apparatus 26B projects the image GF3 input from the processing apparatus 12B onto the screen SC to display the projection image GP3 on the screen SC. The internal parameters of the projection apparatus 26B include parameters relating to the projection lens 262B and parameters relating to the light modulator 260B. For convenience of the description, it is assumed that the light modulator 260B includes one or more liquid crystal panels.

Figure 18:
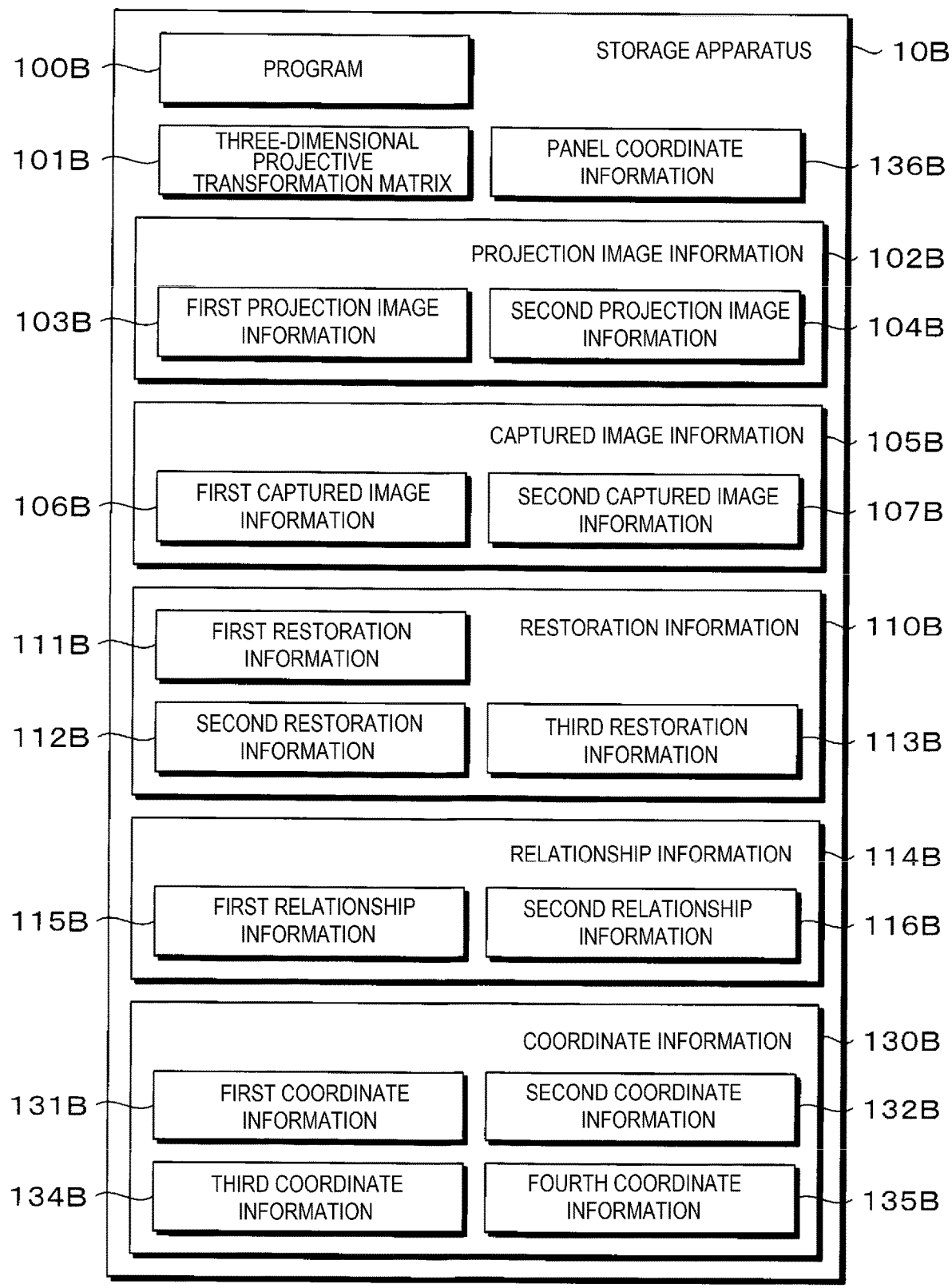
FIG. 18 is a block diagram showing the configuration of the storage apparatus according to the third embodiment.

FIG. 18 is a block diagram showing the configuration of the storage apparatus 10B according to the third embodiment. The storage apparatus 10B differs from the storage apparatus 10 in that it stores a program 100B in place of the program 100, that it stores a three-dimensional projective transformation matrix 101B in place of the three-dimensional projective transformation matrix 101, that it stores projection image information 102B in place of the first projection image information 103, that it stores captured image information 105B in place of the captured image information 105, that it stores restoration information 110B in place of the restoration information 110, that it stores relationship information 114B representing the correspondence between a plurality of pixels provided in the light modulator and a plurality of elements provided in the imaging device, that it stores coordinate information 130B in place of the coordinate information 130, and that it stores panel coordinate information 136B representing the coordinates of a plurality of points in the light modulator 260B. The three-dimensional projective transformation matrix 101B is a matrix formed of four rows and four columns that transforms the projection restoration result for the region R12 into the Euclidean restoration result for the region R12. The panel coordinate information 136B will be described later in detail.

The projection image information 102B contains first projection image information 103B representing an image to be projected onto the projection surface from the projection apparatus 16B and second projection image information 104B representing an image to be projected onto the projection surface from the projection apparatus 26B.

The captured image information 105B contains the first captured image information 106B generated by the imaging apparatus 14B and representing the result of capture of an image of at least part of the projection image displayed on the projection surface as a result of the projection of the image indicated by the first projection image information 103B, and the second captured image information 107B generated by the imaging apparatus 14B and representing the result of capture of an image of at least part of the projection image displayed on the projection surface as a result of the projection of the image indicated by the second projection image information 104B.

The restoration information 110B contains first restoration information 111B representing the Euclidean restoration result for the region R12, second restoration information 112B representing the projection restoration result for the region R12, and third restoration information 113B representing the Euclidean restoration result for the region R12.

The relationship information 114B contains first relationship information 115B representing the correspondence between a plurality of pixels provided in the light modulator 160B and a plurality of pixels provided in the imaging device 140B, and second relationship information 116B representing the correspondence between a plurality of pixels provided in the light modulator 260B and the plurality of pixels provided in the imaging device 140B.

The coordinate information 130B includes first coordinate information 131B representing the coordinates of the plurality of points contained in the image indicated by the first captured image information 106B, second coordinate information 132B representing the coordinates of the plurality of points contained in the image indicated by the second captured image information 107B, third coordinate information 134B representing the coordinates of the plurality of points contained in the image indicated by the first projection image information 103B, and fourth coordinate information 135B representing the coordinates of the plurality of points contained in the image indicated by the second projection image information 104B.

Figure 19:
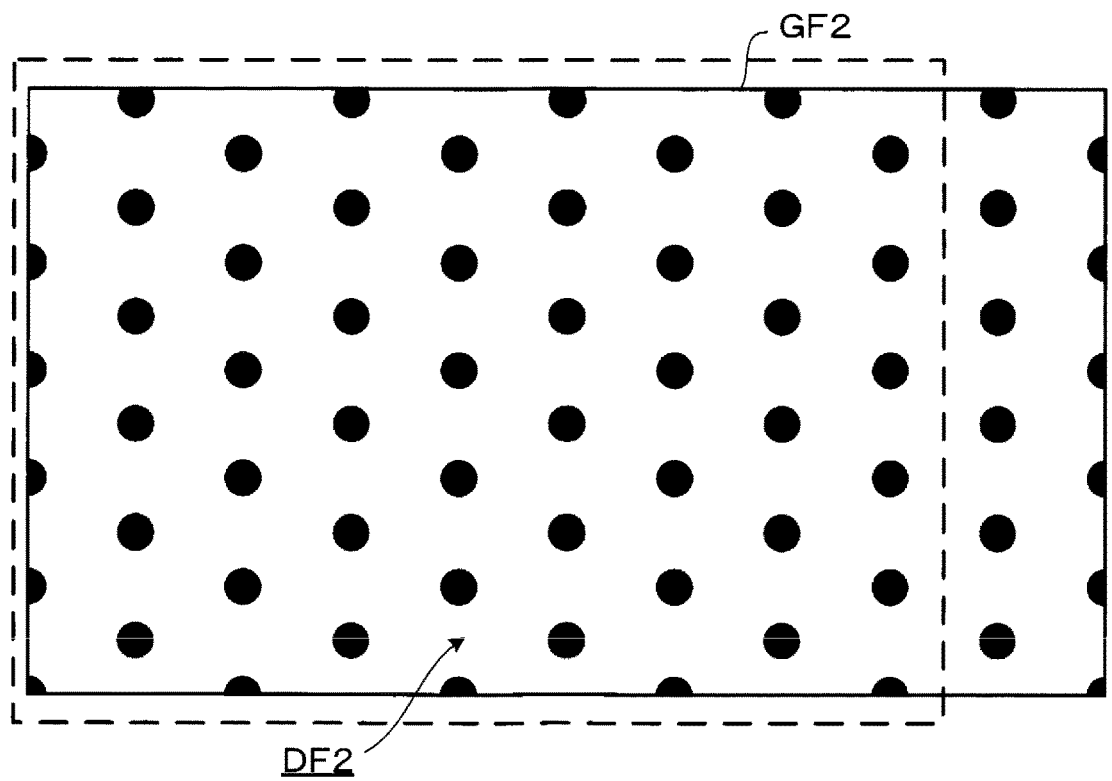
FIG. 19 is a diagrammatic view showing another example of the image indicated by the first projection image information.

FIG. 19 is a diagrammatic view showing an example of the image indicated by the first projection image information 103B. In the present embodiment, the first projection image information 103B represents the image GF2. The processing apparatus 12B causes the projection apparatus 16B to project the projection light based on the first projection image information 103B to display the projection image GP2 on the screen SC. In other words, the processing apparatus 12B causes the projection apparatus 16B to project the image GF2 to display the projection image GP2 on the screen SC.

The image GF2 contains a plurality of points. The plurality of points include a plurality of points DF2. The plurality of points DF2 are in one-to-one correspondence with the plurality of points DP3 contained in the projection image GP2. In FIG. 19, the plurality of points DF2 are points that fall within the range surrounded by the broken line.

Figure 20:
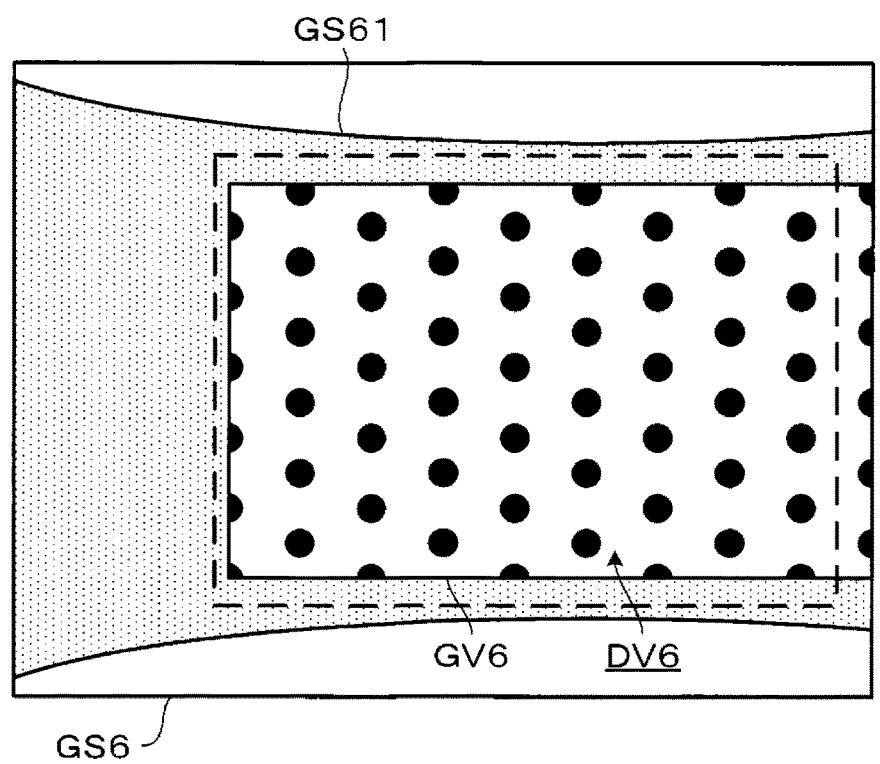
FIG. 20 is a diagrammatic view showing another example of the image indicated by the first captured image information.

FIG. 20 is a diagrammatic view showing an example of the image indicated by the first captured image information 106B. In the present embodiment, the first captured image information 106B represents the captured image GS6. The imaging apparatus 14B captures an image of the range containing the region R11, which is part of the screen SC and in which part of the projection image GP2 is displayed, to acquire the captured image GS6. In other words, the imaging apparatus 14B captures an image of the range containing the region R11, which is part of the screen SC and in which part of the projection image GP2 is displayed, to generate the first captured image information 106B representing the captured image GS6.

The captured image GS6 contains an image GS61. The image GS61 is an image showing part of the screen SC. The image GS61 contains an image GV6. The image GV6 is an image showing part of the projection image GP2 displayed in the region R12. The image GV6 contains a plurality of points. The plurality of points include a plurality of points DV6. The plurality of points DV6 are in one-to-one correspondence with the plurality of points DP3 contained in the projection image GP2. The plurality of points DV6 are further in one-to-one correspondence with the plurality of points DF2 contained in the image GF2. In FIG. 20, the plurality of points DV6 are points that fall within the range surrounded by the broken line.

Figure 21:
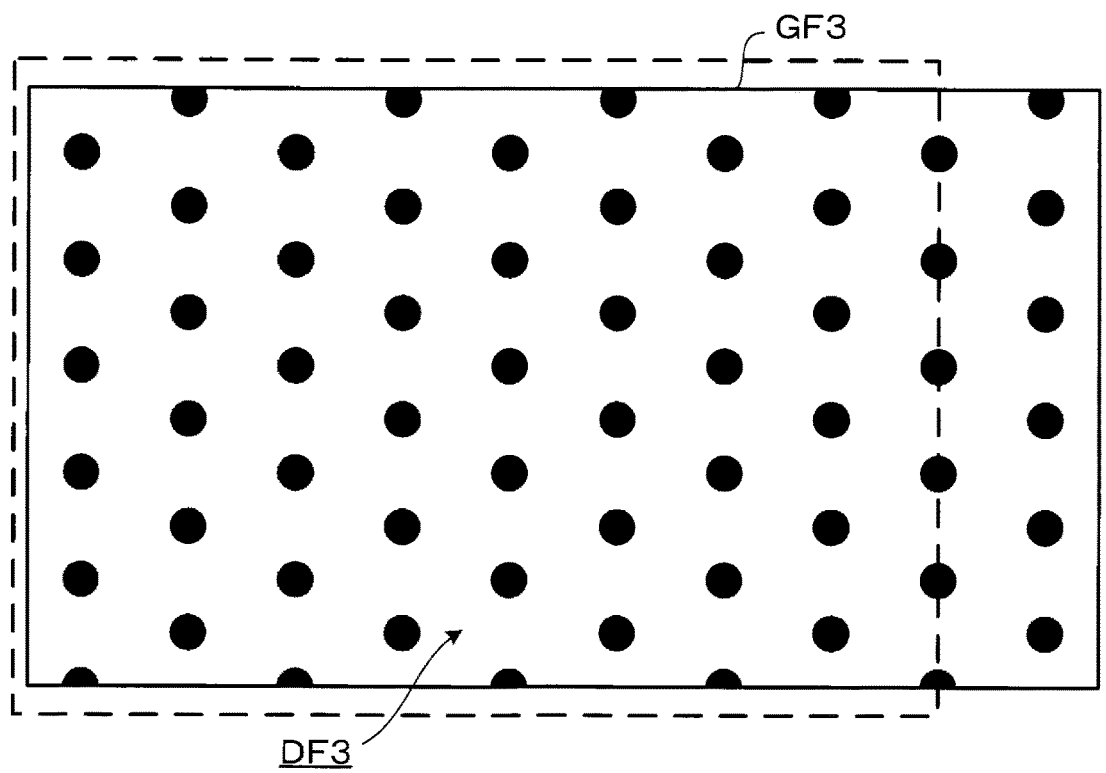
FIG. 21 is a diagrammatic view showing an example of an image indicated by second projection image information.

FIG. 21 is a diagrammatic view showing an example of the image indicated by the second projection image information 104B. In the present embodiment, the second projection image information 104B represents the image GF3. The processing apparatus 12B causes the projection apparatus 26B to project the projection light based on the second projection image information 104B to display the projection image GP3 on the screen SC. In other words, the processing apparatus 12B causes the projection apparatus 26B to project the image GF3 to display the projection image GP3 on the screen SC.

The image GF3 contains a plurality of points. The plurality of points include a plurality of points DF3. The plurality of points DF3 are in one-to-one correspondence with the plurality of points DP4 contained in the projection image GP3. In FIG. 21, the plurality of points DF3 are points that fall within the range surrounded by the broken line.

Figure 22:
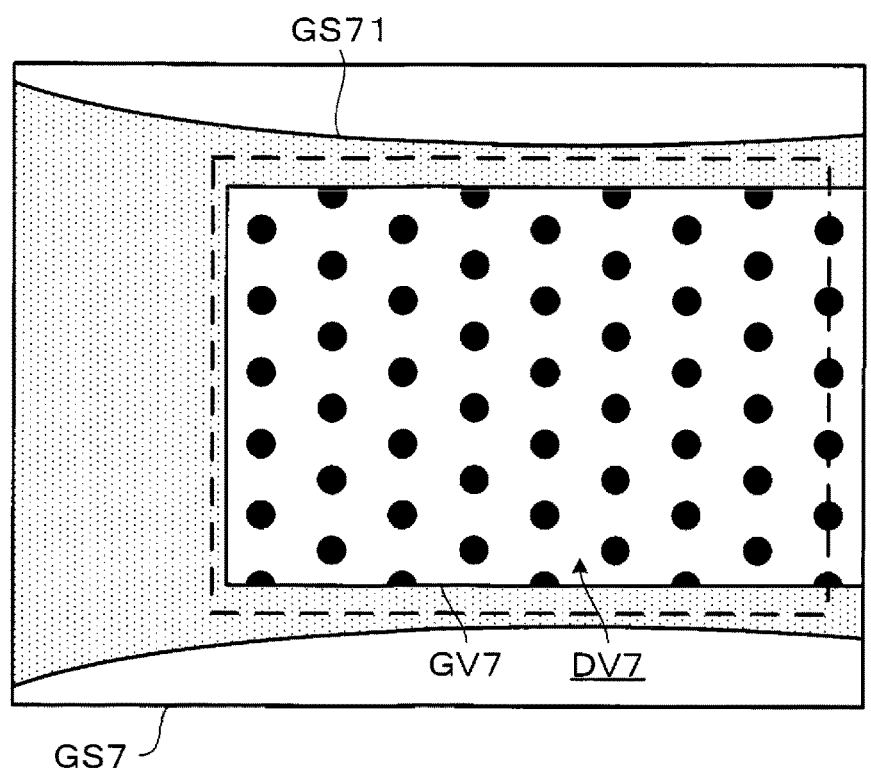
FIG. 22 is a diagrammatic view showing another example of the image indicated by the second captured image information.

FIG. 22 is a diagrammatic view showing an example of the image indicated by the second captured image information 107B. In the present embodiment, the second captured image information 107B represents the captured image GS7. The imaging apparatus 14B captures an image of the range containing the region R11, which is part of the screen SC and in which part of the projection image GP3 is displayed, to acquire the captured image GS7. In other words, the imaging apparatus 14B captures an image of the range containing the region R11, which is part of the screen SC and in which part of the projection image GP3 is displayed, to generate the second captured image information 107B representing the captured image GS7.

The captured image GS7 contains an image GS71. The image GS71 is an image showing part of the screen SC. The image GS71 contains an image GV7. The image GV7 is an image showing part of the projection image GP3 displayed in the region R12. The image GV7 contains a plurality of points. The plurality of points include a plurality of points DV7. The plurality of points DV7 are in one-to-one correspondence with the plurality of points DP4 contained in the projection image GP3. The plurality of points DV7 are further in one-to-one correspondence with the plurality of points DF3 contained in the image GF3. In FIG. 22, the plurality of points DV7 are points that fall within the range surrounded by the broken line.

Referring back to FIG. 17, the processing apparatus 12B functions as the projection controller 120, the imaging controller 121, the image analyzer 122B, and the restoration information generator 123B shown in FIG. 17 when a CPU or any other component provided in the processing apparatus 12B executes the program 100B.

In the present embodiment, the projection controller 120 controls the projection apparatus 16B to cause it to project the projection light for displaying a projection image on the screen SC. Specifically, the projection controller 120 causes the projection apparatus 16B to cause it to project the projection light based on the first projection image information 103B to display the projection image GP2 on the screen SC. In other words, the projection controller 120 causes the projection apparatus 16B to cause it to project the image GF2 indicated by the first projection image information 103B to display the projection image GP2 on the screen SC.

The projection controller 120 further causes the projection apparatus 26B to project the projection light based on the second projection image information 104B to display the projection image GP3 on the screen SC. In other words, the projection controller 120 causes the projection apparatus 26B to project the image GF3 indicated by the second projection image information 104B to display the projection image GP3 on the screen SC.

In the present embodiment, the imaging controller 121 controls the imaging apparatus 14B to cause it to capture an image of the range containing the region R11, which is part of the screen SC and in which part of the projection image GP2 is displayed. That is, the imaging controller 121 controls the imaging apparatus 14B to cause it to capture an image of the range containing the region R12, which is part of the screen SC and in which part of the projection image GP2 is displayed. In other words, the imaging controller 121 controls the imaging apparatus 14B to cause it to capture an image of the plurality of points DP3 contained in the projection image GP2. The imaging controller 121 acquires the captured image GS6 representing the result of the image capture. The imaging controller 121 causes the storage apparatus 10B to store the first captured image information 106B representing the captured image GS6.

The imaging controller 121 controls the imaging apparatus 14B to cause it to capture an image of the range containing the region R11, which is part of the screen SC and in which part of the projection image GP3 is displayed. That is, the imaging controller 121 controls the imaging apparatus 14B to cause it to capture an image of the range containing the region R12, which is part of the screen SC and in which part of the projection image GP3 is displayed. In other words, the imaging controller 121 controls the imaging apparatus 14B to cause it to capture an image of the plurality of points DP4 contained in the projection image GP3. The imaging controller 121 acquires the captured image GS7 representing the result of the image capture. The imaging controller 121 causes the storage apparatus 10B to store the second captured image information 107B representing the captured image GS7.

The image analyzer 122B executes image processing on the images indicated by the variety of pieces of image information to detect the points contained in the images. That is, the image analyzer 122B acquires the coordinate information 130B representing the coordinates of the detected points. The image analyzer 122B causes the storage apparatus 10B to store the acquired coordinate information 130B.

In the present embodiment, the image analyzer 122B performs image processing on the captured images GS6 indicated by the first captured image information 106B to detect the plurality of points contained in the captured image GS6. That is, the image analyzer 122B acquires the first coordinate information 131B representing the coordinates of the plurality of points contained in the captured image GS6. The image analyzer 122B causes the storage apparatus 10B to store the acquired first coordinate information 131B. The first coordinate information 131B represents the coordinates of the plurality of points DV6.

The image analyzer 122B performs image processing on the captured image GS7 indicated by the second captured image information 107B to detect the plurality of points contained in the captured image GS7. That is, the image analyzer 122B acquires the second coordinate information 132B representing the coordinates of the plurality of points contained in the captured image GS7. The image analyzer 122B causes the storage apparatus 10B to store the acquired second coordinate information 132B. The second coordinate information 132B represents the coordinates of the plurality of points DV7.

The image analyzer 122B performs image processing on the image GF2 indicated by the first projection image information 103B to detect the plurality of points contained in the image GF2. That is, the image analyzer 122B acquires the third coordinate information 134B representing the coordinates of the plurality of points contained in the image GF2. The image analyzer 122B causes the storage apparatus 10B to store the acquired third coordinate information 134B. The third coordinate information 134B represents the coordinates of the plurality of points DF2.

The image analyzer 122B performs image processing on the image GF3 indicated by the second projection image information 104B to detect the plurality of points contained in the image GF3. That is, the image analyzer 122B acquires the fourth coordinate information 135B representing the coordinates of the plurality of points contained in the image GF3. The image analyzer 122B causes the storage apparatus 10B to store the acquired fourth coordinate information 135B. The fourth coordinate information 135B represents the coordinates of the plurality of points DF3.

Based on the projection image information 102B and the captured image information 105B, the image analyzer 122B generates the relationship information 114B representing the correspondence between the plurality of pixels provided in the light modulator provided in the projection apparatus that projects the image indicated by the projection image information 102B and the plurality of pixels provided in the imaging device provided in the imaging apparatus that generates the captured image information 105B. In other words, the image analyzer 122B generates the relationship information 114B based on the image indicated by the projection image information 102B and the image indicated by the captured image information 105B. The image analyzer 122B causes the storage apparatus 10B to store the generated relationship information 114B.

In the present embodiment, based on the first projection image information 103B and the first captured image information 106B, the image analyzer 122B generates the first relationship information 115B representing the correspondence between the plurality of pixels provided in the light modulator 160B provided in the projection apparatus 16B, which projects the image GF2 indicated by the first projection image information 103B, and the plurality of pixels provided in the imaging device 140B provided in the imaging apparatus 14B, which generates the first captured image information 106B. In other words, the image analyzer 122B generates the first relationship information 115B based on the image GF2 indicated by the first projection image information 103B and the captured image GS6 indicated by the first captured image information 106B. Specifically, the image analyzer 122B generates the first relationship information 115B based on the third coordinate information 134B representing the coordinates of the plurality of points contained in the image GF2 and the first coordinate information 131B representing the coordinates of the plurality of points contained in the captured image GS6. The image analyzer 122B causes the storage apparatus 10B to store the generated first relationship information 115B.

Furthermore, based on the second projection image information 104B and the second captured image information 107B, the image analyzer 122B generates the second relationship information 116B representing the correspondence between the plurality of pixels provided in the light modulator 260B provided in the projection apparatus 26B, which projects the image GF3 indicated by the second projection image information 104B, and the plurality of pixels provided in the imaging device 140B provided in the imaging apparatus 14B, which generates the second captured image information 107B. In other words, the image analyzer 122B generates the second relationship information 116B based on the image GF3 indicated by the second projection image information 104B and the captured image GS7 indicated by the second captured image information 107B. Specifically, the image analyzer 122B generates the second relationship information 116B based on the fourth coordinate information 135B representing the coordinates of the plurality of points contained in the image GF3 and the second coordinate information 132B representing the coordinates of the plurality of points contained in the captured image GS7. The image analyzer 122B causes the storage apparatus 10B to store the The image analyzer 122B further generates the panel coordinate information 136B representing the coordinates of a plurality of points in the light modulator 260B, which are in one-to-one correspondence with the plurality of points DF2, based on the first relationship information 115B, the second relationship information 116B, the captured image GS6, and the captured image GS7. The image analyzer 122B causes the storage apparatus 10B to store the generated panel coordinate information 136B.

Figure 23:
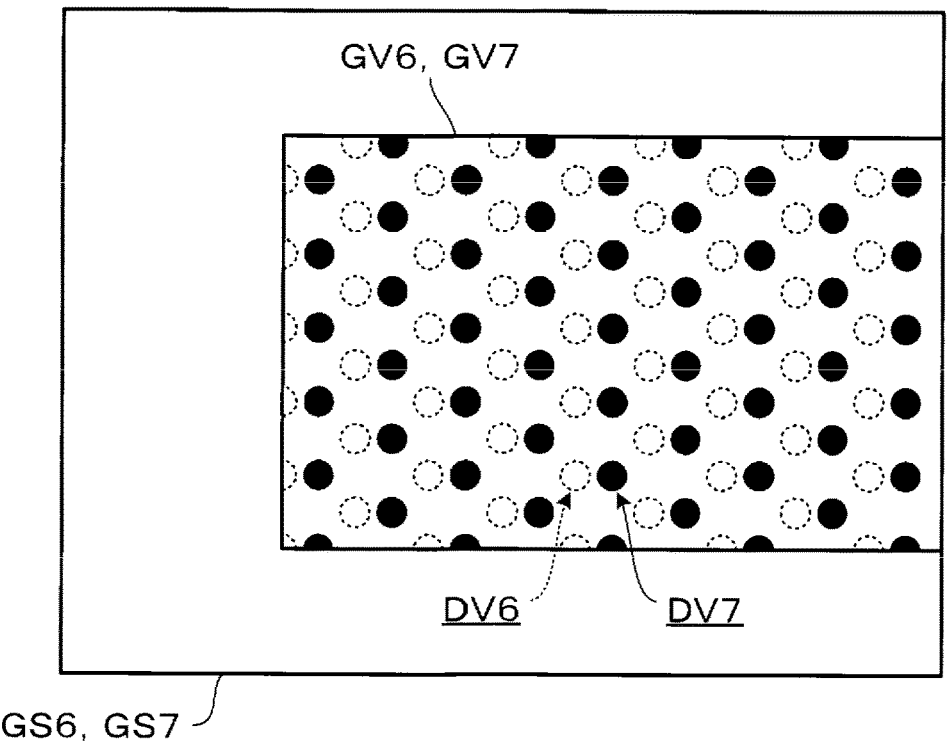
FIG. 23 is a descriptive view showing that a captured image is superimposed on another captured image.

The panel coordinate information 136B will be described below in detail with reference to FIGS. 23 and 24. FIG. 23 is a descriptive view showing that the captured image GS7 is superimposed on the captured image GS6. For convenience of the description, the images GS6*l* and GS7*l* are omitted in FIG. 23.

The captured images GS6 and GS7 allow grasp of the relative positional relationship between the plurality of points DV6 and the plurality of points DV7, as can be seen from FIG. 23. The plurality of points DV6 are in one-to-one correspondence with the plurality of points DP3 contained in the projection image GP2 displayed on the screen SC as a result of the projection of the image GF2 containing the plurality of points DF2 from the projection apparatus 16B. The plurality of points DV7 are in one-to-one correspondence with the plurality of points DP4 contained in the projection image GP3 displayed on the screen SC as a result of the projection of the image GF3 containing the plurality of points DF3 from the projection apparatus 26B. That is, the first relationship information 115B, the second relationship information 116B, the captured image GS6, and the captured image GS7 allow grasp of the correspondence between the plurality of pixels provided in the light modulator 160B provided in the projection apparatus 16B, which displays the projection image GP2 on the screen SC as a result of the projection of the image GF2, and the plurality of pixels provided in the light modulator 260B provided in the projection apparatus 26B, which displays the projection image GP3 on the screen SC as a result of the projection of the image GF3. The measurement system SysB can therefore properly control the plurality of pixels provided in the light modulator 260B, for example, even when from the projection apparatus 26B projects an image to display patterned dots at the same positions of the plurality of points DP3.

Figure 24:
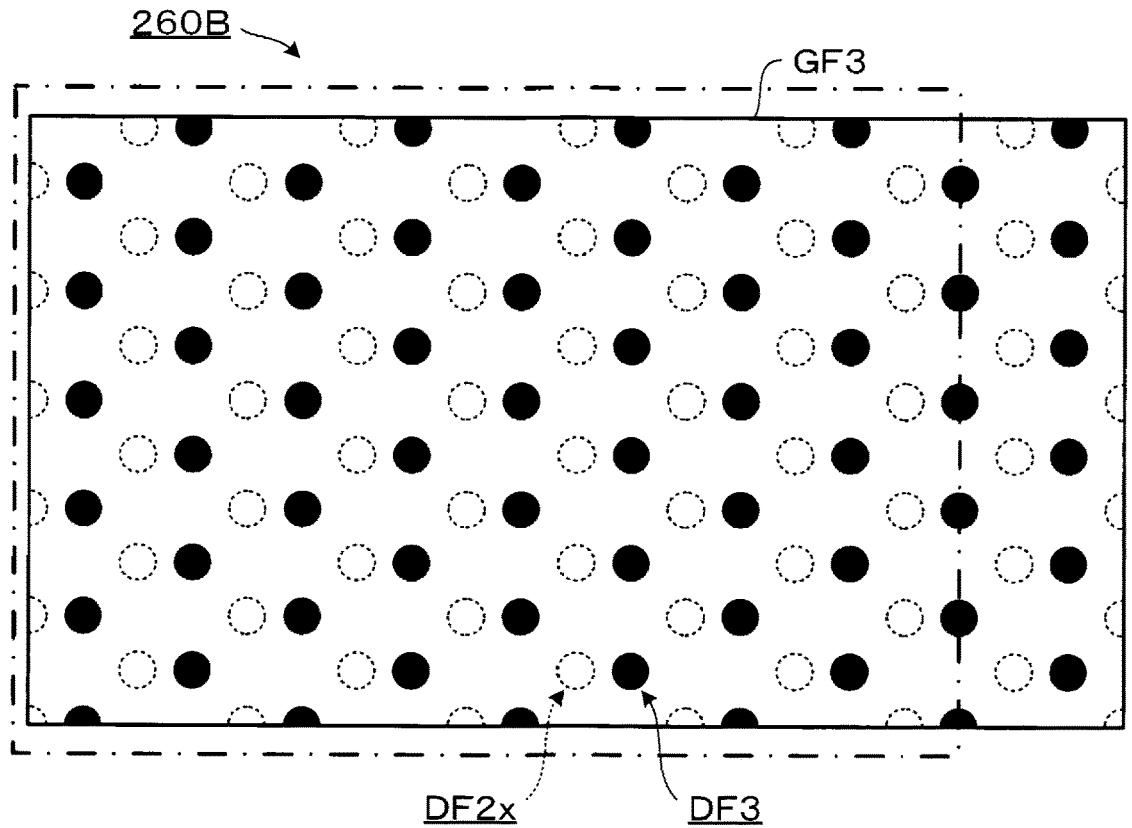
FIG. 24 is a diagrammatic view for describing a plurality of points in the light modulator that are in one-to-one correspondence with a plurality of points.

FIG. 24 is a diagrammatic view for describing a plurality of points DF2*x* in the light modulator 260B, which are in one-to-one correspondence with the plurality of points DF2. FIG. 24 shows the positions of the plurality of points DF2*x* in the light modulator 260B. The plurality of points DF2*x* are each drawn with a circular broken line. The plurality of points DF2*x* are points that fall within the range surrounded by the chain line. FIG. 24 further shows the plurality of points DF3 for comparison. For example, when the projection image GP3 is displayed on the screen SC, the light modulator 260B displays the image GF3 containing the plurality of points DF3.

Since the first relationship information 115B, the second relationship information 116B, the captured image GS6, and the captured image GS7 allow grasp of the correspondence between the plurality of pixels provided in the light modulator 160B and the plurality of pixels provided in the light modulator 260B as described above, the coordinates of the plurality of points DF2*x* on the light modulator 260B, which are in one-to-one correspondence with the plurality of points DF2 contained in the image GF2 displayed on the light modulator 160B, are grasped. That is, the image analyzer 122B can generate the panel coordinate information 136B representing the coordinates of the plurality of points DF2*x* based on the first relationship information 115B, the second relationship information 116B, the captured image GS6, and the captured image GS7.

Referring back to FIG. 17, the restoration information generator 123B generates the restoration information 110B representing the result of the measurement of the three-dimensional shape of the object based on the images indicated by the variety of pieces of image information. The restoration information generator 123B causes the storage apparatus 10B to store the generated restoration information 110B.

In the present embodiment, the restoration information generator 123B generates the first restoration information 111B representing the Euclidean restoration result for the region R12 based on the image GF2 projected from the projection apparatus 16B having known internal parameters and the captured image GS6 acquired by the imaging apparatus 14B having known internal parameters. Specifically, the restoration information generator 123B generates the first restoration information 111B based on the first coordinate information 131B representing the coordinates of the plurality of points contained in the captured image GS6 and the third coordinate information 134B representing the coordinates of the plurality of points contained in the image GF2. The restoration information generator 123B causes the storage apparatus 10B to store the generated first restoration information 111B.

The restoration information generator 123B further generates the second restoration information 112B representing the projection restoration result for the region R12 based on the image GF2 projected from the projection apparatus 16B having known internal parameters and the image GF3 projected from the projection apparatus 26B having unknown internal parameters. Specifically, the restoration information generator 123B generates the second restoration information 112B based on the third coordinate information 134B representing the coordinates of the plurality of points contained in the image GF2 and the panel coordinate information 136B based on the second relationship information 116B based on the image GF3. The restoration information generator 123B causes the storage apparatus 10B to store the generated second restoration information 112B.

The restoration information generator 123B generates a three-dimensional projective transformation matrix that transforms the projection restoration result into a Euclidean restoration result based on the Euclidean restoration result for a contained region and the projection restoration result for the contained region. The restoration information generator 123B generates the Euclidean restoration result for a containing region by using the three-dimensional projective transformation matrix to transform the projection restoration result for the containing region.

In the present embodiment, the restoration information generator 123B generates the three-dimensional projective transformation matrix 101B, which transforms the projection restoration result for the region R12 into the Euclidean restoration result for the region R12, based on the first restoration information 111B representing the Euclidean restoration result for the region R12 and the second restoration information 112B representing the projection restoration result for the region R12. That is, the three-dimensional projective transformation matrix 101B transforms the coordinates of the plurality of points indicated by the second restoration information 112B into the coordinates of the plurality of points indicated by the first restoration information 111B. The restoration information generator 123B causes the storage apparatus 10B to store the generated three-dimensional projective transformation matrix 101B. The restoration information generator 123B generates the Euclidean restoration result for the region R12 by using the three-dimensional projective transformation matrix 101B to transform the projection restoration result for the region R12. In other words, the restoration information generator 123B generates the third restoration information 113B representing the Euclidean restoration result for the region R12 based on the second restoration information 112B and the three-dimensional projective transformation matrix 101B. The restoration information generator 123B causes the storage apparatus 10B to store the generated third restoration information 113B.

Figure 25:
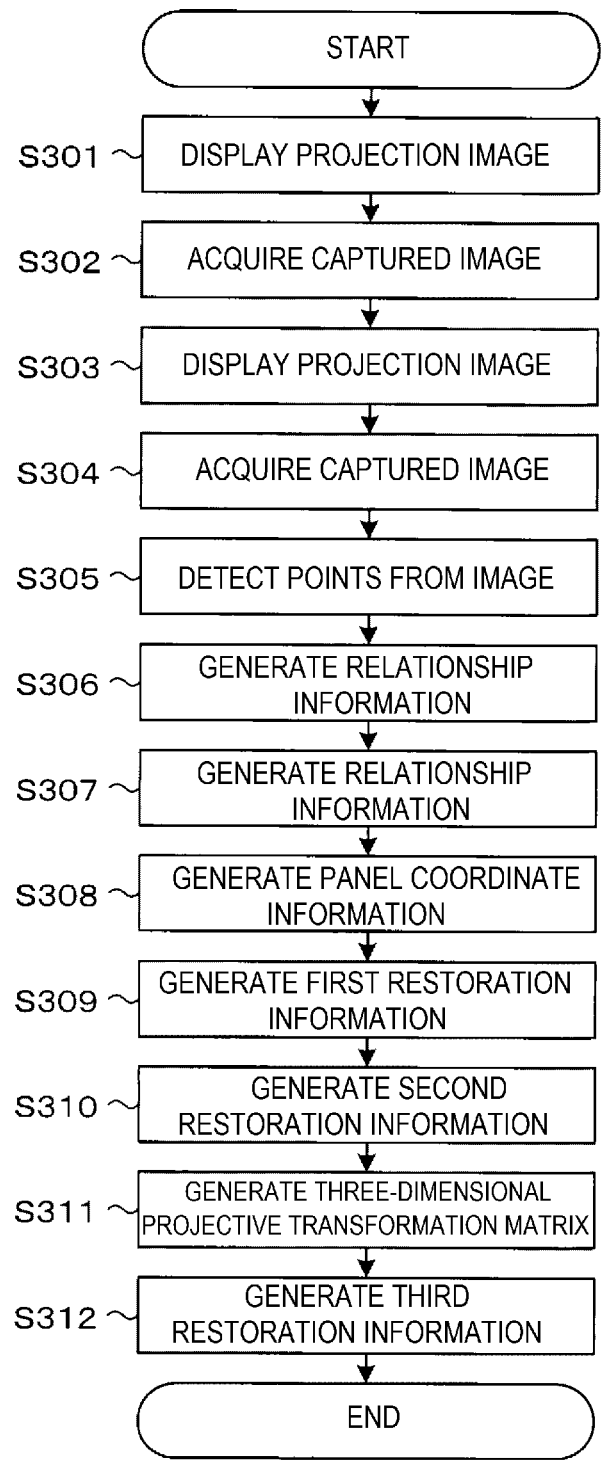
FIG. 25 is a flowchart for describing the action of the measurement system according to the third embodiment.

FIG. 25 is a flowchart for describing the action of the measurement system SysB according to the third embodiment. The series of actions shown in the flowchart starts, for example, when the projectors 1B and 2B are powered on and the projector 1B accepts input operation relating to the start of the actions from the user.

In step S301, the projection controller 120 causes the projection apparatus 16B to project the projection light based on the first projection image information 103B to display the projection image GP2 on the screen SC. In other words, the projection controller 120 causes the projection apparatus 16B to cause it to project the image GF2 indicated by the first projection image information 103B to display the projection image GP2 on the screen SC.

In step S302, the imaging controller 121 controls the imaging apparatus 14B to cause it to capture an image of the range containing the region R11, which is part of the screen SC and in which part of the projection image GP2 is displayed. That is, the imaging controller 121 controls the imaging apparatus 14B to cause it to capture an image of the plurality of points DP3 contained in the projection image GP2. The imaging controller 121 acquires the captured image GS6 representing the result of the image capture. The imaging controller 121 causes the storage apparatus 10B to store the first captured image information 106B representing the captured image GS6.

In step S303, the projection controller 120 causes the projection apparatus 26B to project the projection light based on the second projection image information 104B to display the projection image GP3 on the screen SC. In other words, the projection controller 120 causes the projection apparatus 26B to project the image GF3 indicated by the second projection image information 104B to display the projection image GP2 on the screen SC.

In step S304, the imaging controller 121 controls the imaging apparatus 14B to cause it to capture an image of the range containing the region R11, which is part of the screen SC and in which part of the projection image GP3 is displayed. That is, the imaging controller 121 controls the imaging apparatus 14B to cause it to capture an image of the plurality of points DP4 contained in the projection image GP3. The imaging controller 121 acquires the captured image GS7 representing the result of the image capture. The imaging controller 121 causes the storage apparatus 10B to store the second captured image information 107B representing the captured image GS7.

In step S305, the image analyzer 122B performs image processing on the captured images GS6 indicated by the first captured image information 106B to detect the plurality of points contained in the captured image GS6. That is, the image analyzer 122B acquires the first coordinate information 131B representing the coordinates of the plurality of points contained in the captured image GS6. The image analyzer 122B causes the storage apparatus 10B to store the acquired first coordinate information 131B.

The image analyzer 122B performs image processing on the captured image GS7 indicated by the second captured image information 107B to detect the plurality of points contained in the captured image GS7. That is, the image analyzer 122B acquires the second coordinate information 132B representing the coordinates of the plurality of points contained in the captured image GS7. The image analyzer 122B causes the storage apparatus 10B to store the acquired second coordinate information 132B.

The image analyzer 122B performs image processing on the image GF2 indicated by the first projection image information 103B to detect the plurality of points contained in the image GF2. That is, the image analyzer 122B acquires the third coordinate information 134B representing the coordinates of the plurality of points contained in the image GF2.

The image analyzer 122B causes the storage apparatus 10B to store the acquired third coordinate information 134B.

The image analyzer 122B performs image processing on the image GF3 indicated by the second projection image information 104B to detect the plurality of points contained in the image GF3. That is, the image analyzer 122B acquires the fourth coordinate information 135B representing the coordinates of the plurality of points contained in the image GF3. The image analyzer 122B causes the storage apparatus 10B to store the acquired fourth coordinate information 135B.

In step S306, based on the first projection image information 103B and the first captured image information 106B, the image analyzer 122B generates the first relationship information 115B indicating the correspondence between the plurality of pixels provided in the light modulator 160B provided in the projection apparatus 16B, which projects the image GF2 indicated by the first projection image information 103B, and the plurality of pixels provided in the imaging device 140B provided in the imaging apparatus 14B, which generates the first captured image information 106B. In other words, the image analyzer 122B generates the first relationship information 115B based on the image GF2 indicated by the first projection image information 103B and the captured image GS6 indicated by the first captured image information 106B. Specifically, the image analyzer 122B generates the first relationship information 115B based on the third coordinate information 134B representing the coordinates of the plurality of points contained in the image GF2 and the first coordinate information 131B representing the coordinates of the plurality of points contained in the captured image GS6. The image analyzer 122B causes the storage apparatus 10B to store the generated first relationship information 115B.

In step S307, based on the second projection image information 104B and the second captured image information 107B, the image analyzer 122B generates the second relationship information 116B indicating the correspondence between the plurality of pixels provided in the light modulator 260B provided in the projection apparatus 26B, which projects the image GF3 indicated by the second projection image information 104B, and the plurality of pixels provided in the imaging device 140B provided in the imaging apparatus 14B, which generates the second captured image information 107B. In other words, the image analyzer 122B generates the second relationship information 116B based on the image GF3 indicated by the second projection image information 104B and the captured image GS7 indicated by the second captured image information 107B. Specifically, the image analyzer 122B generates the second relationship information 116B based on the fourth coordinate information 135B representing the coordinates of the plurality of points contained in the image GF3 and the second coordinate information 132B representing the coordinates of the plurality of points contained in the captured image GS7. The image analyzer 122B causes the storage apparatus 10B to store the generated second relationship information 116B.

In step S308, the image analyzer 122B generates the panel coordinate information 136B representing the coordinates of the plurality of points DF2$x$ in the light modulator 260B, which are in one-to-one correspondence with the plurality of points DF2, based on the first relationship information 115B, the second relationship information 116B, the captured image GS6, and the captured image GS7. The image analyzer 122B causes the storage apparatus 10B to store the generated panel coordinate information 136B.

In step S309, the restoration information generator 123B generates the first restoration information 111B representing the Euclidean restoration result for the region R12 based on the captured image GF2 projected from the projection apparatus 16B having known internal parameters and the captured image acquired GS6 acquired by the imaging apparatus 14B having known internal parameters. Specifically, the restoration information generator 123B generates the first restoration information 111B based on the first coordinate information 131B representing the coordinates of the plurality of points contained in the captured image GS6 and the third coordinate information 134B representing the coordinates of the plurality of points contained in the image GF2. The restoration information generator 123B causes the storage apparatus 10B to store the generated first restoration information 111B.

In step S310, the restoration information generator 123B generates the second restoration information 112B representing the projection restoration result for the region R12 based on the image GF2 projected from the projection apparatus 16B having known internal parameters and the image GF3 projected from the projection apparatus 26B having unknown internal parameters. Specifically, the restoration information generator 123B generates the second restoration information 112B based on the third coordinate information 134B representing the coordinates of the plurality of points contained in the image GF2 and the panel coordinate information 136B based on the second relationship information 116B based on the image GF3. The restoration information generator 123B causes the storage apparatus 10B to store the generated second restoration information 112B.

In step S311, the restoration information generator 123B generates the three-dimensional projective transformation matrix 101B, which transforms the projection restoration result for the region R12 into the Euclidean restoration result for the region R12 based on the first restoration information 111B representing the Euclidean restoration result for the region R12 and the second restoration information 112B representing the projection restoration result for the region R12. The restoration information generator 123B causes the storage apparatus 10B to store the generated three-dimensional projective transformation matrix 101B.

In step S312, the restoration information generator 123B generates the Euclidean restoration result for the region R12 by using the three-dimensional projective transformation matrix 101B to transform the projection restoration result for the region R12. In other words, the restoration information generator 123B generates the third restoration information 113B representing the Euclidean restoration result for the region R12 based on the second restoration information 112B and the three-dimensional projective transformation matrix 101B. The restoration information generator 123B causes the storage apparatus 10B to store the generated third restoration information 113B.

Having carried out the process in step S312, the processing apparatus 12B terminates the series of actions shown in the flowchart of FIG. 25.

As described above, according to the third embodiment, the measurement system SysB uses the projection apparatus 16B having known internal parameters, the imaging apparatus 14B having known internal parameters, and the projection apparatus 26B having unknown internal parameters to acquire the Euclidean restoration result for the region R12 of the screen SC.

As described above, in the measurement method according to the third embodiment, the projection apparatuses 16B and 26B are each a projection apparatus that projects an image onto the screen SC, the imaging apparatus 14B is an imaging apparatus, the projection apparatus 16B includes the light modulator 160B, which modulates the light emitted from the light source into the projection light for displaying a projection image on the screen SC, the imaging apparatus 14B includes the imaging device 140B, which converts the light focused by the imaging lens 142B into an electric signal to generate a captured image, the projection apparatus 26B includes the light modulator 260B, which modulates the light emitted from the light source into the projection light for displaying a projection image on the screen SC, generating the second restoration information 112B includes projecting a second pattern image containing the plurality of points DF2 from the projection apparatus 16B to display the projection image GP2 on the screen SC, projecting a third pattern image containing the plurality of points DF3 from the projection apparatus 26B to display the projection image GP3 on the screen SC, controlling the imaging apparatus 14B to cause it to acquire a fourth captured image representing the result of the capture of an image of the plurality of points DP3 contained in the projection image GP2 and being in one-to-one correspondence with the plurality of points DF2, controlling the imaging apparatus 14B to acquire a fifth captured image representing the result of the capture of an image of the plurality of points DP4 contained in the projection image GP3 and being in one-to-one correspondence with the plurality of points DF3, generating the first relationship information 115B representing the correspondence between the plurality of pixels provided in the light modulator 160B and the plurality of pixels provided in the imaging apparatus 140B based on the second pattern image and the fourth captured image, generating the second relationship information 116B representing the correspondence between the plurality of pixels provided in the light modulator 260B and the plurality of pixels provided in the imaging apparatus 140B based on the third pattern image and the fifth captured image, generating the panel coordinate information 136B representing the coordinates of the plurality of points $DF2x$ in the light modulator 260B, which are in one-to-one correspondence with the plurality of points DF2, based on the first relationship information 115B, the second relationship information 116B, the fourth captured image, and the fifth captured image, and generating the second restoration information 112B based on the second pattern image and the panel coordinate information 136B, the plurality of points DP3 are displayed in the region R12, the image GF2 is the second pattern image, the captured image GS6 is the fourth captured image, and the image GF3 is the third pattern image.

That is, the measurement system SysB can acquire a projection restoration result by using the combination of a projection apparatus having known internal parameters, an imaging apparatus having known internal parameters, and a projection apparatus having unknown internal parameters. The measurement system SysB can thus accurately measure the three-dimensional shape of an object even when any one of the plurality of projection apparatuses has unknown internal parameters.

In the third embodiment, the projection apparatus 16B is an example of the "first apparatus", the imaging apparatus 14B is an example of the "second apparatus", the projection apparatus 26B is an example of the "third apparatus", the screen SC is an example of the "screen", the light modulator 160B is an example of a "first light modulator", the imaging lens 142B is an example of the "second lens", the imaging device 140B is an example of a "first imaging device", the light modulator 260B is an example of a "second light modulator", the second restoration information 112B is an example of the "second restoration information", the plurality of points DF2 is an example of a "plurality of fourth points", the projection image GP2 is an example of a "second projection image", the plurality of points DF3 is an example of a "plurality of fifth points", the projection image GP3 is an example of a "third projection image", the plurality of points DP3 is an example of a "plurality of sixth points", the plurality of points DP4 is an example of a "plurality of seventh points", the first relationship information 115B is an example of "first relationship information", the second relationship information 116B is an example of "second relationship information", the plurality of points $DF2x$ is an example of a "plurality of eighth points", the panel coordinate information 136B is an example of "first coordinate information", the region R12 is an example of the "third region", the image GF2 is an example of the "first image", the image GS6 is an example of the "second image", and the image GF3 is an example of the "third image". The projection apparatuses 16B and 26B exemplify the "projection apparatus". The imaging apparatus 14B exemplifies the "imaging apparatus". The image GF2 exemplifies a "second pattern image". The image GF3 exemplifies a "third pattern image". The captured image GS6 exemplifies a "fourth captured image". The captured image GS7 exemplifies a "fifth captured image".

4. Variations

The embodiments described above can be changed in a variety of manners. Specific aspects of the changes will be presented below by way of example. Two or more aspects arbitrarily selected from those presented below by way of example may be combined with each other as appropriate to the extent that the selected aspects do not contradict each other. In the variations presented below by way of example, an element providing the same effect and having the same function as the element in any of the embodiments described above has the same reference character used in the above description, and no detailed description of the same element will be made as appropriate.

4.1. Variation 1

The aforementioned embodiments have been described with reference to the case where a measurement system including two imaging apparatuses each having known internal parameters and a projection apparatus having unknown internal parameters acquires a Euclidean restoration result by using the projection apparatus having unknown internal parameters without calibration of the projection apparatus having unknown internal parameters, and the present disclosure is not limited to such an aspect. For example, a measurement system including a projection apparatus having known internal parameters, an imaging apparatus having known internal parameters, and an imaging apparatus having unknown internal parameters can acquire a Euclidean restoration result by using the imaging apparatus having unknown internal parameters without calibration of the imaging apparatus having unknown internal parameters.

Figure 26:
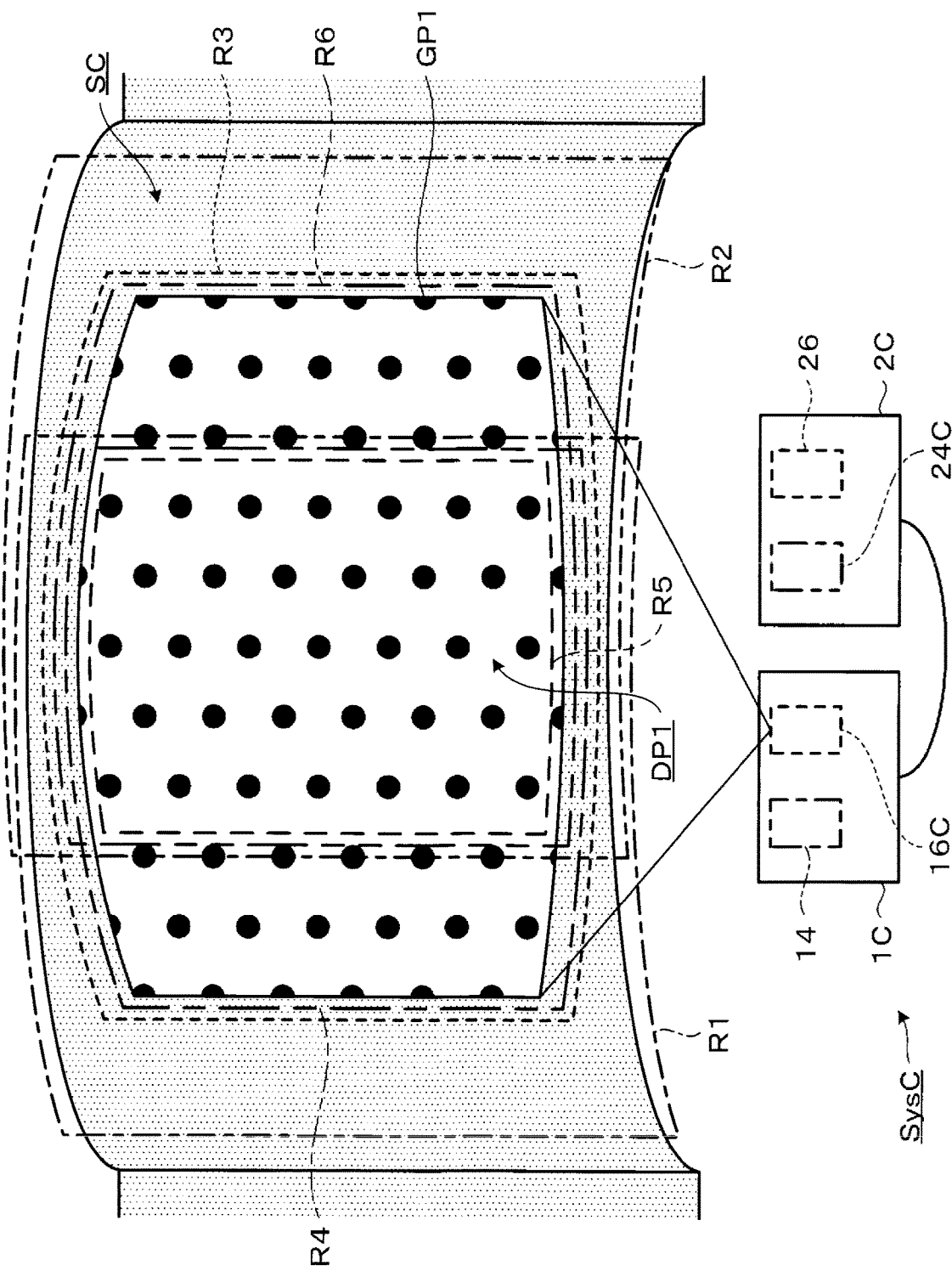
FIG. 26 is a diagrammatic view for describing an overview of the measurement system according to Variation 1.

FIG. 26 is a diagrammatic view for describing an overview of a measurement system SysC according to Variation 1. The measurement system SysC includes a projector 1C and a projector 2C. The projector 1C differs from the projector 1 in that the projection apparatus 16 is replaced with a projection apparatus 16C. The projection apparatus 16C has known internal parameters. The projector 2C differs from the projector 2 in that the imaging apparatus 24 is replaced with an imaging apparatus 24C. The imaging apparatus 24C has unknown internal parameters.

It is assumed for convenience of the description that the projection apparatuses 16C and 16 have the same configuration but differ from each other only in that the internal parameters are known or unknown. That is, the projection apparatus 16C includes the light modulator 160 and the projection lens 162. The projection apparatus 16C projects the image GF1 containing the plurality of points DF1 to display the projection image GP1 on the screen SC. In other words, a processing apparatus that is not shown but is provided in the projector 1C causes the projection apparatus 16C to project the image GF1 containing the plurality of points DF1 to display the projection image GP1 on the screen SC. The plurality of points DP1 contained in the projection image GP1 are displayed in the region R3.

It is further assumed that the imaging apparatuses 24C and 24 have the same configuration but differ from each other only in that the internal parameters are known or unknown. That is, the imaging apparatus 24C includes the imaging device 240 and the imaging lens 242. The imaging apparatus 24C captures an image of part of the projection image GP1 displayed on the screen SC by the projection apparatus 16C. In other words, the imaging apparatus 24C captures an image of the range containing the region R2, which is part of the screen SC and in which part of the projection image GP1 is displayed. That is, the processing apparatus that is not shown but is provided in the projector 1C controls the imaging apparatus 24C to cause it to acquire the captured image GS2 representing the result of the capture of an image of the plurality of points DP1 contained in the projection image GP1.

The imaging apparatus 14 captures an image of the projection image GP1 displayed on the screen SC by the projection apparatus 16C. In other words, the imaging apparatus 14 captures an image of the range containing the region R1, which is part of the screen SC and in which the projection image GP1 is displayed. That is, the processing apparatus that is not shown but is provided in the projector 1C controls the imaging apparatus 14 to cause it to acquire the captured image GS1 representing the result of the capture of an image of the plurality of points DP1 contained in the projection image GP1.

The projector 1C acquires the Euclidean restoration result for the region R4 based on the image GF1 projected from the projection apparatus 16C having known internal parameters and the captured image GS1 acquired by the imaging apparatus 14 having known internal parameters. The Euclidean restoration result for the region R4 includes the Euclidean restoration result for the region R5. The projector 1C further acquires the projection restoration result for the region R6 based on the image GF1 projected from the projection apparatus 16C having known internal parameters and the captured image GS2 acquired by the imaging apparatus 24C having unknown internal parameters. The region R6 contains the region R5. The projector 1C generates the three-dimensional projective transformation matrix 101, which transforms the projection restoration result for the region R5 into the Euclidean restoration result for the region R5 based on the Euclidean restoration result for the region R4 and the projection restoration result for the region R6. The projector 1C further generates the Euclidean restoration result for the region R6 by using the three-dimensional projective transformation matrix 101 to transform the projection restoration result for the region R3.

That is, the measurement system SysC, which includes the projection apparatus 16C having known internal parameters, the imaging apparatus 14 having known internal parameters, and the imaging apparatus 24C having unknown internal parameters, can acquire the Euclidean restoration result for the region R6 by using the imaging apparatus 24C without performing calibration of the imaging apparatus 24C.

Figure 27:
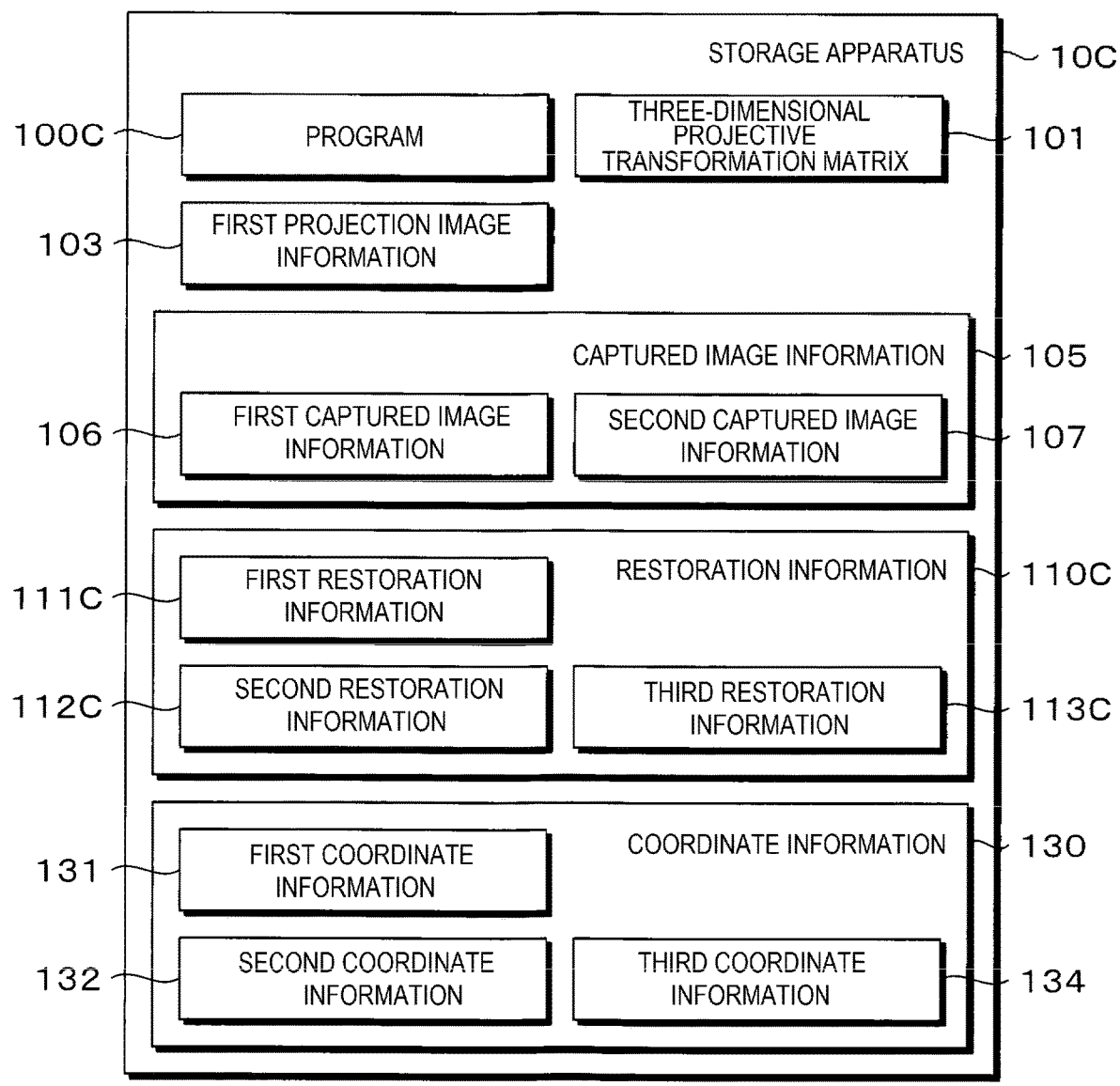
FIG. 27 is a block diagram showing the configuration of the storage apparatus according to Variation 1.

FIG. 27 is a block diagram showing the configuration of a storage apparatus 10C according to Variation 1. The projector 1C differs from the projector 1 in that the storage apparatus 10 is replaced with the storage apparatus 10C. The storage apparatus 10C differs from the storage apparatus 10 in that it stores a program 100C in place of the program 100 and restoration information 110C in place of the restoration information 110. The program 100C specifies the action of the projector 1C. The restoration information 110C contains first restoration information 111C representing the Euclidean restoration result for the region R4, second restoration information 112C representing the projection restoration result for the region R6, and third restoration information 113C representing the Euclidean restoration result for the region R6.

In the present variation, the projector 1C generates the first restoration information 111C, which represents the Euclidean restoration result for the region R4, based on the captured image GF1 projected from the projection apparatus 16C having known internal parameters and the captured image acquired GS1 acquired by the imaging apparatus 14 having known internal parameters. Specifically, the projector 1C generates the first restoration information 111C based on the third coordinate information 134 representing the coordinates of the plurality of points contained in the image GF1 and the first coordinate information 131 representing the coordinates of the plurality of points contained in the captured image GS1. The projector 1C causes the storage apparatus 10C to store the generated first restoration information 111C.

The projector 1C generates the second restoration information 112C representing the projection restoration result for the region R6 based on the image GF1 projected from the projection apparatus 16C having known internal parameters and the captured image GS2 acquired by the imaging apparatus 24C having unknown internal parameters. Specifically, the projector 1C generates the second restoration information 112C based on the third coordinate information 134 representing the coordinates of the plurality of points contained in the image GF1 and the second coordinate information 132 representing the coordinates of the plurality of points contained in the captured image GS2. The projector 1C causes the storage apparatus 10C to store the generated second restoration information 112C.

The projector 1C further generates the three-dimensional projective transformation matrix 101, which transforms the projection restoration result for the region R5 into the Euclidean restoration result for the region R5 based on the first restoration information 111C representing the Euclidean restoration result for the region R4 and the second restoration information 112C representing the projection restoration result for the region R6. That is, the three-dimensional projective transformation matrix 101 transforms the coordinates of the plurality of points indicated by the second restoration information 112C into the coordinates of the plurality of points indicated by the first restoration information 111C. The projector 1C causes the storage apparatus 10C to store the generated three-dimensional projective transformation matrix 101. The projector 1C generates the Euclidean restoration result for the region R6 by using the three-dimensional projective transformation matrix 101 to transform the projection restoration result for the region R6. In other words, the projector 1C generates the third restoration information 113C representing the Euclidean restoration result for the region R6 based on the second restoration information 112C and the three-dimensional projective trans formation matrix 101. The projector 1C causes the storage apparatus 10C to store the generated third restoration information 113C.

As described above, according to the Variation 1, the measurement system SysC, which includes the projection apparatus 16C having known internal parameters, the imaging apparatus 14 having known internal parameters, and the imaging apparatus 24C having unknown internal parameters, can acquire the Euclidean restoration result for the region R6 by using the imaging apparatus 24C. That is, the measurement system SysC can omit calibration of the imaging apparatus 24C even when acquiring a Euclidean restoration result by using the imaging apparatus 24C.

As described above, in the measurement method according to Variation 1, one of the projection apparatus 16C and the imaging apparatus 14 is an imaging apparatus, the other of the projection apparatus 16C and the imaging apparatus 14 is a projection apparatus that projects an image onto the screen SC, generating the first restoration information 111C includes projecting a first pattern image containing the plurality of points DF1 from the projection apparatus to display the projection image GP1 on the screen SC, controlling the imaging apparatus to acquire a first captured image showing the result of the capture of an image of the plurality of points DP1 contained in the projection image GP1 and being in one-to-one correspondence with the plurality of points DF1, and generating the first restoration information 111C based on the first pattern image and the first captured image, the plurality of points DP1 are displayed in the region R5, when the projection apparatus 16C is the imaging apparatus, the image GF1 is the first captured image, and the image captured GS1 is the first pattern image, and when the projection apparatus 16C is the projection apparatus, the image GF1 is the first pattern image, and the captured image GS1 is the first captured image. That is, the measurement system SysC can acquire a Euclidean restoration result by using the combination of a projection apparatus having known internal parameters and an imaging apparatus having known internal parameters. The measurement system SysC can thus accurately measure the three-dimensional shape of an object.

In Variation 1, the projection apparatus 16C is an example of the "first apparatus", the imaging apparatus 14 is an example of the "second apparatus", the screen SC is an example of the "screen", the first restoration information 111C is an example of the "first restoration information", the plurality of points DF1 are an example of the "plurality of first points", the projection image GP1 is an example of the "first projection image", the plurality of points DP1 are an example of the "plurality of second points", the region R5 is an example of the "third region", the image GF1 is an example of the "first image", and the captured image GS1 is an example of the "second image". The imaging apparatus 14 exemplifies the "imaging apparatus". The projection apparatus 16C exemplifies the "projection apparatus". The image GF1 exemplifies the "first pattern image". The captured image GS1 exemplifies the "first captured image".

4.2. Variation 2

The aforementioned embodiment and variation have been described with reference to the case where a measurement system including a projection apparatus having known internal parameters, an imaging apparatus having known internal parameters, and a projection apparatus having unknown internal parameters acquires a Euclidean restoration result by using the projection apparatus having unknown internal parameters without calibration of the projection apparatus having unknown internal parameters, and the present disclosure is not limited to such an aspect. For example, a measurement system including two projection apparatuses each having known internal parameters and an imaging apparatus having unknown internal parameters can acquire a Euclidean restoration result by using the imaging apparatus having unknown internal parameters without calibration of the imaging apparatus having unknown internal parameters.

Figure 28:
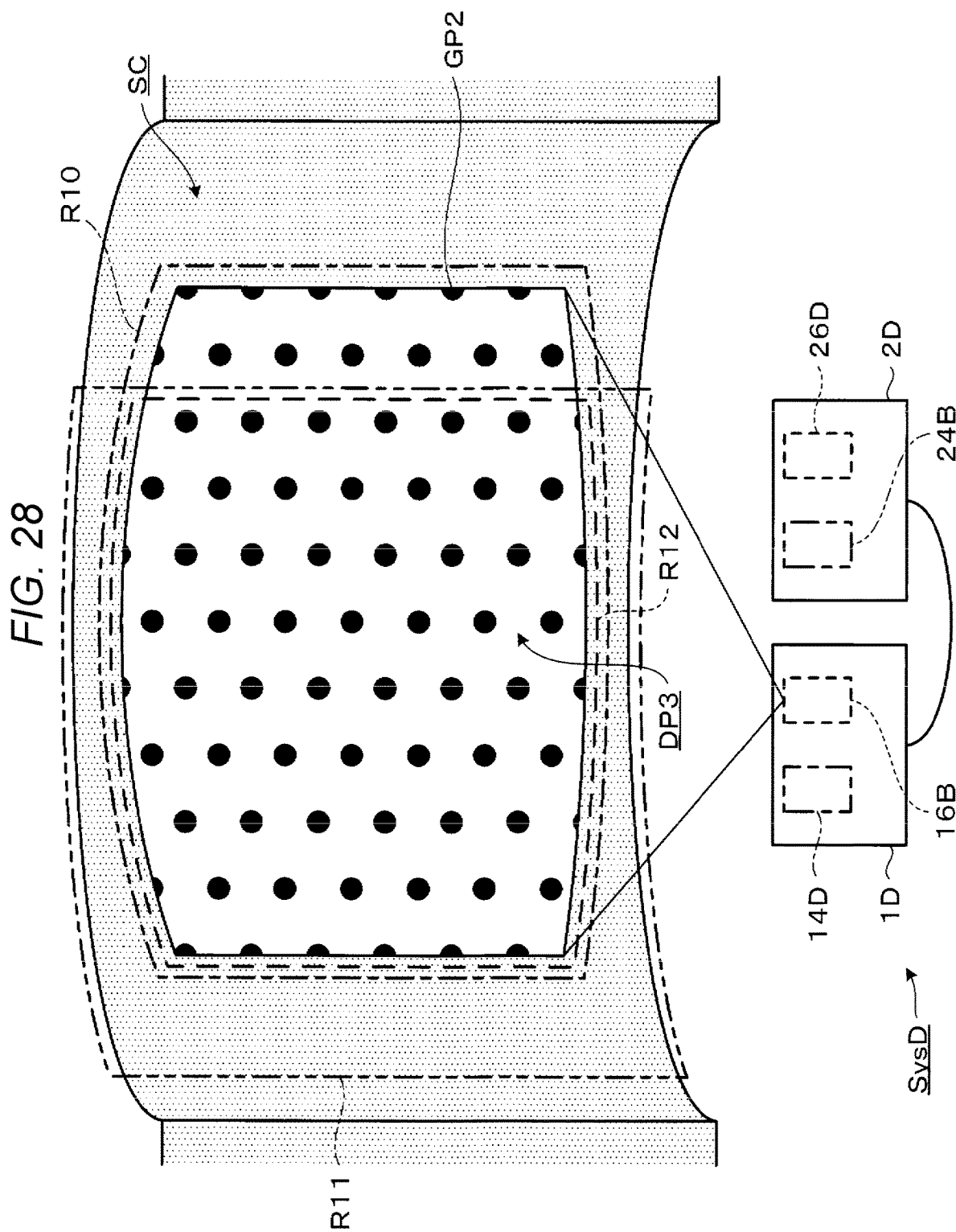
FIG. 28 is a diagrammatic view showing how the projection image is displayed in Variation 2.
Figure 29:
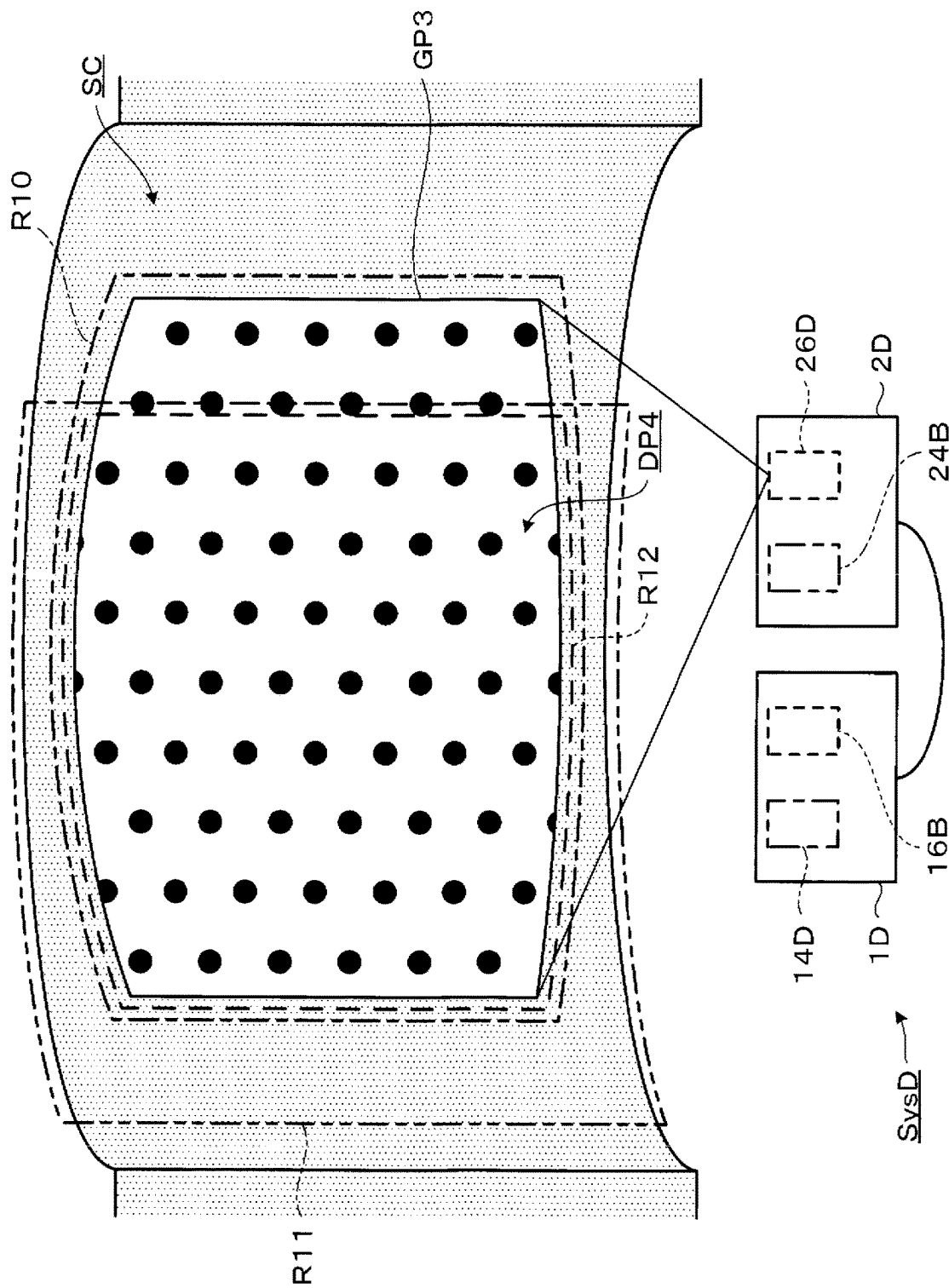
FIG. 29 is a diagrammatic view showing how the other projection image is displayed in Variation 2.

An overview of a measurement system SysD according to Variation 2 will be described below with reference to FIGS. 28 and 29. FIG. 28 is a diagrammatic view showing how the projection image GP2 is displayed in Variation 2. FIG. 29 is a diagrammatic view showing how the projection image GP3 is displayed in Variation 2. The measurement system SysD includes a projector 1D and a projector 2D. The projector 1D differs from the projector 1B in that the imaging apparatus 14B is replaced with an imaging apparatus 14D. The imaging apparatus 14D has unknown internal parameters. The projector 2D differs from the projector 2B in that the projection apparatus 26B is replaced with a projection apparatus 26D. The projection apparatus 26D has known internal parameters.

The projection apparatus 16B projects the image GF2 containing the plurality of points DF2 to display the projection image GP2 on the screen SC. In other words, a processing apparatus that is not shown but is provided in the projector 1D causes the projection apparatus 16B to project the image GF2 containing the plurality of points DF2 to display the projection image GP2 on the screen SC. The plurality of points DP3 contained in the projection image GP2 are displayed in the region R12.

It is assumed for convenience of the description that the projection apparatuses 26D and 26B have the same configuration but differ from each other only in that the internal parameters are known or unknown. That is, the projection apparatus 26D includes the light modulator 260B and the projection lens 262B. The projection apparatus 26D projects the image GF3 containing the plurality of points DF3 to display the projection image GP3 on the screen SC. In other words, a processing apparatus that is not shown but is provided in the projector 1D causes the projection apparatus 26D to project the image GF3 containing the plurality of points DF3 to display the projection image GP3 on the screen SC. The plurality of points DP4 contained in the projection image GP3 are displayed in the region R12.

It is further assumed that the imaging apparatuses 14D and 14B have the same configuration but differ from each other only in that the internal parameters are known or unknown. That is, the imaging apparatus 14D includes the imaging device 140B and the imaging lens 142B. The imaging apparatus 14D captures an image of part of the projection image GP2 displayed on the screen SC by the projection apparatus 16B. In other words, the imaging apparatus 14D captures an image of the range containing the region R11, which is part of the screen SC and in which part of the projection image GP2 is displayed. That is, the processing apparatus that is not shown but is provided in the projector 1D acquires the captured image GS6 representing the result of the capture of an image of the plurality of points DP3 contained in the projection image GP2 by controlling the imaging apparatus 14D. The imaging apparatus 14D further captures an image of part of the projection image GP3 displayed on the screen SC by the projection apparatus 26D. In other words, the imaging apparatus 14D captures an image of the range containing the region R11, which is part of the screen SC and in which part of the projection image GP3 is displayed. That is, the processing apparatus that is not shown but is provided in the projector 1D acquires the captured image GS7 representing the result of the capture of an image of the plurality of points DP4 contained in the projection image GP3 by controlling the imaging apparatus 14D.

The projector 1D acquires the Euclidean restoration result for the region R10 based on the image GF2 projected from the projection apparatus 16B having known internal parameters, the captured image GS6 representing the result of the capture of part of the projection image GP2 displayed on the screen SC as a result of the projection of the image GF2, the image GF3 projected from the projection apparatus 26D having known internal parameters, and the captured image GS7 representing the result of the capture of part of the projection image GP3 displayed on the screen SC as a result of the projection of the image GF3. The Euclidean restoration result for the region R10 includes the Euclidean restoration result for the region R12. The projector 1D further acquires the projection restoration result for the region R12 based on the image GF2 projected from the projection apparatus 16B having known internal parameters, and the captured image GS6, which is acquired by the imaging apparatus 14D having unknown internal parameters and represents the result of the capture of an image of part of the captured image GP2 displayed on the screen SC as a result of the projection of the image GF2. The projector 1D generates the three-dimensional projective transformation matrix 101B, which transforms the projection restoration result for the region R12 into the Euclidean restoration result for the region R12, based on the Euclidean restoration result for the region R10 and the projection restoration result for the region R12. The projector 1D further generates the Euclidean restoration result for the region R12 by using the three-dimensional projective transformation matrix 101B to transform the projection restoration result for the region R12.

That is, the measurement system SysD, which includes the projection apparatus 16B having known internal parameters, the projection apparatus 26D having known internal parameters, and the imaging apparatus 14D having unknown internal parameters, can acquire the Euclidean restoration result for the region R12 by using the imaging apparatus 14D without performing calibration of the imaging apparatus 14D.

Figure 30:
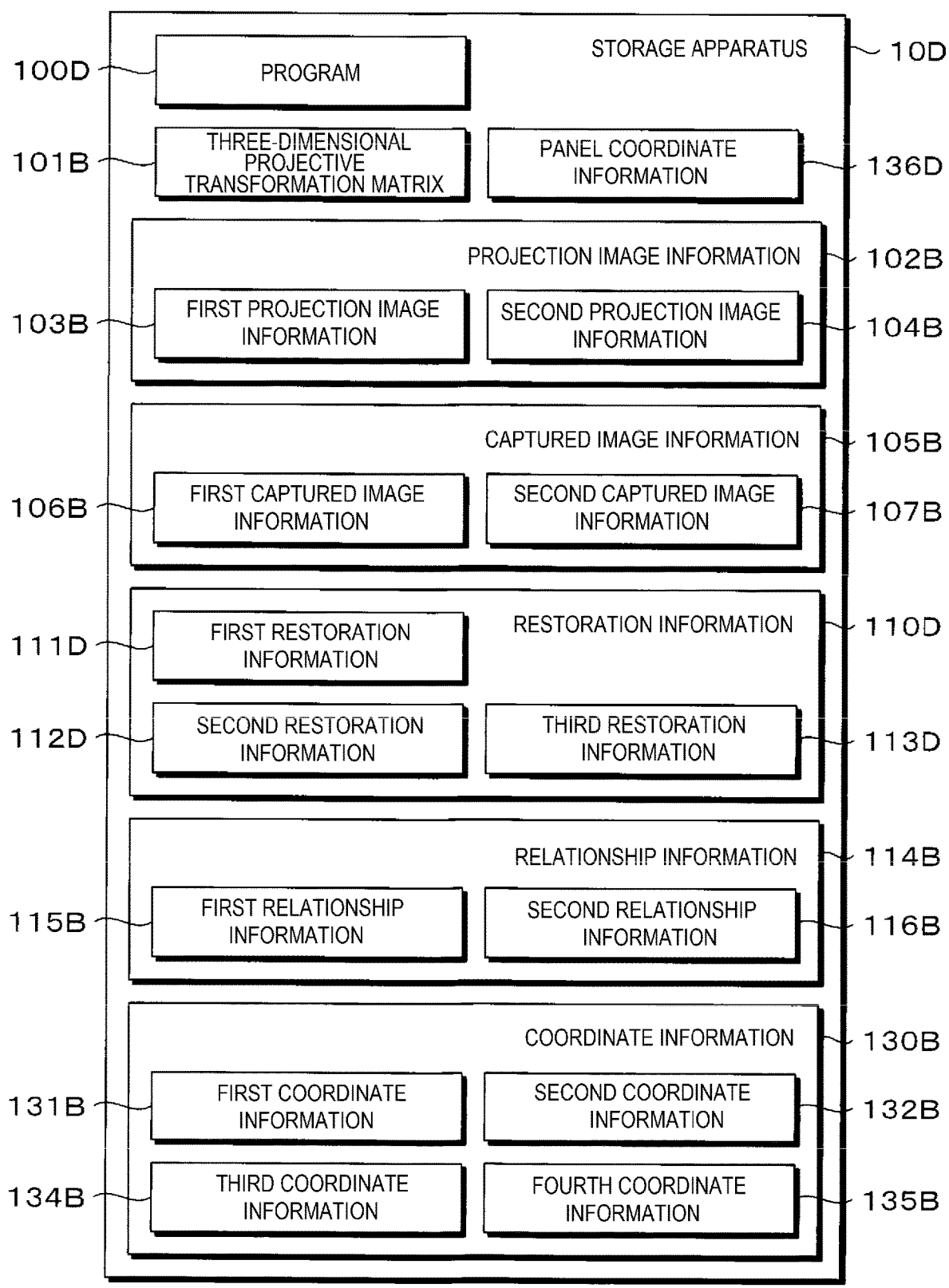
FIG. 30 is a block diagram showing the configuration of the storage apparatus according to Variation 2.

FIG. 30 is a block diagram showing the configuration of a storage apparatus 10D according to Variation 2. The projector 1D differs from the projector 1B in that the storage apparatus 10B is replaced with the storage apparatus 10D. The storage apparatus 10D differs from the storage apparatus 10B in that it stores a program 100D in place of the program 100B and restoration information 110D in place of the restoration information 110B. The program 100D specifies the action of the projector 1D. The restoration information 110D includes first restoration information 111D representing the Euclidean restoration result for the region R10, second restoration information 112D representing the projection restoration result for the region R12, and third restoration information 113D representing the Euclidean restoration result for the region R12.

In the present variation, based on the first projection image information 103B and the first captured image information 106B, the projector 1D generates the first relationship information 115B indicating the correspondence between the plurality of pixels provided in the light modulator 160B provided in the projection apparatus 16B, which projects the image GF2 indicated by the first projection image information 103B, and the plurality of pixels provided in the imaging device 140B provided in the imaging apparatus 14D, which generates the first captured image information 106B. In other words, the projector 1D generates the first relationship information 115B based on the image GF2 indicated by the first projection image information 103B and the captured image GS6 indicated by the first captured image information 106B. Specifically, the projector 1D generates the first relationship information 115B based on the third coordinate information 134B representing the coordinates of the plurality of points contained in the image GF2 and the first coordinate information 131B representing the coordinates of the plurality of points contained in the captured image GS6. The projector 1D causes the storage apparatus 10D to store the generated first relationship information 115B.

Based on the second projection image information 104B and the second captured image information 107B, the projector 1D further generates the second relationship information 116B indicating the correspondence between the plurality of pixels provided in the light modulator 260B provided in the projection apparatus 26D, which projects the image GF3 indicated by the second projection image information 104B, and the plurality of pixels provided in the imaging device 140B provided in the imaging apparatus 14D, which generates the second captured image information 107B. In other words, the projector 1D generates the second relationship information 116B based on the image GF3 indicated by the second projection image information 104B and the captured image GS7 indicated by the second captured image information 107B. Specifically, the projector 1D generates the second relationship information 116B based on the fourth coordinate information 135B representing the coordinates of the plurality of points contained in the image GF3 and the second coordinate information 132B representing the coordinates of the plurality of points contained in the captured image GS7. The projector 1D causes the storage apparatus 10D to store the generated second relationship information 116B.

The projector 1D further generates the panel coordinate information 136B representing the coordinates of the plurality of points DF2$x$ in the light modulator 260B, which are in one-to-one correspondence with the plurality of points DF2, based on the first relationship information 115B, the second relationship information 116B, the captured image GS6, and the captured image GS7. The projector 1D causes the storage apparatus 10D to store the generated panel coordinate information 136B.

In the present variation, the projector 1D generates the first restoration information 111D representing the Euclidean restoration result for the region R10 based on the image GF2 projected from the projection apparatus 16B having known internal parameters and the image acquired GF3 projected from the projection apparatus 26D having known internal parameters. Specifically, the projector 1D generates the first restoration information 111D based on the third coordinate information 134B representing the coordinates of the plurality of points contained in the image GF2 and the panel coordinate information 136B based on the second relationship information 116B based on the image GF3. The projector 1D causes the storage apparatus 10D to store the generated first restoration information 111D.

The projector 1D further generates the second restoration information 112D representing the projection restoration result for the region R12 based on the image GF2 projected from the projection apparatus 16B having known internal parameters and the captured image GS6 acquired by the imaging apparatus 14D having unknown internal parameters. Specifically, the projector 1D generates the second restoration information 112D based on the first coordinate information 131B representing the coordinates of the plurality of points contained in the captured image GS6 and the third coordinate information 134B representing the coordinates of the plurality of points contained in the image GF2. The projector 1D causes the storage apparatus 10D to store the generated second restoration information 112D.

The projector 1D further generates the three-dimensional projective transformation matrix 101B, which transforms the projection restoration result for the region R12 into the Euclidean restoration result for the region R12, based on the first restoration information 111D representing the Euclidean restoration result for the region R10 and the second restoration information 112D representing the projection restoration result for the region R12. That is, the three-dimensional projective transformation matrix 101B transforms the coordinates of the plurality of points indicated by the second restoration information 112D into the coordinates of the plurality of points indicated by the first restoration information 111D. The projector 1D causes the storage apparatus 10D to store the generated three-dimensional projective transformation matrix 101B. The projector 1D further generates the Euclidean restoration result for the region R12 by using the three-dimensional projective transformation matrix 101B to transform the projection restoration result for the region R12. In other words, the projector 1D generates the third restoration information 113D representing the Euclidean restoration result for the region R12 based on the second restoration information 112D and the three-dimensional projective transformation matrix 101B. The projector 1D causes the storage apparatus 10D to store the generated third restoration information 113D.

As described above, according to the Variation 2, the measurement system SysD, which includes the projection apparatus 16B having known internal parameters, the projection apparatus 26D having known internal parameters, and the imaging apparatus 14D having unknown internal parameters, can acquire the Euclidean restoration result for the region R12 by using the imaging apparatus 14D. That is, the measurement system SysD can omit calibration of the imaging apparatus 14D even when acquiring a Euclidean restoration result by using the imaging apparatus 14D.

As described above, in the measurement method according to Variation 2, the projection apparatuses 16B and 26D are each a projection apparatus that projects an image onto the screen SC, the imaging apparatus 14D is an imaging apparatus, the projection apparatus 16B includes the light modulator 160B, which modulates the light emitted from the light source into the projection light for displaying a projection image on the screen SC, the projection apparatus 26D includes the light modulator 260B, which modulates the light emitted from the light source into the projection light for displaying a projection image on the screen SC, the imaging apparatus 14D includes the imaging device 140B, which converts the light focused by the imaging lens 142B into an electric signal to generate a captured image, generating the first restoration information 111D includes projecting the second pattern image containing the plurality of points DF2 from the projection apparatus 16B to display the projection image GP2 on the screen SC, projecting a fourth pattern image containing the plurality of points DF3 from the projection apparatus 26D to display the projection image GP3 on the screen SC, controlling the imaging apparatus 14D to acquire a seventh captured image representing the result of the capture of the plurality of points DP3 contained in the projection image GP2 and being in one-to-one correspondence with the plurality of points DF2, controlling the imaging apparatus 14D to acquire an eighth captured image representing the result of the capture of the plurality of points DP4 contained in the projection image GP3 and being in one-to-one correspondence with the plurality of points DF3, generating the first relationship information 115B representing the correspondence between the plurality of pixels provided in the light modulator 160B and the plurality of pixels provided in the imaging device 140B based on the second pattern image and the seventh captured image, generating the second relationship information 116B representing the correspondence between the plurality of pixels provided in the light modulator 260B and the plurality of pixels provided in the imaging device 140B based on the fourth pattern image and the eighth captured image, generating the panel coordinate information 136B representing the coordinates of the plurality of points DF2$x$ in the light modulator 260B, which are in one-to-one correspondence with the plurality of points DF2, based on the first relationship information 115B, the second relationship information 116B, the seventh captured image, and the eighth captured image, and generating the first restoration information 111D based on the second pattern image and the panel coordinate information 136B, the plurality of points DP3 are displayed in the region R12, the image GF2 is the second pattern image, the image GF3 is the fourth pattern image, and the captured image GS6 is the seventh captured image.

That is, the measurement system SysD can acquire a Euclidean restoration result by using the combination of two projection apparatuses each having known internal parameters and an imaging apparatus having unknown internal parameters. The measurement system SysD can thus accurately measure the three-dimensional shape of an object.

In Variation 2, the projection apparatus 16B is an example of the "first apparatus", the projection apparatus 26D is an example of the "second apparatus", the imaging apparatus 14D is an example of the "third apparatus", the screen SC is an example of the "screen", the light modulator 160B is an example of the "first light modulator", the light modulator 260B is an example of a "third light modulator", the imaging lens 142B is an example of the "third lens", the imaging device 140B is an example of a "second imaging device", the first restoration information 111D is an example of the "first restoration information", the plurality of points DF2 is an example of the "plurality of fourth points", the projection image GP2 is an example of the "second projection image", the plurality of points DF3 is an example of a "plurality of ninth points", the projection image GP3 is an example of a "fourth projection image", the plurality of points DP3 is an example of the "plurality of sixth points", the plurality of points DP4 is an example of a "plurality of tenth points", the first relationship information 115B is an example of "third relationship information", the second relationship information 116B is an example of "fourth relationship information", the points DF2x is an example of a "plurality of eleventh points", the panel coordinate information 136B is an example of "second coordinate information", the region R12 is an example of the "third region", the image GF2 is an example of the "first image", the image GF3 is an example of the "second image", and the captured image GS6 is an example of the "third image". The projection apparatuses 16B and 26D exemplify the "projection apparatus". The imaging apparatus 14D exemplifies the "imaging apparatus". The image GF2 exemplifies the "second pattern image". The image GF3 exemplifies a "fourth pattern image". The captured image GS6 exemplifies a "seventh captured image". The captured image GS7 exemplifies an "eighth captured image".

4.3. Variation 3

The aforementioned embodiment and variations have been described with reference to the case where a measurement system including two imaging apparatuses each having known internal parameters and a projection apparatus having unknown internal parameters acquires a Euclidean restoration result by using the projection apparatus having unknown internal parameters without calibration of the projection apparatus having unknown internal parameters, and the present disclosure is not limited to such an aspect. For example, the measurement system may include an imaging apparatus having known internal parameters, a projection apparatus having known internal parameters, and an imaging apparatus having unknown internal parameters. The measurement system including an imaging apparatus having known internal parameters, a projection apparatus having known internal parameters, and an imaging apparatus having unknown internal parameters can acquire a Euclidean restoration result by using the imaging apparatus having unknown internal parameters without calibration of the imaging apparatus having unknown internal parameters.

4.4. Variation 4

The aforementioned embodiment and variations have been described with reference to the case where a measurement system including a projection apparatus having known internal parameters, an imaging apparatus having known internal parameters, and a projection apparatus having unknown internal parameters acquires a Euclidean restoration result by using the projection apparatus having unknown internal parameters without calibration of the projection apparatus having unknown internal parameters, and the present disclosure is not limited to such an aspect. For example, the measurement system may include an imaging apparatus having known internal parameters, a projection apparatus having known internal parameters, and a projection apparatus having unknown internal parameters. The measurement system including an imaging apparatus having known internal parameters, a projection apparatus having known internal parameters, and a projection apparatus having unknown internal parameters can acquire a Euclidean restoration result by using the projection apparatus having unknown internal parameters without calibration of the projection apparatus having unknown internal parameters.

4.5. Variation 5

The aforementioned embodiment and variations have been described with reference to the case where the image projected from a projection apparatus is an image having what is called a polka-dot pattern, but the present disclosure is not limited to such an aspect. The image projected from the projection apparatus may, for example, be an image having what is called a lattice pattern having a plurality of straight lines parallel to the lengthwise direction of the image and a plurality of straight lines parallel to the widthwise direction of the image. The image projected from the projection apparatus may instead be an image having what is called a checkered pattern.

The image projected from the projection apparatus may be an image having a sinusoidal fringe pattern, which is used for the phase shift method. When an image having a sinusoidal fringe pattern is used, the projection apparatus successively projects a plurality of images each having a fringe pattern having a phase different from those of the other fringe patterns onto an object having a three-dimensional shape to be measured. The imaging apparatus successively captures images of the plurality of projection images displayed on the object.

4.6. Variation 6

The aforementioned embodiment and variations have been described with reference to the case where a single processing apparatus controls the action of the measurement system, but the present disclosure is not limited to such an aspect. The measurement system according to an embodiment of the present disclosure may include two or more processing apparatuses that control the action of the measurement system. For example, when the measurement system includes two processing apparatuses, the two processing apparatuses may be provided in different apparatuses.

4.7. Variation 7

The aforementioned embodiment and variations have been described with reference to the case where two projection apparatuses project images at different timings and images of two types of projection images displayed on the screen SC are separately captured, but the present disclosure is not limited to such an aspect. The two projection apparatuses may instead simultaneously display projection images on the screen SC. When the two projection apparatuses simultaneously display projection images on the screen SC, the imaging apparatus captures an image of a range containing at least part of the region where the projection images displayed by the two projection apparatuses overlap with each other. When the two projection apparatuses simultaneously display projection images on the screen SC, it is preferable that the two projection apparatuses project different images. The configuration described above allows the projection image displayed on the screen SC by one of the two projection apparatuses to be distinguished from the projection image displayed on the screen SC by the other.

5. Additional Remarks

A summary of the present disclosure will be described below as additional remarks.

5.1. Additional Remark 1

A measurement method including generating first restoration information representing a Euclidean restoration result for a first region of a screen that is a non-planar surface based on a first image that is one of an image input to a first apparatus including a first lens and having known internal parameters relating to the first lens and an image output from the first apparatus, and a second image that is one of an image input to a second apparatus including a second lens and having known internal parameters relating to the second lens and an image output from the second apparatus, generating second restoration information representing a projection restoration result for a second region of the screen based on a third image that is one of an image input to a third apparatus including a third lens and having unknown internal parameters relating to the third lens and an image output from the third apparatus, and the first image, generating a three-dimensional projective transformation matrix for transforming the coordinates of a plurality of points indicated by the second restoration information into the coordinates of a plurality of points indicated by the first restoration information based on the first restoration information and the second restoration information, and generating third restoration information representing a Euclidean restoration result for the second region based on the second restoration information and the three-dimensional projective transformation matrix, at least one of the first, second, and third apparatuses being an imaging apparatus that captures an image of the screen, and at least part of the first region and at least part of the second region overlapping with each other in a third region.

That is, a measurement system that achieves the measurement method described in the additional remark 1 can use the Euclidean restoration result for the first region acquired by using the apparatuses each having known internal parameters to transform the projection restoration result for the second region acquired by using the apparatus having unknown internal parameters into the Euclidean restoration result for the second region. The measurement system that achieves the measurement method described in the additional remark 1 can thus omit calibration of the apparatus having unknown internal parameters even when acquiring the Euclidean restoration result for the second region.

5.2. Additional Remark 2

The measurement method described in the additional remark 1, in which one of the first and third apparatuses is the imaging apparatus, the other of the first and third apparatuses is a projection apparatus that projects an image onto the screen, generating the second restoration information includes projecting a first pattern image containing a plurality of first points from the projection apparatus to display a first projection image on the screen, controlling the imaging apparatus to acquire a first captured image showing the result of capture of an image of a plurality of second points contained in the first projection image and being in one-to-one correspondence with the plurality of first points, and generating the second restoration information based on the first pattern image and the first captured image, the plurality of second points are displayed in the third region, when the first apparatus is the imaging apparatus, the first image is the first captured image, and the third image is the first pattern image, and when the first apparatus is the projection apparatus, the first image is the first pattern image, and the third image is the first captured image.

That is, the measurement system that achieves the measurement method described in the additional remark 2 can acquire a projection restoration result by using the combination of an imaging apparatus having known internal parameters and a projection apparatus having unknown internal parameters, or the combination of a projection apparatus having known internal parameters and an imaging apparatus having unknown internal parameters. The measurement system that achieves the measurement method described in the additional remark 2 can thus accurately measure the three-dimensional shape of an object even when one of the imaging apparatus and the projection apparatus has unknown internal parameters.

5.3. Additional Remark 3

The measurement method described in the additional remark 1, in which the first and third apparatuses are each the imaging apparatus, the third region contains a plurality of third points, generating the second restoration information includes controlling the first apparatus to acquire a second captured image representing the result of capture of an image of the plurality of third points, controlling the third apparatus to acquire a third captured image representing the result of capture of an image of the plurality of third points, and generating the second restoration information based on the second and third captured images, the first image is the second captured image, and the third image is the third captured image.

That is, the measurement system that achieves the measurement method described in the additional remark 3 can acquire a projection restoration result by using the combination of an imaging apparatus having known internal parameters and an imaging apparatus having unknown internal parameters. The measurement system that achieves the measurement method described in the additional remark 3 can thus accurately measure the three-dimensional shape of an object even when any one of the plurality of imaging apparatuses has unknown internal parameters.

5.4. Additional Remark 4

The measurement method described in the additional remark 1, in which the first and third apparatuses are each a projection apparatus that projects an image onto the screen, the second apparatus is the imaging apparatus, the first apparatus includes a first light modulator that modulates the light emitted from a light source into projection light for displaying a projection image on the screen, the second apparatus includes a first imaging device that converts the light focused by the second lens into an electric signal to generate a captured image, the third apparatus includes a second light modulator that modulates the light emitted from a light source into projection light for displaying a projection image on the screen, generating the second restoration information includes projecting a second pattern image containing a plurality of fourth points from the first apparatus to display a second projection image on the screen, projecting a third pattern image containing a plurality of fifth points from the third apparatus to display a third projection image on the screen, controlling the second apparatus to acquire a fourth captured image representing the result of capture of a plurality of sixth points contained in the second projection image and being in one-to-one correspondence with the plurality of fourth points, controlling the second apparatus to acquire a fifth captured image representing the result of capture of a plurality of seventh points contained in the third projection image and being in one-to-one correspondence with the plurality of fifth points, generating first relationship information representing the correspondence between a plurality of pixels provided in the first light modulator and a plurality of pixels provided in the first imaging device based on the second pattern image and the fourth captured image, generating second relationship information representing the correspondence between a plurality of pixels provided in the second light modulator and the plurality of pixels provided in the first imaging device based on the third pattern image and the fifth captured image, generating first coordinate information representing the coordinates of a plurality of eighth points in the second light modulator that are in one-to-one correspondence with the plurality of fourth points based on the first relationship information, the second relationship information, the fourth captured image, and the fifth captured image, and generating the second restoration information based on the second pattern image and the first coordinate information, the plurality of sixth points are displayed in the third region, the first image is the second pattern image, the second image is the fourth captured image, and the third image is the third pattern image.

That is, the measurement system that achieves the measurement method described in the additional remark 4 can acquire a projection restoration result by using the combination of a projection apparatus having known internal parameters, an imaging apparatus having known internal parameters, and a projection apparatus having unknown internal parameters. The measurement system that achieves the measurement method described in the additional remark 4 can thus accurately measure the three-dimensional shape of an object even when any one of the plurality of projection apparatuses has unknown internal parameters.

5.5. Additional Remark 5

The measurement method described in anyone of the additional remarks 1 to 3, in which one of the first and second apparatuses is the imaging apparatus, the other of the first and second apparatuses is a projection apparatus that projects an image onto the screen, generating the first restoration information includes projecting a first pattern image containing a plurality of first points from the projection apparatus to display a first projection image on the screen, controlling the imaging apparatus to acquire a first captured image showing the result of capture of an image of a plurality of second points contained in the first projection image and being in one-to-one correspondence with the plurality of first points, and generating the first restoration information based on the first pattern image and the first captured image, the plurality of second points are displayed in the third region, when the first apparatus is the imaging apparatus, the first image is the first captured image, and the second image is the first pattern image, and when the first apparatus is the projection apparatus, the first image is the first pattern image, and the second image is the first captured image.

That is, the measurement system that achieves the measurement method described in the additional remark 5 can acquire a Euclidean restoration result by using the combination of a projection apparatus having known internal parameters and an imaging apparatus having known internal parameters. The measurement system that achieves the measurement method described in the additional remark 5 can thus accurately measure the three-dimensional shape of an object.

5.6. Additional Remark 6

The measurement method described in any one of the additional remarks 1 to 3, in which the first and second apparatuses are each the imaging apparatus, the third region contains a plurality of third points, generating the first restoration information includes controlling the first apparatus to acquire a second captured image representing the result of capture of an image of the plurality of third points, controlling the second apparatus to acquire a sixth captured image representing the result of capture of an image of the plurality of third points, and generating the first restoration information based on the second and sixth captured images, the first image is the second captured image, and the second image is the sixth captured image.

That is, the measurement system that achieves the measurement method described in the additional remark 6 can acquire a Euclidean restoration result by using the combination of two imaging apparatuses each having known internal parameters. The measurement system that achieves the measurement method described in the additional remark 6 can thus accurately measure the three-dimensional shape of an object.

5.7. Additional Remark 7

The measurement method described in the additional remark 1, in which the first and second apparatuses are each a projection apparatus that projects an image onto the screen, the third apparatus is the imaging apparatus, the first apparatus includes a first light modulator that modulates the light emitted from a light source into projection light for displaying a projection image on the screen, the second apparatus includes a third light modulator that modulates the light emitted from a light source into projection light for displaying a projection image on the screen, the third apparatus includes a second imaging device that converts the light focused by the third lens into an electric signal to generate a captured image, generating the first restoration information includes projecting a second pattern image containing a plurality of fourth points from the first apparatus to display a second projection image on the screen, projecting a fourth pattern image containing a plurality of ninth points from the second apparatus to display a fourth projection image on the screen, controlling the third apparatus to acquire a seventh captured image representing the result of capture of a plurality of sixth points contained in the second projection image and being in one-to-one correspondence with the plurality of fourth points, controlling the third apparatus to acquire an eighth captured image representing the result of capture of a plurality of tenth points contained in the fourth projection image and being in one-to-one correspondence with the plurality of ninth points, generating third relationship information representing the correspondence between a plurality of pixels provided in the first light modulator and a plurality of pixels provided in the second imaging device based on the second pattern image and the seventh captured image, generating fourth relationship information representing the correspondence between a plurality of pixels provided in the third light modulator and a plurality of pixels provided in the second imaging device based on the fourth pattern image and the eighth captured image, generating second coordinate information representing the coordinates of a plurality of eleventh points in the third light modulator that are in one-to-one correspondence with the plurality of fourth points based on the third relationship information, the fourth relationship information, the seventh captured image, and the eighth captured image, and generating the first restoration information based on the second pattern image and the second coordinate information, the plurality of sixth points are displayed in the third region, the first image is the second pattern image, the second image is the fourth pattern image, and the third image is the seventh captured image.

That is, the measurement system that achieves the measurement method described in the additional remark 7 can acquire a Euclidean restoration result by using the combination of two projection apparatus each having known internal parameters and an imaging apparatus having unknown internal parameters. The measurement system that achieves the measurement method described in the additional remark 7 can thus accurately measure the three-dimensional shape of an object.

5.8. Additional Remark 8

A measurement system including a first apparatus including a first lens and having known internal parameters relating to the first lens, a second apparatus including a second lens and having known internal parameters relating to the second lens, a third apparatus including a third lens and having unknown internal parameters relating to the third lens, and a processing apparatus that generates first restoration information representing a Euclidean restoration result for a first region of a screen that is a non-planar surface based on a first image that is one of an image input to the first apparatus and an image output from the first apparatus, and a second image that is one of an image input to the second apparatus and an image output from the second apparatus, generates second restoration information representing a projection restoration result for a second region of the screen based on a third image that is one of an image input to the third apparatus and an image output from the third apparatus, and the first image, generates a three-dimensional projective transformation matrix for transforming the coordinates of a plurality of points indicated by the second restoration information into the coordinates of a plurality of points indicated by the first restoration information based on the first restoration information and the second restoration information, and generates third restoration information representing a Euclidean restoration result for the second region based on the second restoration information and the three-dimensional projective transformation matrix, at least one of the first, second, and third apparatuses being an imaging apparatus that captures an image of the screen, and at least part of the first region and at least part of the second region overlapping with each other in a third region.

That is, the measurement system described in the additional remark 8 can transform the projection restoration result for the second region acquired by using an apparatus having unknown internal parameters into the Euclidean restoration result for the second region by using the Euclidean restoration result for the first region acquired by using an apparatus having known internal parameters. The measurement system described in the additional remark 8 can thus omit calibration of the apparatus having unknown internal parameters even when acquiring the Euclidean restoration result for the second region.

5.9. Additional Remark 9

An information processing apparatus including a processing apparatus that generates first restoration information representing a Euclidean restoration result for a first region of a screen that is a non-planar surface based on a first image that is one of an image input to a first apparatus including a first lens and having known internal parameters relating to the first lens and an image output from the first apparatus, and a second image that is one of an image input to a second apparatus including a second lens and having known internal parameters relating to the second lens and an image output from the second apparatus, generates second restoration information representing a projection restoration result for a second region of the screen based on a third image that is one of an image input to a third apparatus including a third lens and having unknown internal parameters relating to the third lens and an image output from the third apparatus, and the first image, generates a three-dimensional projective transformation matrix for transforming the coordinates of a plurality of points indicated by the second restoration information into the coordinates of a plurality of points indicated by the first restoration information based on the first restoration information and the second restoration information, and generates third restoration information representing a Euclidean restoration result for the second region based on the second restoration information and the three-dimensional projective transformation matrix, at least one of the first, second, and third apparatuses being an imaging apparatus that captures an image of the screen, and at least part of the first region and at least part of the second region overlapping with each other in a third region.

That is, the measurement system including the information processing apparatus described in the additional remark 9 can transform the projection restoration result for the second region acquired by using an apparatus having unknown internal parameters into the Euclidean restoration result for the second region by using the Euclidean restoration result for the first region acquired by using an apparatus having known internal parameters. The measurement system including the information processing apparatus described in the additional remark 9 can thus omit calibration of the apparatus having unknown internal parameters even when acquiring the Euclidean restoration result for the second region.

What is claimed is:
1. A measurement method comprising:
generating first restoration information representing a Euclidean restoration result for a first region of a screen that is a non-planar surface based on a first image that is one of an image input to a first apparatus including a first lens and having known internal parameters relating to the first lens and an image output from the first apparatus, and a second image that is one of an image input to a second apparatus including a second lens and having known internal parameters relating to the second lens and an image output from the second apparatus;
generating second restoration information representing a projection restoration result for a second region of the screen based on a third image that is one of an image input to a third apparatus including a third lens and having unknown internal parameters relating to the third lens and an image output from the third apparatus, and the first image;
generating a three-dimensional projective transformation matrix for transforming coordinates of a plurality of points indicated by the second restoration information into coordinates of a plurality of points indicated by the first restoration information based on the first restoration information and the second restoration information; and
generating third restoration information representing a Euclidean restoration result for the second region based on the second restoration information and the three-dimensional projective transformation matrix, wherein at least one of the first, second, and third apparatuses is an imaging apparatus that captures an image of the screen, and
at least part of the first region and at least part of the second region overlap with each other in a third region.

2. The measurement method according to claim 1,
wherein one of the first and third apparatuses is the imaging apparatus,
another of the first and third apparatuses is a projection apparatus that projects an image onto the screen,
generating the second restoration information includes
projecting a first pattern image containing a plurality of first points from the projection apparatus to display a first projection image on the screen,
controlling the imaging apparatus to acquire a first captured image showing a result of capture of an image of a plurality of second points contained in the first projection image and being in one-to-one correspondence with the plurality of first points, and
generating the second restoration information based on the first pattern image and the first captured image,
the plurality of second points are displayed in the third region,
when the first apparatus is the imaging apparatus,
the first image is the first captured image, and
the third image is the first pattern image, and
when the first apparatus is the projection apparatus,
the first image is the first pattern image, and
the third image is the first captured image.

3. The measurement method according to claim 1,
wherein the first and third apparatuses are each the imaging apparatus,
the third region contains a plurality of third points,
generating the second restoration information includes
controlling the first apparatus to acquire a second captured image representing a result of capture of an image of the plurality of third points,
controlling the third apparatus to acquire a third captured image representing a result of capture of an image of the plurality of third points, and
generating the second restoration information based on the second and third captured images,
the first image is the second captured image, and
the third image is the third captured image.

4. The measurement method according to claim 1,
wherein the first and third apparatuses are each a projection apparatus that projects an image onto the screen,
the second apparatus is the imaging apparatus,
the first apparatus includes a first light modulator that modulates light emitted from a light source into projection light for displaying a projection image on the screen,
the second apparatus includes a first imaging device that converts light focused by the second lens into an electric signal to generate a captured image,
the third apparatus includes a second light modulator that modulates light emitted from a light source into projection light for displaying a projection image on the screen,
generating the second restoration information includes
projecting a second pattern image containing a plurality of fourth points from the first apparatus to display a second projection image on the screen,
projecting a third pattern image containing a plurality of fifth points from the third apparatus to display a third projection image on the screen,
controlling the second apparatus to acquire a fourth captured image representing a result of capture of a plurality of sixth points contained in the second projection image and being in one-to-one correspondence with the plurality of fourth points,
controlling the second apparatus to acquire a fifth captured image representing a result of capture of a plurality of seventh points contained in the third projection image and being in one-to-one correspondence with the plurality of fifth points,
generating first relationship information representing a correspondence between a plurality of pixels provided in the first light modulator and a plurality of pixels provided in the first imaging device based on the second pattern image and the fourth captured image,
generating second relationship information representing a correspondence between a plurality of pixels provided in the second light modulator and the plurality of pixels provided in the first imaging device based on the third pattern image and the fifth captured image,
generating first coordinate information representing coordinates of a plurality of eighth points in the second light modulator that are in one-to-one correspondence with the plurality of fourth points based on the first relationship information, the second relationship information, the fourth captured image, and the fifth captured image, and
generating the second restoration information based on the second pattern image and the first coordinate information,
the plurality of sixth points are displayed in the third region,
the first image is the second pattern image,
the second image is the fourth captured image, and
the third image is the third pattern image.

5. The measurement method according to claim 1,
wherein one of the first and second apparatuses is the imaging apparatus,
another of the first and second apparatuses is a projection apparatus that projects an image onto the screen,
generating the first restoration information includes
projecting a first pattern image containing a plurality of first points from the projection apparatus to display a first projection image on the screen,
controlling the imaging apparatus to acquire a first captured image showing the result of capture of an image of a plurality of second points contained in the first projection image and being in one-to-one correspondence with the plurality of first points, and
generating the first restoration information based on the first pattern image and the first captured image,
the plurality of second points are displayed in the third region,
when the first apparatus is the imaging apparatus,
the first image is the first captured image, and
the second image is the first pattern image,
when the first apparatus is the projection apparatus,
the first image is the first pattern image, and
the second image is the first captured image.

6. The measurement method according to claim 1,
wherein the first and second apparatuses are each the imaging apparatus,
the third region contains a plurality of third points,
generating the first restoration information includes
controlling the first apparatus to acquire a second captured image representing a result of capture of an image of the plurality of third points, controlling the second apparatus to acquire a sixth captured image representing the result of capture of an image of the plurality of third points, and generating the first restoration information based on the second and sixth captured images, the first image is the second captured image, and the second image is the sixth captured image.

7. The measurement method according to claim 1, wherein the first and second apparatuses are each a projection apparatus that projects an image onto the screen, the third apparatus is the imaging apparatus, the first apparatus includes a first light modulator that modulates light emitted from a light source into projection light for displaying a projection image on the screen, the second apparatus includes a third light modulator that modulates light emitted from a light source into projection light for displaying a projection image on the screen, the third apparatus includes a second imaging device that converts light focused by the third lens into an electric signal to generate a captured image, generating the first restoration information includes projecting a second pattern image containing a plurality of fourth points from the first apparatus to display a second projection image on the screen, projecting a fourth pattern image containing a plurality of ninth points from the second apparatus to display a fourth projection image on the screen, controlling the third apparatus to acquire a seventh captured image representing a result of capture of a plurality of sixth points contained in the second projection image and being in one-to-one correspondence with the plurality of fourth points, controlling the third apparatus to acquire an eighth captured image representing a result of capture of a plurality of tenth points contained in the fourth projection image and being in one-to-one correspondence with the plurality of ninth points, generating third relationship information representing a correspondence between a plurality of pixels provided in the first light modulator and a plurality of pixels provided in the second imaging device based on the second pattern image and the seventh captured image, generating fourth relationship information representing a correspondence between a plurality of pixels provided in the third light modulator and a plurality of pixels provided in the second imaging device based on the fourth pattern image and the eighth captured image, generating second coordinate information representing coordinates of a plurality of eleventh points in the third light modulator that are in one-to-one correspondence with the plurality of fourth points based on the third relationship information, the fourth relationship information, the seventh captured image, and the eighth captured image, and generating the first restoration information based on the second pattern image and the second coordinate information, the plurality of sixth points are displayed in the third region, the first image is the second pattern image, the second image is the fourth pattern image, and the third image is the seventh captured image.

8. A measurement system comprising:

a first apparatus including a first lens and having known internal parameters relating to the first lens;

a second apparatus including a second lens and having known internal parameters relating to the second lens;

a third apparatus including a third lens and having unknown internal parameters relating to the third lens; and a processing apparatus that generates first restoration information representing a Euclidean restoration result for a first region of a screen that is a non-planar surface based on a first image that is one of an image input to the first apparatus and an image output from the first apparatus, and a second image that is one of an image input to the second apparatus and an image output from the second apparatus, generates second restoration information representing a projection restoration result for a second region of the screen based on a third image that is one of an image input to the third apparatus and an image output from the third apparatus, and the first image, generates a three-dimensional projective transformation matrix for transforming coordinates of a plurality of points indicated by the second restoration information into coordinates of a plurality of points indicated by the first restoration information based on the first restoration information and the second restoration information, and generates third restoration information representing a Euclidean restoration result for the second region based on the second restoration information and the three-dimensional projective transformation matrix, wherein at least one of the first, second, and third apparatuses is an imaging apparatus that captures an image of the screen, and at least part of the first region and at least part of the second region overlap with each other in a third region.

9. An information processing apparatus comprising a processing apparatus that generates first restoration information representing a Euclidean restoration result for a first region of a screen that is a non-planar surface based on a first image that is one of an image input to a first apparatus including a first lens and having known internal parameters relating to the first lens and an image output from the first apparatus, and a second image that is one of an image input to a second apparatus including a second lens and having known internal parameters relating to the second lens and an image output from the second apparatus, generates second restoration information representing a projection restoration result for a second region of the screen based on a third image that is one of an image input to a third apparatus including a third lens and having unknown internal parameters relating to the third lens and an image output from the third apparatus, and the first image, generates a three-dimensional projective transformation matrix for transforming coordinates of a plurality of points indicated by the second restoration information into coordinates of a plurality of points indicated by the first restoration information based on the first restoration information and the second restoration information, and generates third restoration information representing a Euclidean restoration result for the second region based on the second restoration information and the three-dimensional projective transformation matrix,
wherein at least one of the first, second, and third apparatuses is an imaging apparatus that captures an image of the screen, and
at least part of the first region and at least part of the second region overlap with each other in a third region.

* * * * *